(12) United States Patent
Kato et al.

(10) Patent No.: US 6,236,517 B1
(45) Date of Patent: May 22, 2001

(54) ZOOM LENS

(75) Inventors: Takashi Kato; Akihiro Nishio, both of Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/286,305

(22) Filed: Apr. 6, 1999

Related U.S. Application Data

(62) Division of application No. 08/892,878, filed on Jul. 15, 1997, now Pat. No. 6,028,716, which is a continuation of application No. 08/348,816, filed on Nov. 28, 1994, now abandoned.

(30) Foreign Application Priority Data

Nov. 29, 1993 (JP) .................................... 5-325844
Jul. 12, 1994 (JP) .................................... 6-182814
Aug. 5, 1994 (JP) .................................... 6-204262

(51) Int. Cl.$^7$ .................................... G02B 15/14
(52) U.S. Cl. .................... 359/692; 359/676; 359/684
(58) Field of Search .................... 359/684, 692, 359/676, 686–688, 689–690, 683

(56) References Cited

U.S. PATENT DOCUMENTS

| | | | |
|---|---|---|---|
| 4,690,513 | 9/1987 | Takahashi et al. | 350/427 |
| 5,069,536 | 12/1991 | Ogata | 359/689 |
| 5,268,792 | 12/1993 | Kreitzer et al. | 359/676 |
| 5,289,317 | 2/1994 | Ikemori et al. | 359/689 |
| 5,305,148 | 4/1994 | Ikemori et al. | 359/689 |
| 5,371,631 | 12/1994 | Takada | 359/689 |
| 5,446,592 | 8/1995 | Kohno et al. | 359/689 |
| 5,455,714 | 10/1995 | Kohno | 359/689 |
| 5,485,313 | 1/1996 | Betensky | 359/689 |
| 5,523,888 | 6/1996 | Nishio | 359/686 |
| 5,574,599 | 11/1996 | Hoshi et al. | 359/689 |
| 5,638,216 | 6/1997 | Horiuchi et al. | 359/683 |
| 5,666,230 | * 9/1997 | Tatsuno | 359/684 |
| 5,691,851 | 11/1997 | Nishio et al. | 359/683 |
| 5,815,320 | 9/1998 | Hoshi et al. | 359/686 |

FOREIGN PATENT DOCUMENTS

| | | |
|---|---|---|
| 59-16248 | 4/1984 | (JP) . |
| 2-72316 | 3/1990 | (JP) . |
| 3-73907 | 3/1991 | (JP) . |
| 3-233422 | 10/1991 | (JP) . |
| 3-249614 | 11/1991 | (JP) . |
| 3-282409 | 12/1991 | (JP) . |
| 4-37810 | 2/1992 | (JP) . |
| 4-76511 | 3/1992 | (JP) . |

\* cited by examiner

*Primary Examiner*—Georgia Epps
*Assistant Examiner*—Jordan M. Schwartz
(74) *Attorney, Agent, or Firm*—Fitzpatrick, Cella, Harper & Scinto

(57) ABSTRACT

A zoom lens includes from an object side to an image side, at a wide-angle end, a first lens group whose overall refractive power is positive and a second lens group whose overall refractive power is negative. Zooming is performed by varying the separation between the first lens group and the second lens group. The second lens group includes a first lens unit of negative refractive power and a second lens unit of negative refractive power. Focusing is performed by varying the separation between the first lens unit and the second lens unit. The first lens group has a plurality of lens units, and the separation between each adjacent two of the plurality of lens units varies during zooming.

7 Claims, 54 Drawing Sheets

L2bc : LENS UNITS L2b AND L2c MOVING IN UNISON AND HAVING POSITIVE OVERALL REFRACTIVE POWER

L2bc : LENS UNITS L2b AND L2c MOVING IN UNISON AND HAVING POSITIVE OVERALL REFRACTIVE POWER

L2abc : LENS UNITS L2a, L2b AND L2c MOVING IN UNISON AND HAVING POSITIVE OVERALL REFRACTIVE POWER

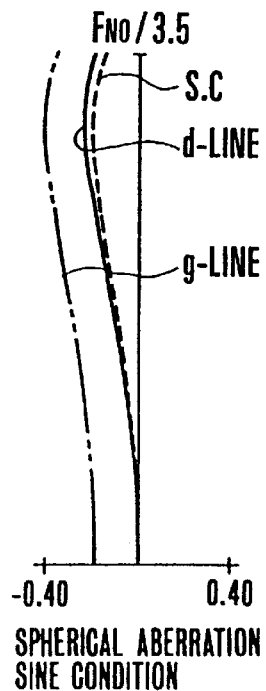
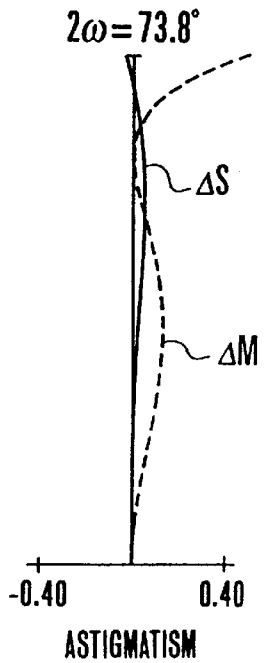
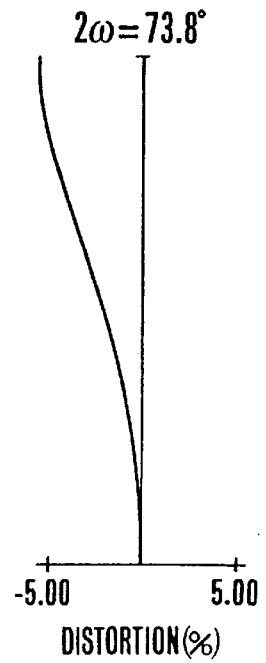
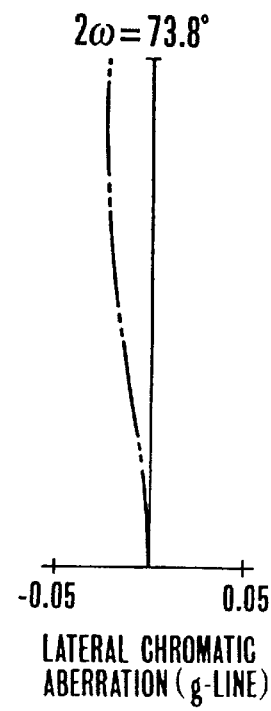
FIG. 11A  FIG. 11B  FIG. 11C  FIG. 11D
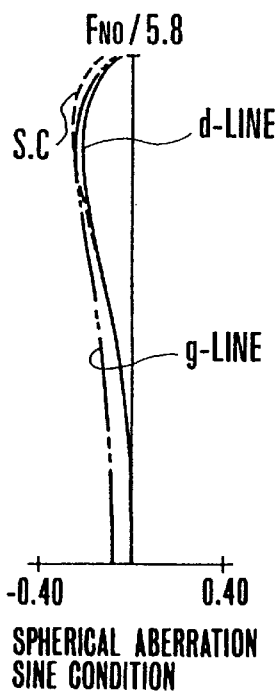
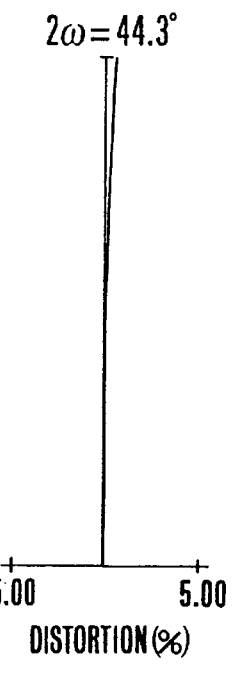
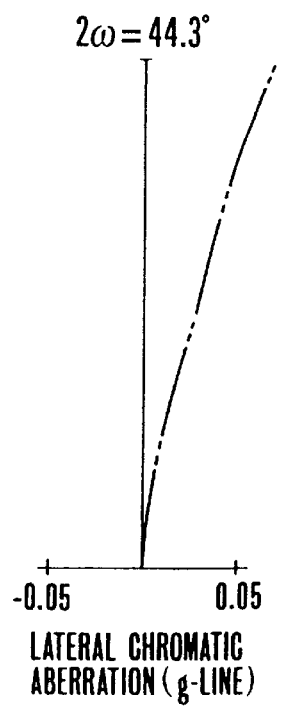
FIG. 12A  FIG. 12B  FIG. 12C  FIG. 12D Fno/9

-0.40  0.40
SPHERICAL ABERRATION
SINE CONDITION

2ω=24.1°

-0.40  0.40
ASTIGMATISM

2ω=24.1°

-5.00  5.00
DISTORTION(%)

2ω=24.1°

-0.05  0.05
LATERAL CHROMATIC
ABERRATION (g-LINE)

Fno/3.7

-0.40  0.40
SPHERICAL ABERRATION
SINE CONDITION

2ω=73.8°

-0.40  0.40
ASTIGMATISM

2ω=73.8°

-5.00  5.00
DISTORTION(%)

2ω=73.8°

-0.05  0.05
LATERAL CHROMATIC
ABERRATION (g-LINE)

Fno/6.7

SPHERICAL ABERRATION
SINE CONDITION

2ω=43.4°

ASTIGMATISM

2ω=43.4°

DISTORTION(%)

2ω=43.4°

LATERAL CHROMATIC
ABERRATION (g-LINE)

Fno/10

SPHERICAL ABERRATION
SINE CONDITION

2ω=23.9°

ASTIGMATISM

2ω=23.9°

DISTORTION (%)

2ω=23.9°

LATERAL CHROMATIC
ABERRATION (g-LINE)

Fno/3.3
SPHERICAL ABERRATION
SINE CONDITION

2ω=73.7°
ASTIGMATISM

2ω=73.7°
DISTORTION(%)

2ω=73.7°
LATERAL CHROMATIC
ABERRATION (g-LINE)

Fno/5.3
SPHERICAL ABERRATION
SINE CONDITION

2ω=43.7°
ASTIGMATISM

2ω=43.7°
DISTORTION(%)

2ω=43.7°
LATERAL CHROMATIC
ABERRATION (g-LINE)

Fno/9
S.C
d-LINE
g-LINE
-0.40  0.40
SPHERICAL ABERRATION
SINE CONDITION

2ω=24.2°
ΔS
ΔM
-0.40  0.40
ASTIGMATISM

2ω=24.2°
-5.00  5.00
DISTORTION(%)

2ω=24.2°
-0.05  0.05
LATERAL CHROMATIC
ABERRATION (g-LINE)

Fno/3.1
S.C
d-LINE
g-LINE
-0.40  0.40
SPHERICAL ABERRATION
SINE CONDITION

2ω=73.7°
ΔS
ΔM
-0.40  0.40
ASTIGMATISM

2ω=73.7°
-5.00  5.00
DISTORTION(%)

2ω=73.7°
-0.05  0.05
LATERAL CHROMATIC
ABERRATION (g-LINE)

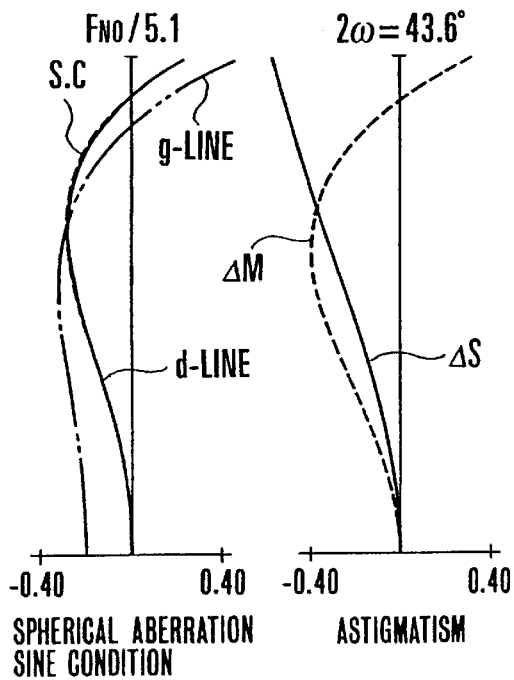
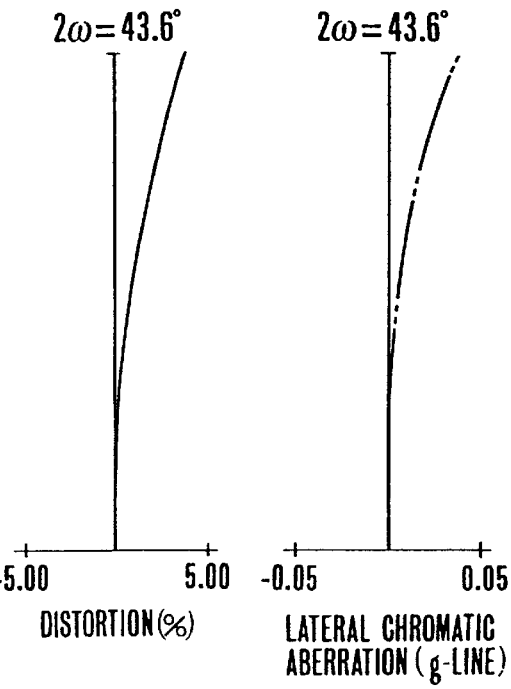
FIG. 21A  FIG. 21B  FIG. 21C  FIG. 21D
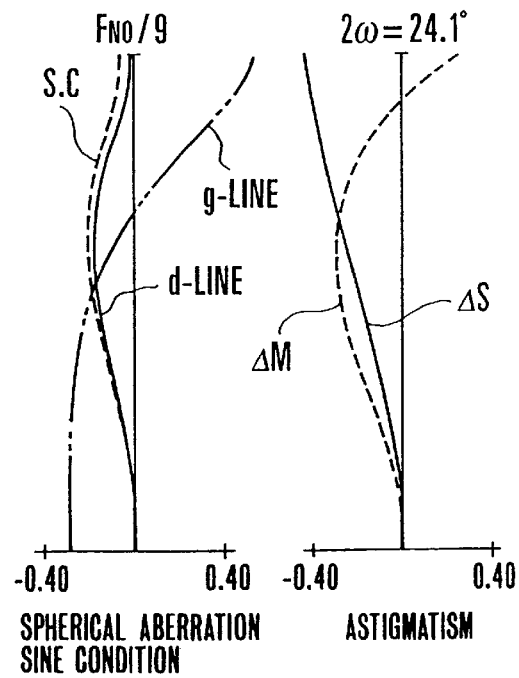
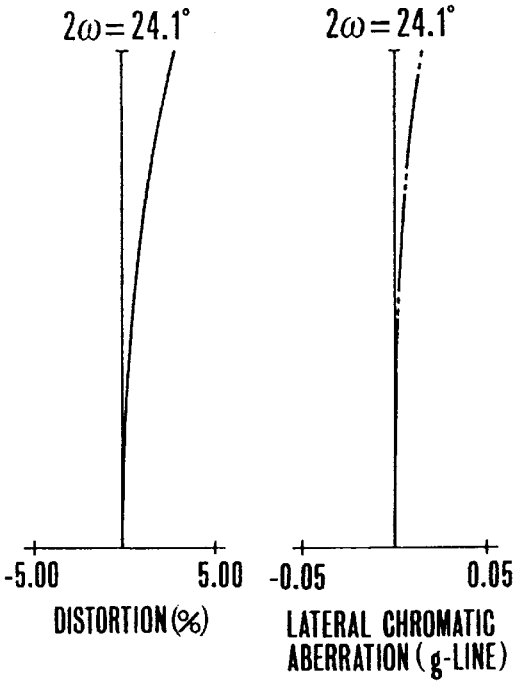
FIG. 22A  FIG. 22B  FIG. 22C  FIG. 22D

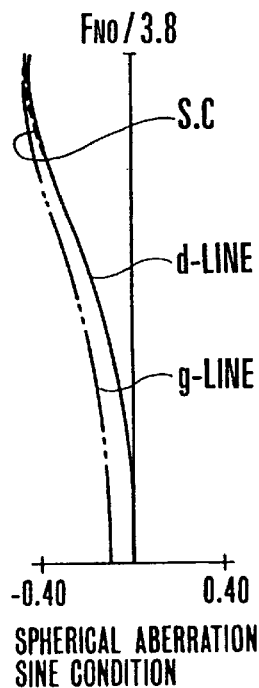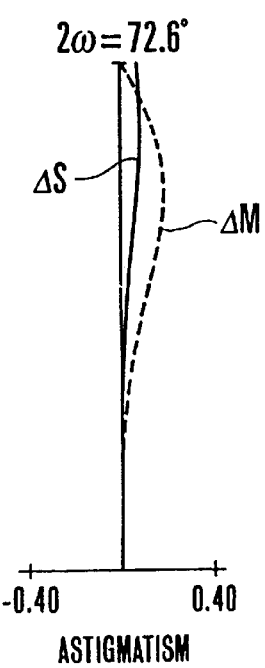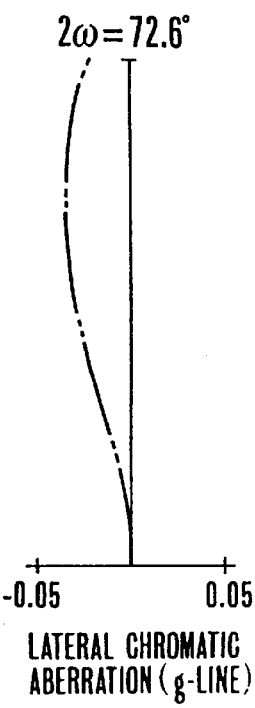
FIG. 23A  FIG. 23B  FIG. 23C  FIG. 23D
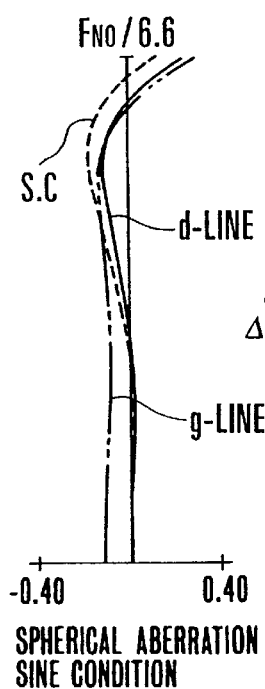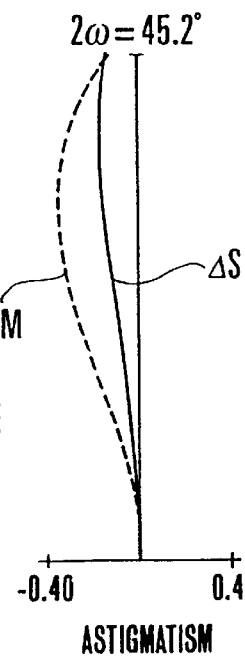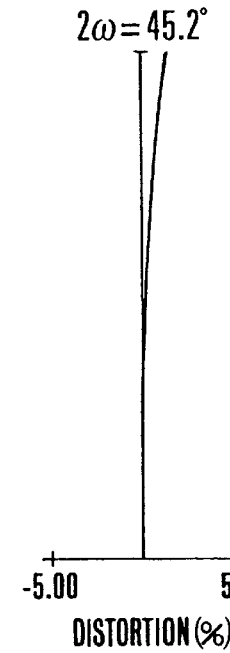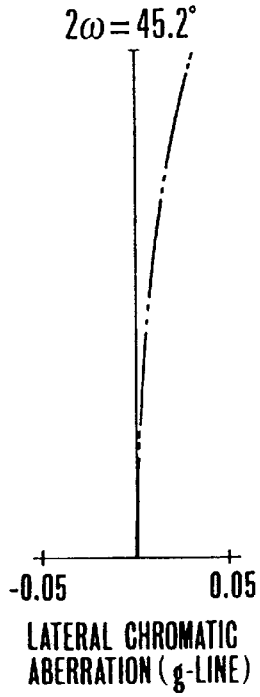
FIG. 24A  FIG. 24B  FIG. 24C  FIG. 24D

FIG. 26(A)

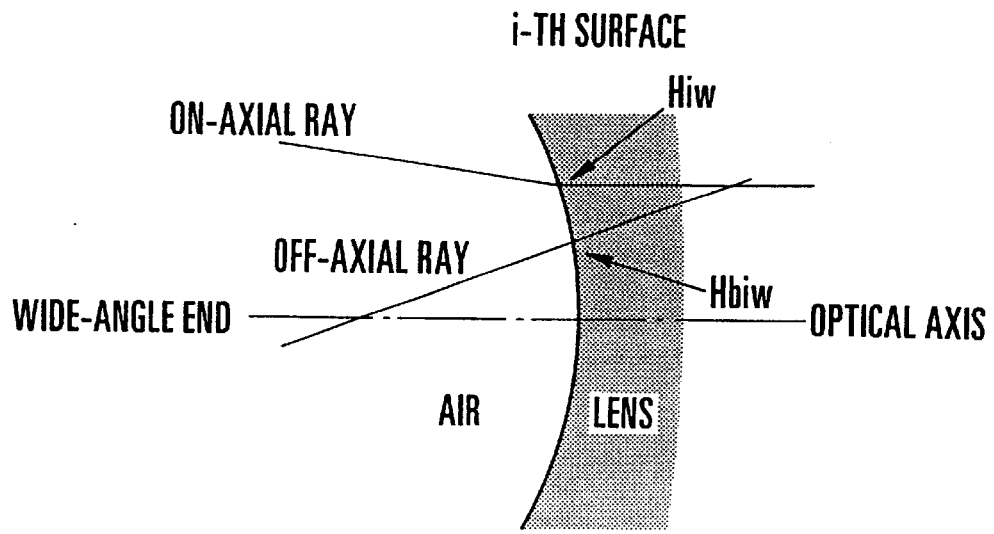

Hiw : HEIGHT OF ON-AXIAL RAY INCIDENT ON i-TH SURFACE IN WIDE-ANGLE END
Hbiw : HEIGHT OF OFF-AXIAL RAY INCIDENT ON i-TH SURFACE IN WIDE-ANGLE END
(MAXIMUM ANGLE OF VIEW)
(WHEN OBJECT DISTANCE IS INFINITY)

FIG. 26(B)

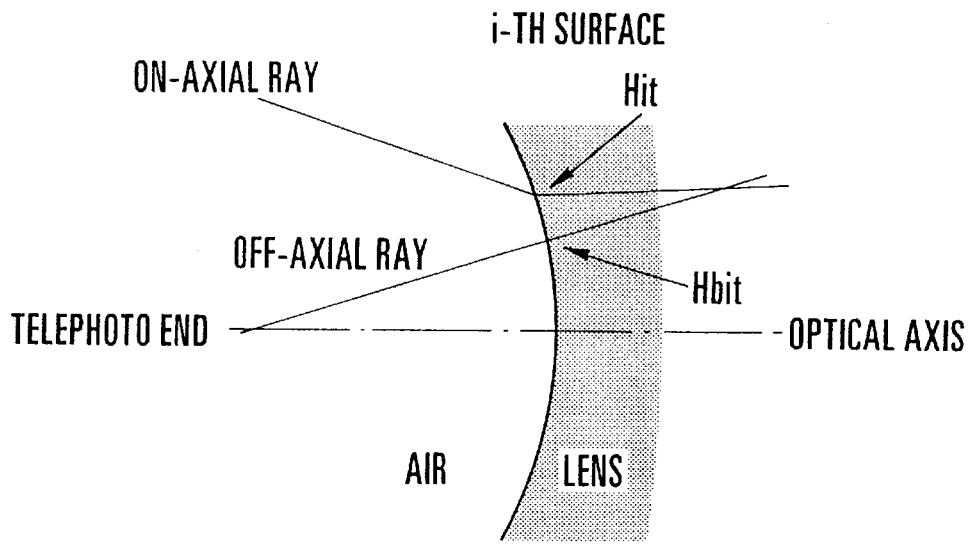

Hit : HEIGHT OF ON-AXIAL RAY INCIDENT ON i-TH SURFACE IN TELEPHOTO END
Hbit : HEIGHT OF OFF-AXIAL RAY INCIDENT ON i-TH SURFACE IN TELEPHOTO END
(MAXIMUM ANGLE OF VIEW)
(WHEN OBJECT DISTANCE IS INFINITY)

Fno/6.5
S.C
d-LINE
g-LINE
-0.80    0.80
SPHERICAL ABERRATION
SINE CONDITION

ω=21.8°
ΔS
ΔM
-0.80    0.80
ASTIGMATISM

ω=21.8°
-5.00    5.00
DISTORTION(%)

ω=21.8°
-0.05    0.05
LATERAL CHROMATIC
ABERRATION (g-LINE)

Fno/9.0
g-LINE
d-LINE
S.C
-0.80    0.80
SPHERICAL ABERRATION
SINE CONDITION

ω=12.0°
ΔS    ΔM
-0.80    0.80
ASTIGMATISM

ω=12.0°
-5.00    5.00
DISTORTION(%)

ω=12.0°
-0.05    0.05
LATERAL CHROMATIC
ABERRATION (g-LINE)

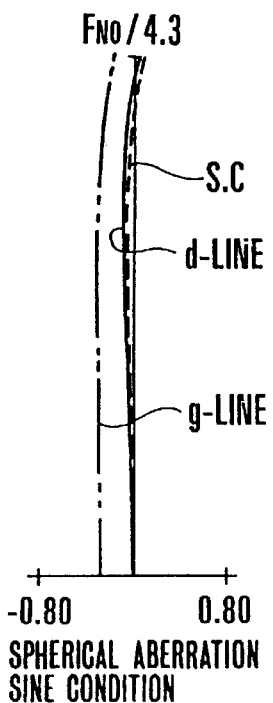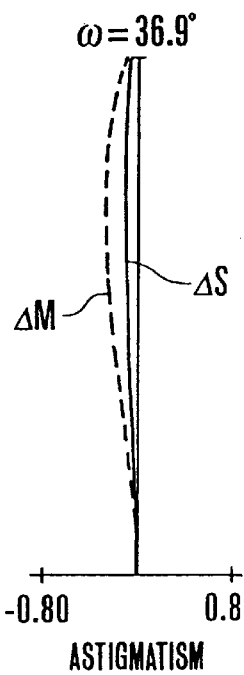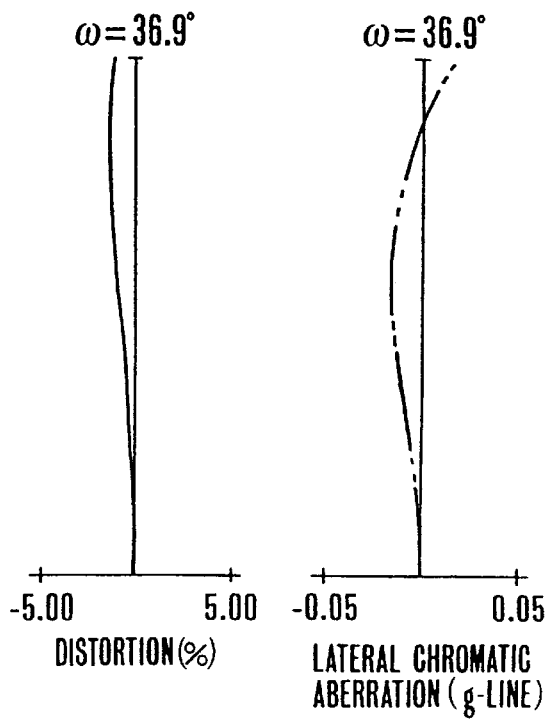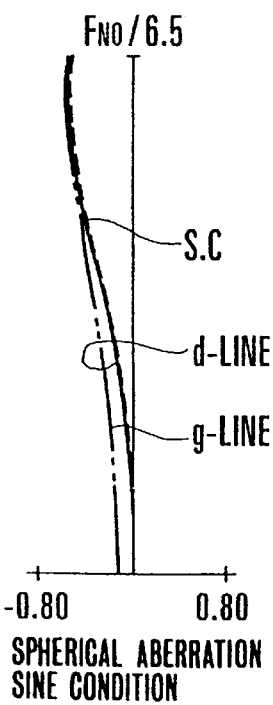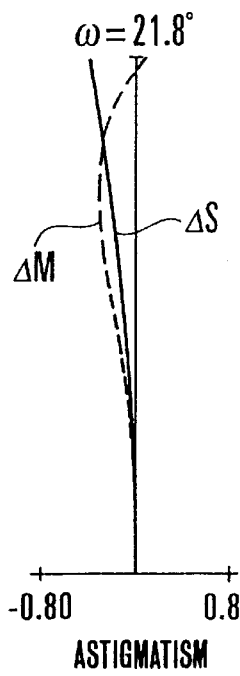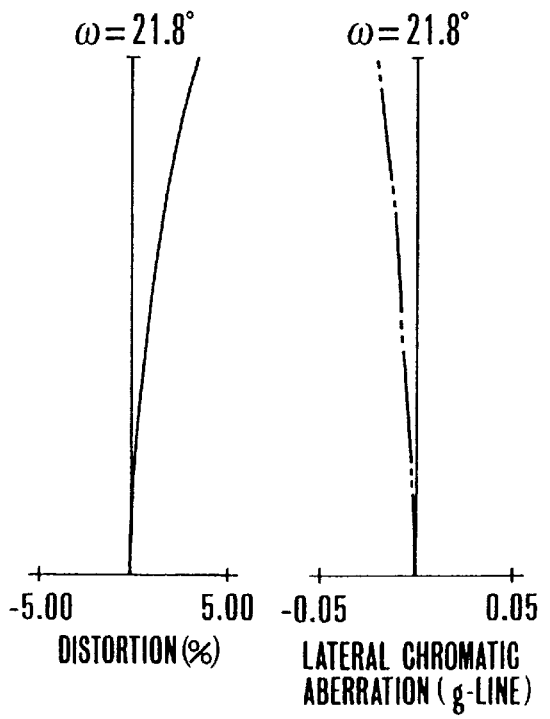

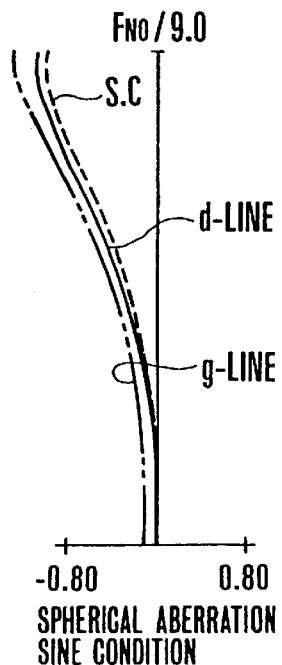
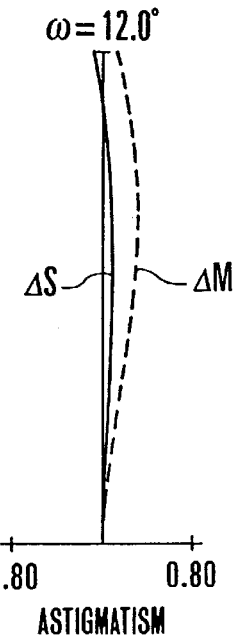
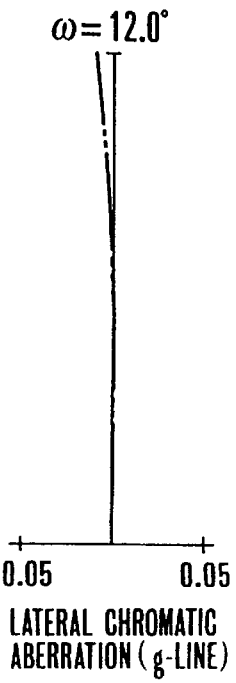
FIG. 37A  FIG. 37B  FIG. 37C  FIG. 37D
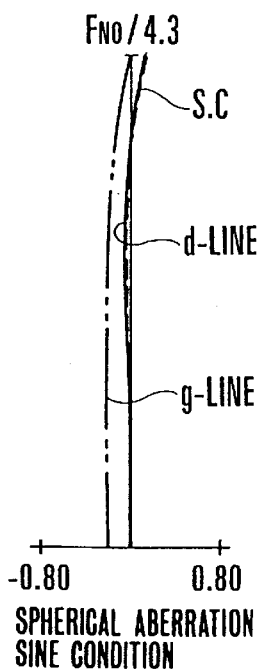
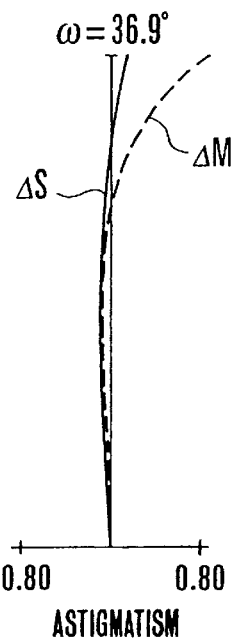
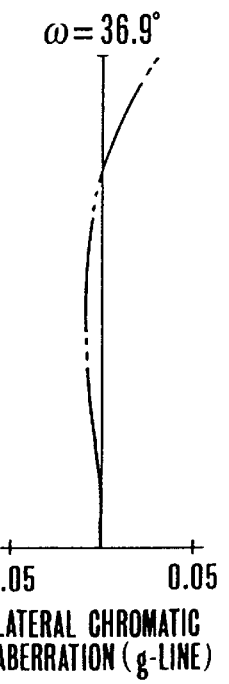
FIG. 38A  FIG. 38B  FIG. 38C  FIG. 38D

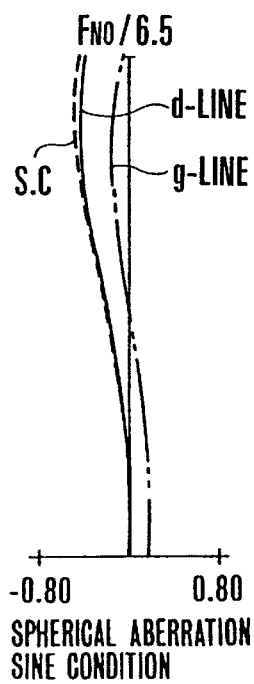
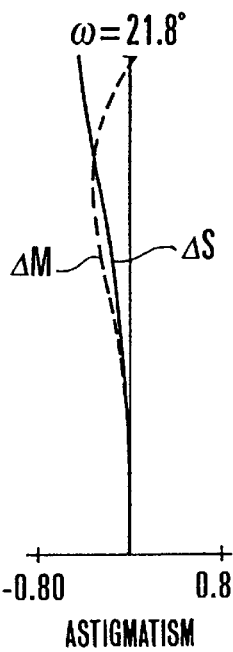
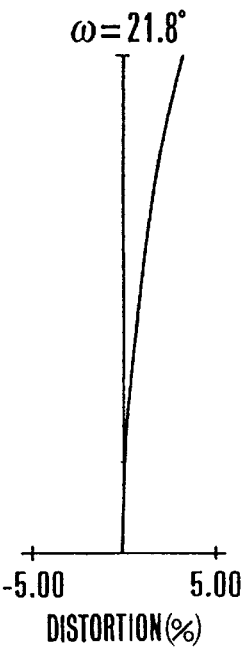
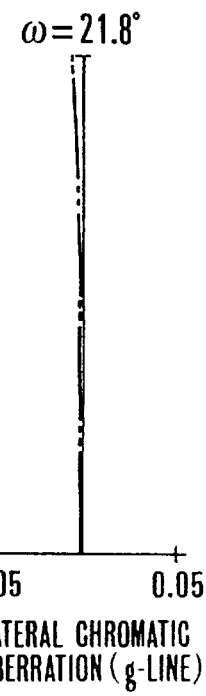
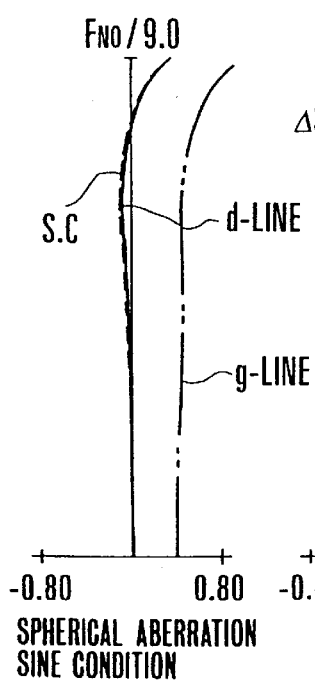
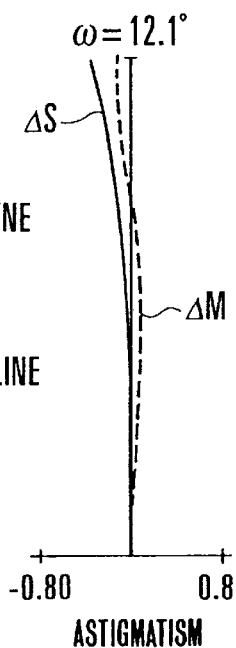
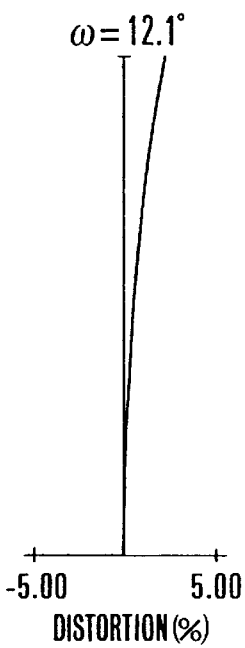
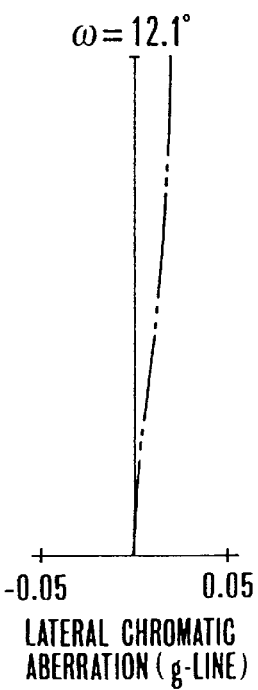

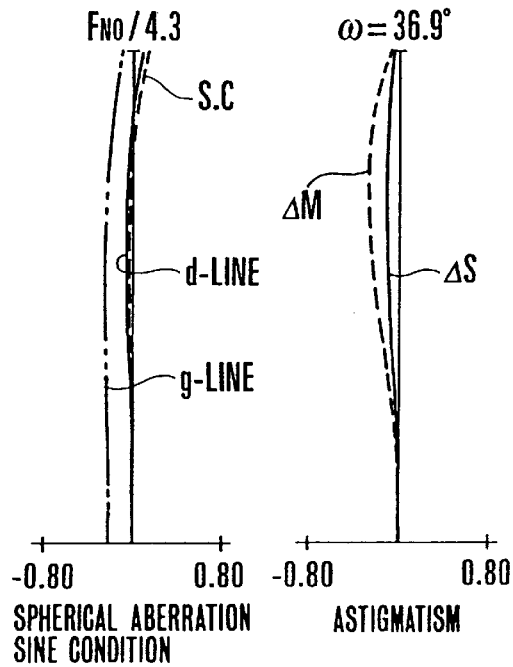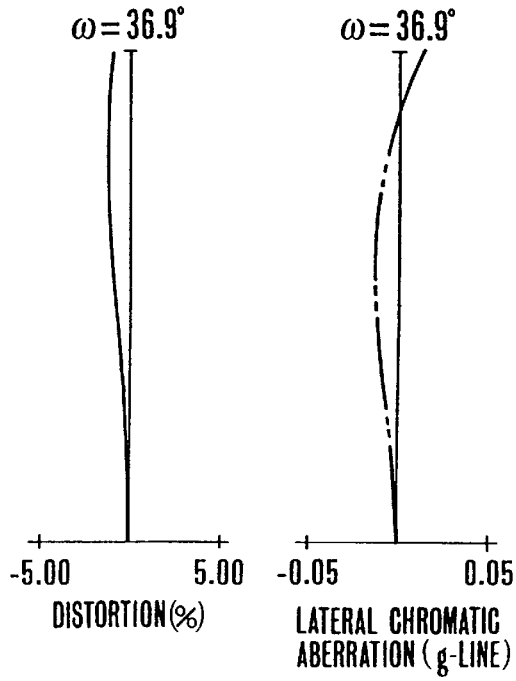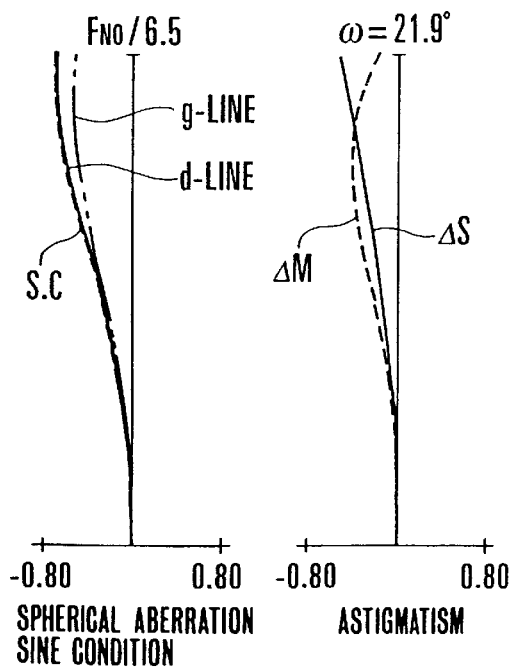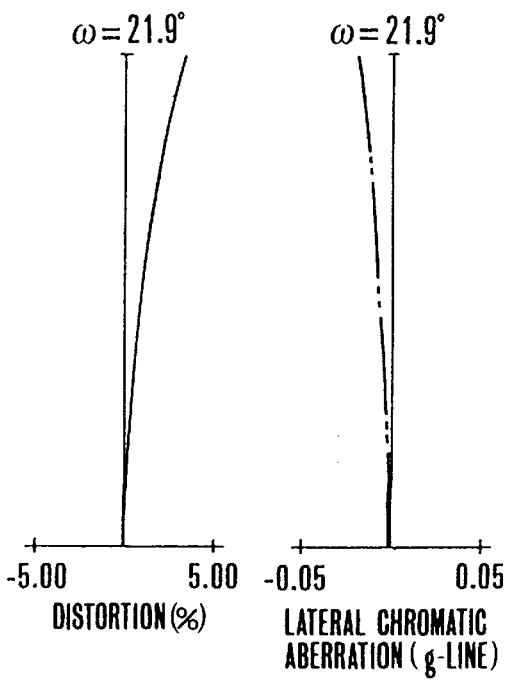

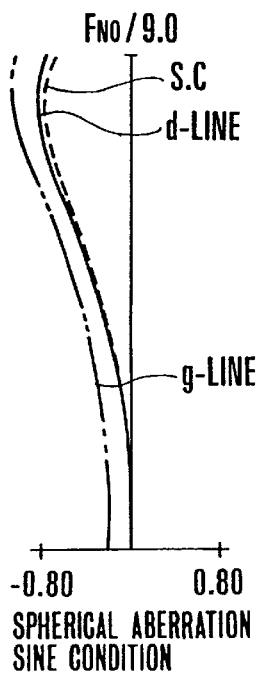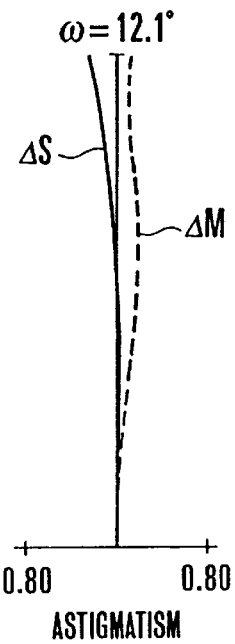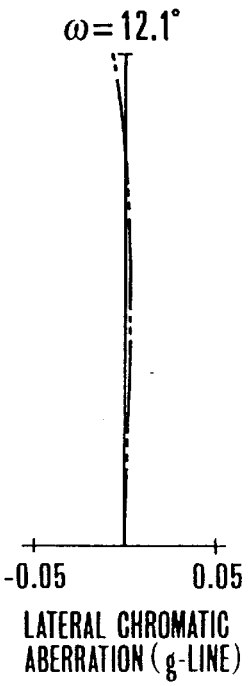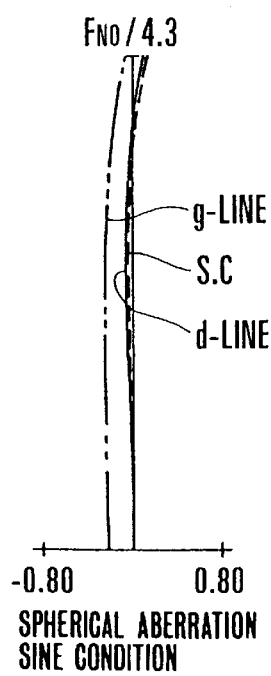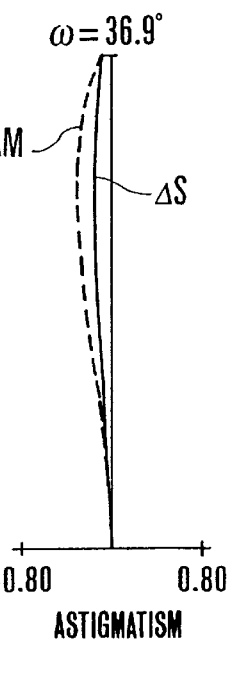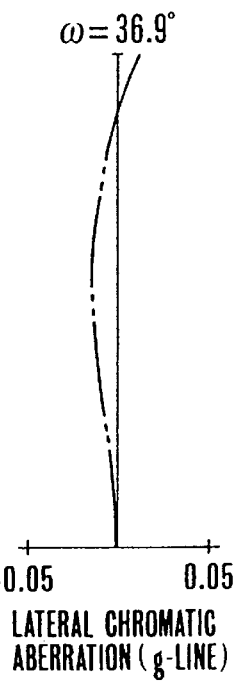

F_NO/6.5
g-LINE
d-LINE
S.C
-0.80   0.80
SPHERICAL ABERRATION
SINE CONDITION

ω=21.9°
ΔS
ΔM
-0.80   0.80
ASTIGMATISM

ω=21.9°
-5.00   5.00
DISTORTION(%)

ω=21.9°
-0.05   0.05
LATERAL CHROMATIC
ABERRATION (g-LINE)

F_NO/9.0
S.C
g-LINE
d-LINE
-0.80   0.80
SPHERICAL ABERRATION
SINE CONDITION

ω=12.1°
ΔS
ΔM
-0.80   0.80
ASTIGMATISM

ω=12.1°
-5.00   5.00
DISTORTION(%)

ω=12.1°
-0.05   0.05
LATERAL CHROMATIC
ABERRATION (g-LINE)

FNO/4.3
d-LINE
S.C
g-LINE
-0.80  0.80
SPHERICAL ABERRATION
SINE CONDITION

ω=36.9°
ΔS
ΔM
-0.80  0.80
ASTIGMATISM

ω=36.9°
-5.00  5.00
DISTORTION(%)

ω=36.9°
-0.05  0.05
LATERAL CHROMATIC
ABERRATION (g-LINE)

FNO/6.5
S.C
d-LINE
g-LINE
-0.80  0.80
SPHERICAL ABERRATION
SINE CONDITION

ω=21.7°
ΔS
ΔM
-0.80  0.80
ASTIGMATISM

ω=21.7°
-5.00  5.00
DISTORTION(%)

ω=21.7°
-0.05  0.05
LATERAL CHROMATIC
ABERRATION (g-LINE)

FNO/9.0

-0.80  0.80
SPHERICAL ABERRATION
SINE CONDITION

ω=11.9°

-0.80  0.80
ASTIGMATISM

ω=11.9°

-5.00  5.00
DISTORTION(%)

ω=11.9°

-0.05  0.05
LATERAL CHROMATIC
ABERRATION (g-LINE)

FNO/4.3

-0.80  0.80
SPHERICAL ABERRATION
SINE CONDITION

ω=36.9°

-0.80  0.80
ASTIGMATISM

ω=36.9°

-5.00  5.00
DISTORTION(%)

ω=36.9°

-0.05  0.05
LATERAL CHROMATIC
ABERRATION (g-LINE)

$F_{NO}/6.5$

S.C
d-LINE
g-LINE

-0.80  0.80
SPHERICAL ABERRATION
SINE CONDITION $\omega = 21.7°$

ΔM  ΔS

-0.80  0.80
ASTIGMATISM $\omega = 21.7°$

-5.00  5.00
DISTORTION(%)

$\omega = 21.7°$

-0.05  0.05
LATERAL CHROMATIC
ABERRATION (g-LINE)

$F_{NO}/9.0$ d-LINE
S.C
g-LINE

-0.80  0.80
SPHERICAL ABERRATION
SINE CONDITION $\omega = 11.9°$

ΔS
ΔM

-0.80  0.80
ASTIGMATISM $\omega = 11.9°$

-5.00  5.00
DISTORTION(%)

$\omega = 11.9°$

-0.05  0.05
LATERAL CHROMATIC
ABERRATION (g-LINE)

FNO/3.8
d-LINE
S.C
g-LINE
-0.80  0.80
SPHERICAL ABERRATION
SINE CONDITION

ω=36.6°
ΔS  ΔM
-0.80  0.80
ASTIGMATISM

ω=36.6°
-5.00  5.00
DISTORTION(%)

ω=36.6°
-0.05  0.05
LATERAL CHROMATIC
ABERRATION (g-LINE)

FNO/7.0
S.C
d-LINE
g-LINE
-0.80  0.80
SPHERICAL ABERRATION
SINE CONDITION

ω=23.0°
ΔM
ΔS
-0.80  0.80
ASTIGMATISM

ω=23.0°
-5.00  5.00
DISTORTION(%)

ω=23.0°
-0.05  0.05
LATERAL CHROMATIC
ABERRATION (g-LINE)

F_{NO}/9.0
S.C
d-LINE
g-LINE
-0.80  0.80
SPHERICAL ABERRATION
SINE CONDITION

ω=13.7°
ΔM
ΔS
-0.80  0.80
ASTIGMATISM

ω=13.7°
-5.00  5.00
DISTORTION(%)

ω=13.7°
-0.05  0.05
LATERAL CHROMATIC
ABERRATION (g-LINE)

F_{NO}/3.8
d-LINE
S.C
g-LINE
-0.80  0.80
SPHERICAL ABERRATION
SINE CONDITION

ω=36.6°
ΔS
ΔM
-0.80  0.80
ASTIGMATISM

ω=36.6°
-5.00  5.00
DISTORTION(%)

ω=36.6°
-0.05  0.05
LATERAL CHROMATIC
ABERRATION (g-LINE)

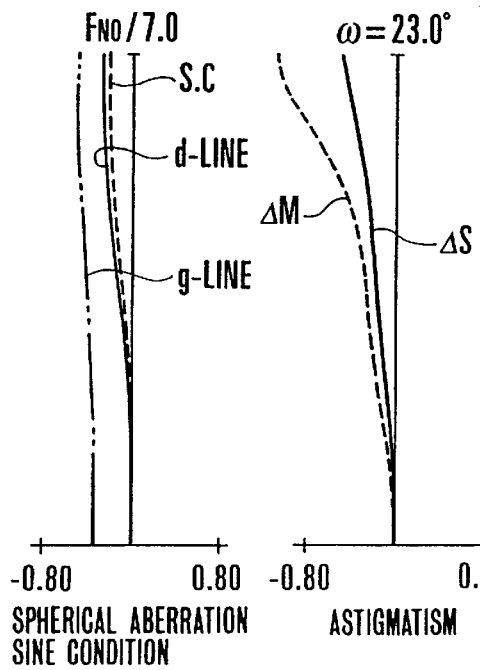
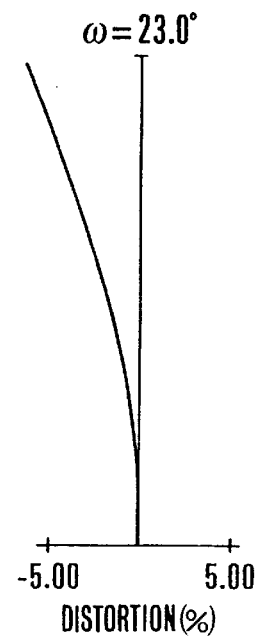
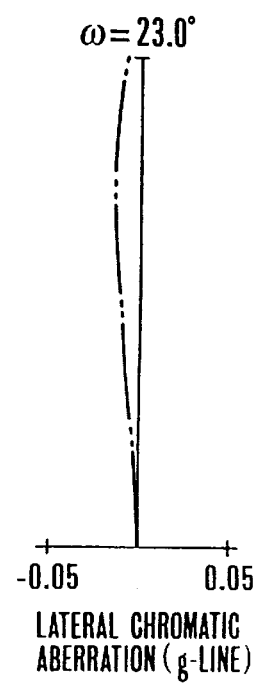
FIG. 57A  FIG. 57B  FIG. 57C  FIG. 57D
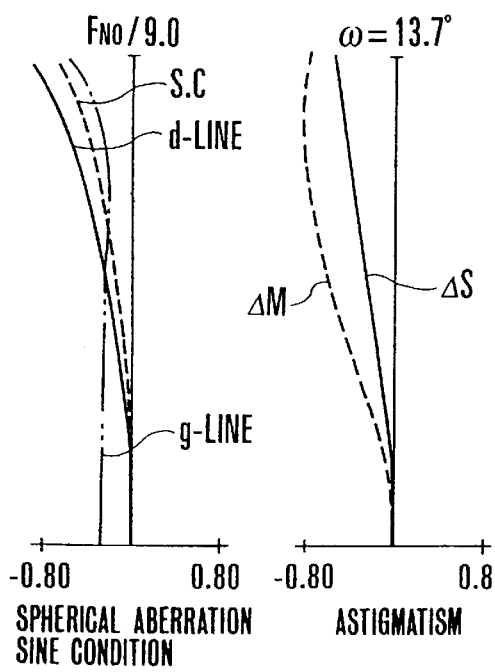
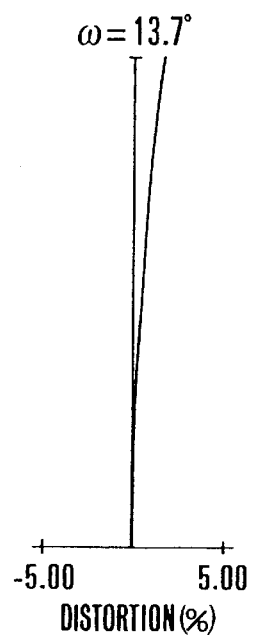
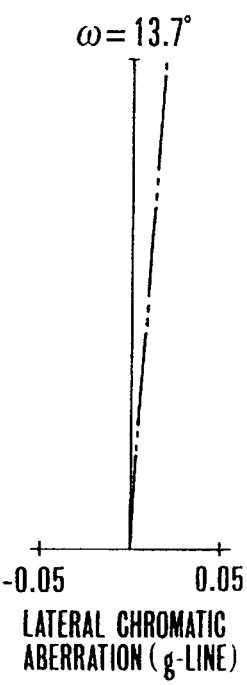
FIG. 58A  FIG. 58B  FIG. 58C  FIG. 58D Fno/4.0
d-LINE
S.C
g-LINE

-0.80  0.80
SPHERICAL ABERRATION
SINE CONDITION

ω=28.6°
ΔS
ΔM

-0.80  0.80
ASTIGMATISM

ω=28.6°

-5.00  5.00
DISTORTION(%)

ω=28.6°

-0.05  0.05
LATERAL CHROMATIC
ABERRATION (g-LINE)

Fno/5.6
d-LINE
S.C
g-LINE

-0.80  0.80
SPHERICAL ABERRATION
SINE CONDITION

ω=18.9°
ΔS
ΔM

-0.80  0.80
ASTIGMATISM

ω=18.9°

-5.00  5.00
DISTORTION(%)

ω=18.9°

-0.05  0.05
LATERAL CHROMATIC
ABERRATION (g-LINE)

F_NO/7.8

-0.80    0.80
SPHERICAL ABERRATION
SINE CONDITION

ω=12.1°

-0.80    0.80
ASTIGMATISM

ω=12.1°

-5.00    5.00
DISTORTION(%)

ω=12.1°

-0.05    0.05
LATERAL CHROMATIC
ABERRATION (g-LINE)

F_NO/4.0

-0.80    0.80
SPHERICAL ABERRATION
SINE CONDITION

ω=28.6°

-0.80    0.80
ASTIGMATISM

ω=28.6°

-5.00    5.00
DISTORTION(%)

ω=28.6°

-0.05    0.05
LATERAL CHROMATIC
ABERRATION (g-LINE)

$F_{NO}/5.6$
S.C
d-LINE
g-LINE

-0.80  0.80
SPHERICAL ABERRATION
SINE CONDITION $\omega = 18.9°$
ΔS
ΔM

-0.80  0.80
ASTIGMATISM $\omega = 18.9°$

-5.00  5.00
DISTORTION(%)

$\omega = 18.9°$

-0.05  0.05
LATERAL CHROMATIC
ABERRATION (g-LINE)

$F_{NO}/7.8$
S.C
d-LINE
g-LINE

-0.80  0.80
SPHERICAL ABERRATION
SINE CONDITION $\omega = 12.1°$
ΔS
ΔM

-0.80  0.80
ASTIGMATISM $\omega = 12.1°$

-5.00  5.00
DISTORTION(%)

$\omega = 12.1°$

-0.05  0.05
LATERAL CHROMATIC
ABERRATION (g-LINE)

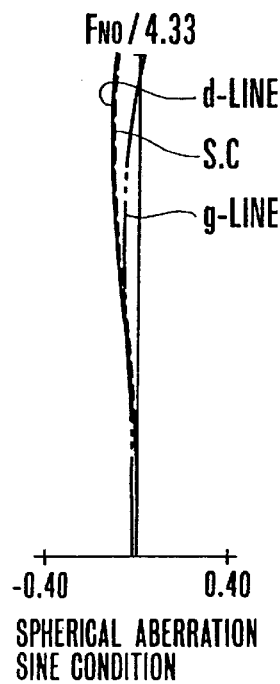
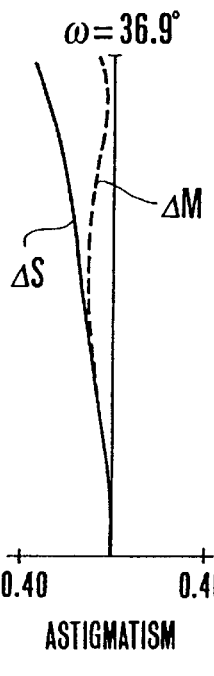
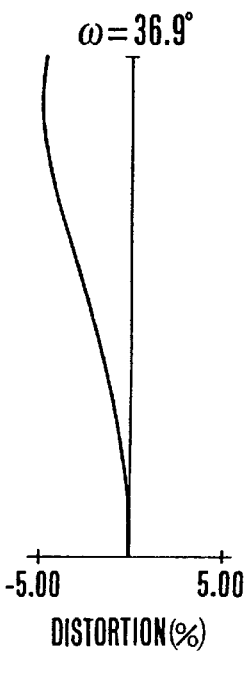
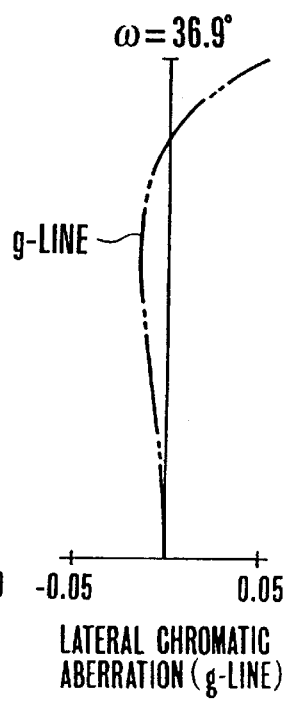
FIG. 76A  FIG. 76B  FIG. 76C  FIG. 76D
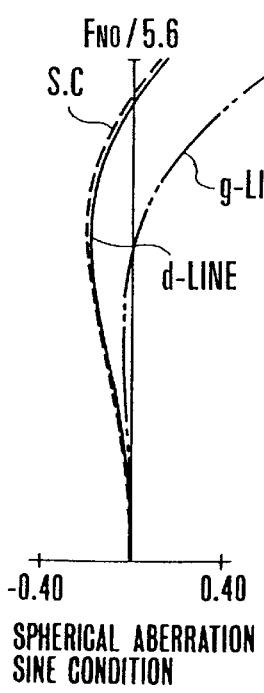
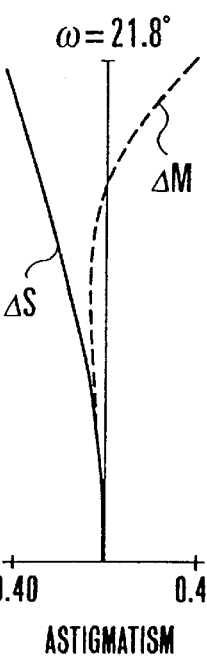
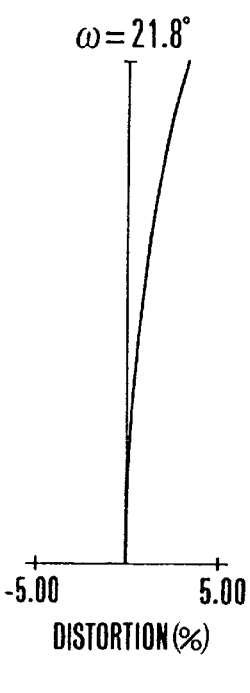
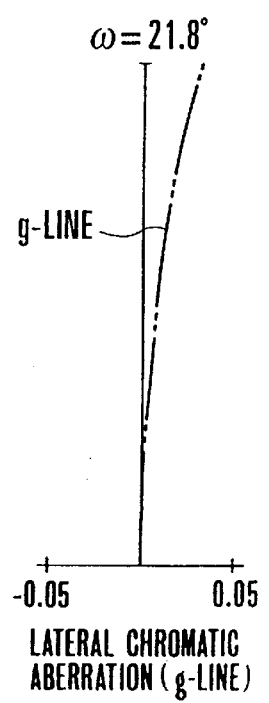
FIG. 77A  FIG. 77B  FIG. 77C  FIG. 77D

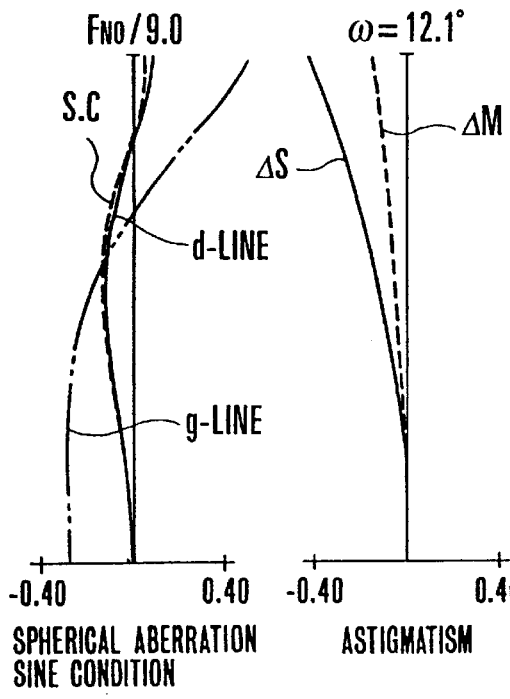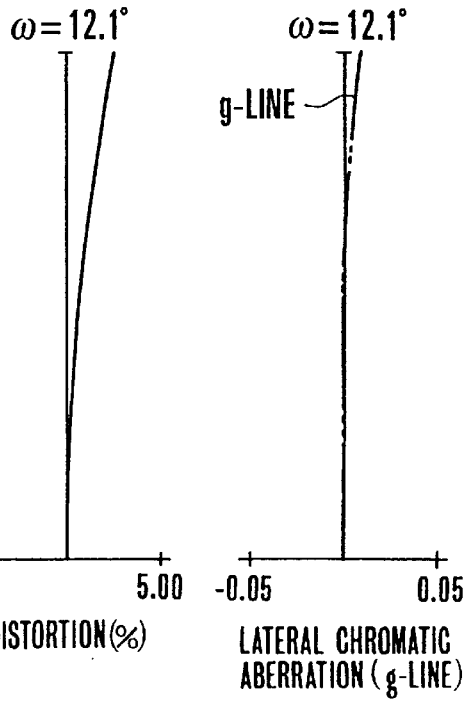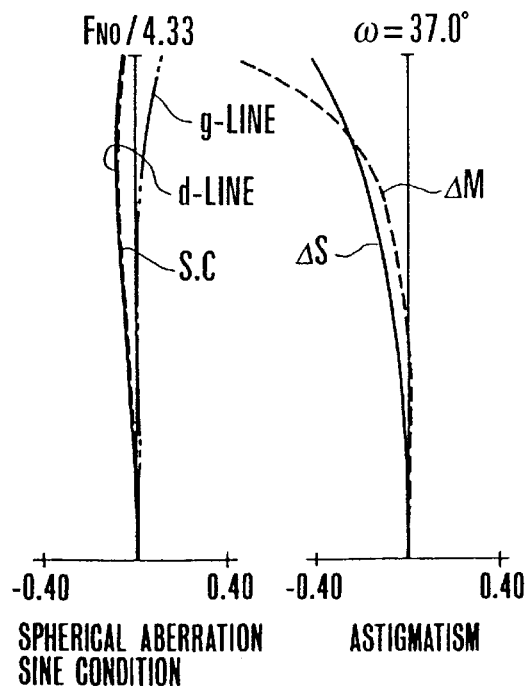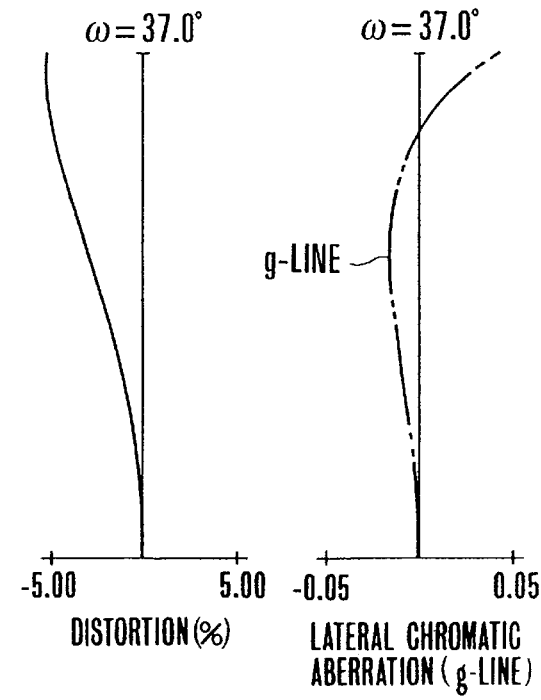

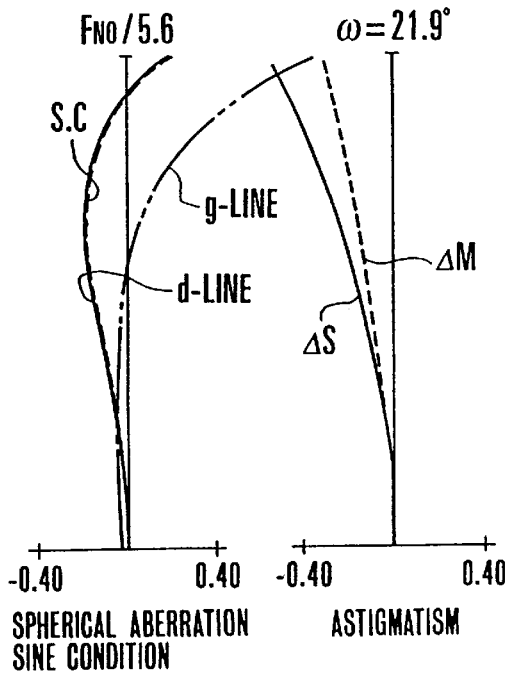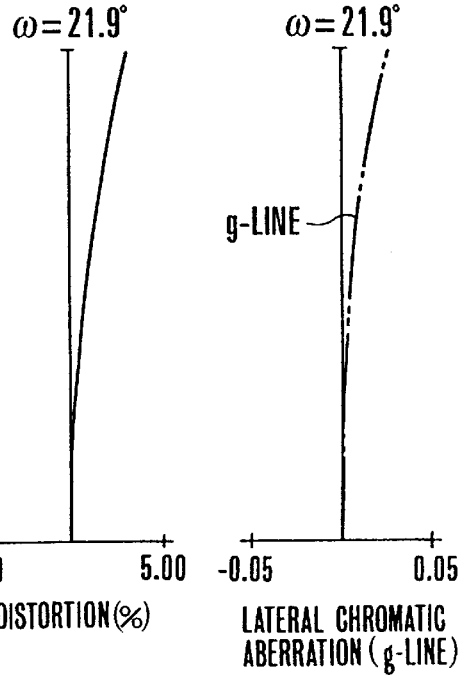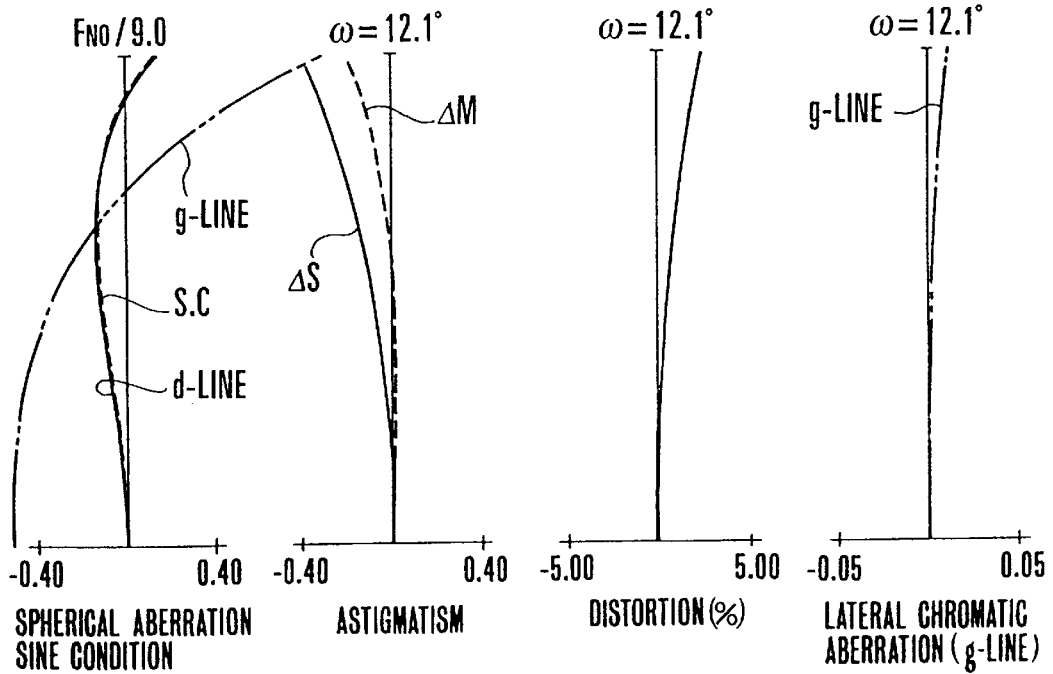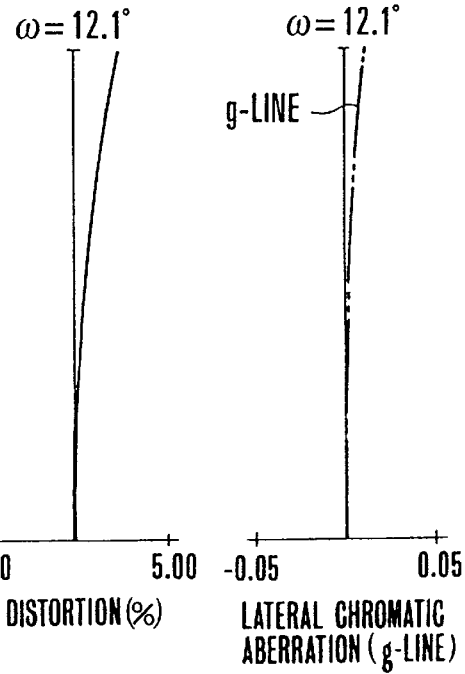

FNO/3.3

SPHERICAL ABERRATION
SINE CONDITION

ω=36.9°

ASTIGMATISM

ω=36.9°

DISTORTION(%)

ω=36.9°

LATERAL CHROMATIC
ABERRATION (g-LINE)

FNO/5.2

SPHERICAL ABERRATION
SINE CONDITION

ω=21.8°

ASTIGMATISM

ω=21.8°

DISTORTION(%)

ω=21.8°

LATERAL CHROMATIC
ABERRATION (g-LINE)

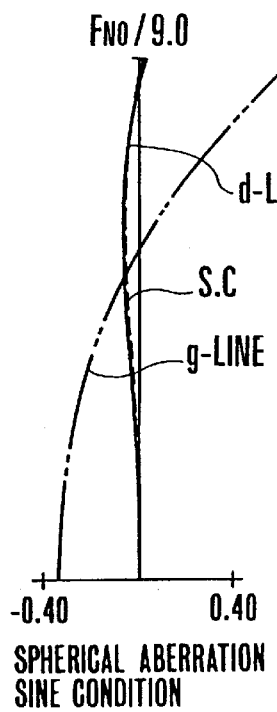
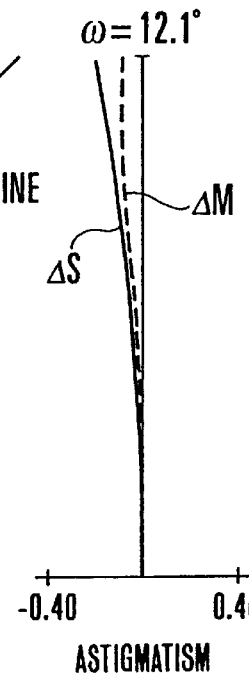
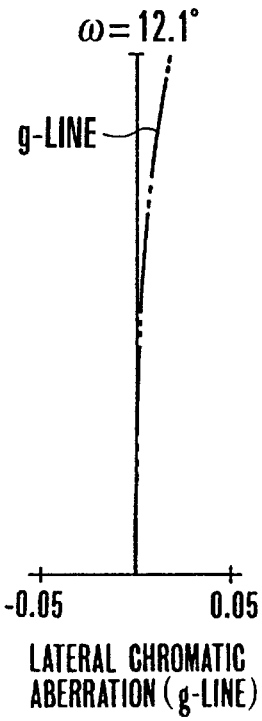
FIG. 84A  FIG. 84B  FIG. 84C  FIG. 84D
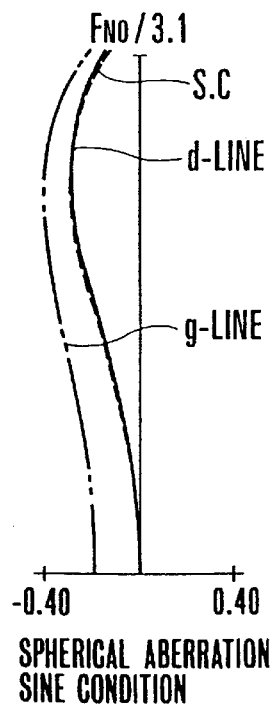
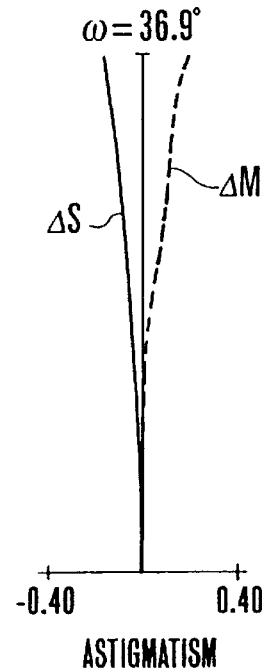
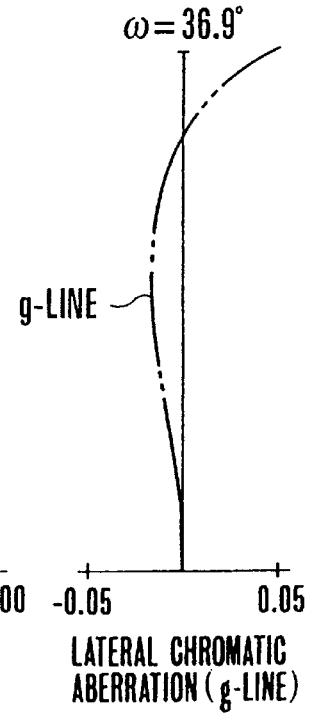
FIG. 85A  FIG. 85B  FIG. 85C  FIG. 85D

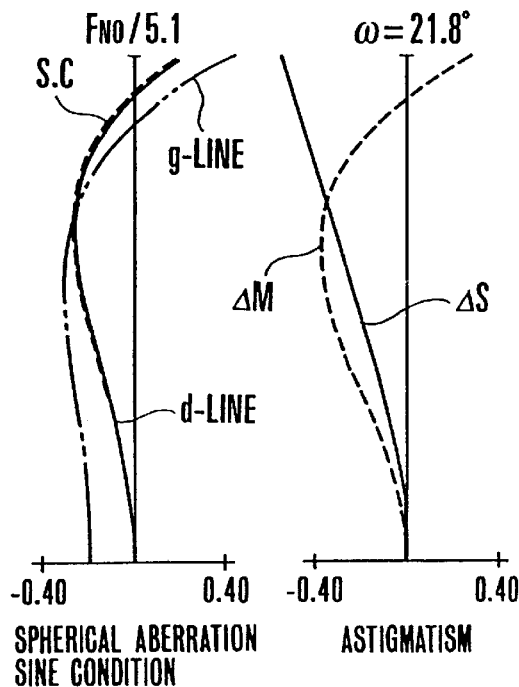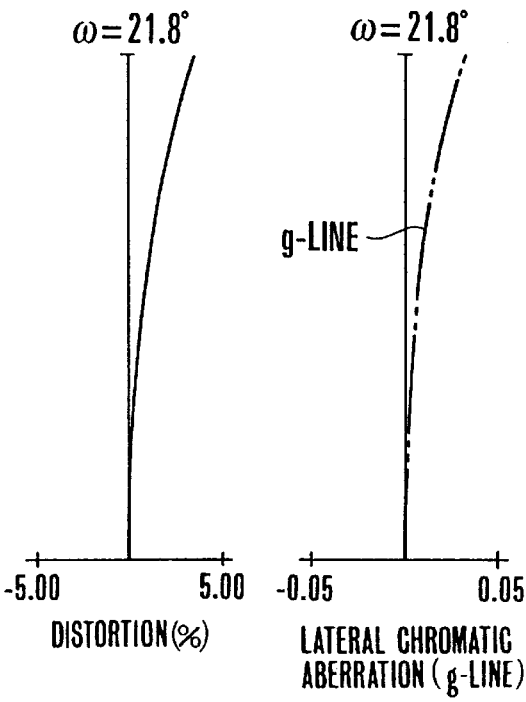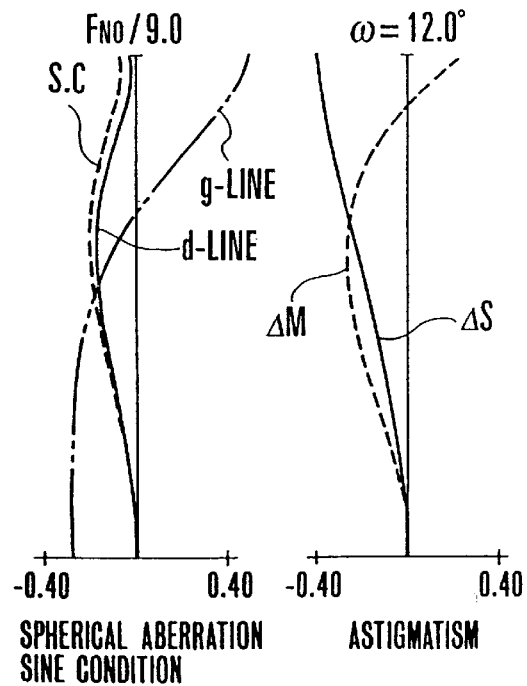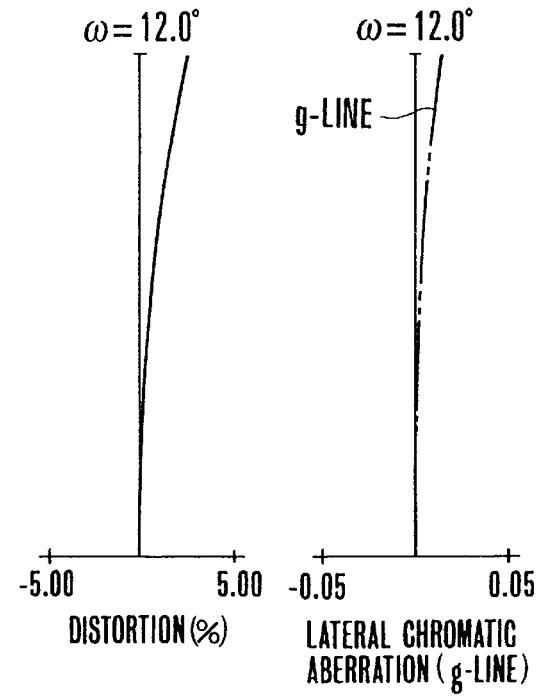

F$_{NO}$/3.3
S.C
d-LINE
g-LINE
-0.40  0.40
SPHERICAL ABERRATION
SINE CONDITION

ω=36.9°
ΔM
ΔS
-0.40  0.40
ASTIGMATISM

ω=36.9°
-5.00  5.00
DISTORTION(%)

ω=36.9°
g-LINE
-0.05  0.05
LATERAL CHROMATIC
ABERRATION (g-LINE)

F$_{NO}$/5.3
d-LINE
g-LINE
S.C
-0.40  0.40
SPHERICAL ABERRATION
SINE CONDITION

ω=21.8°
ΔM
ΔS
-0.40  0.40
ASTIGMATISM

ω=21.8°
-5.00  5.00
DISTORTION(%)

ω=21.8°
g-LINE
-0.05  0.05
LATERAL CHROMATIC
ABERRATION (g-LINE)

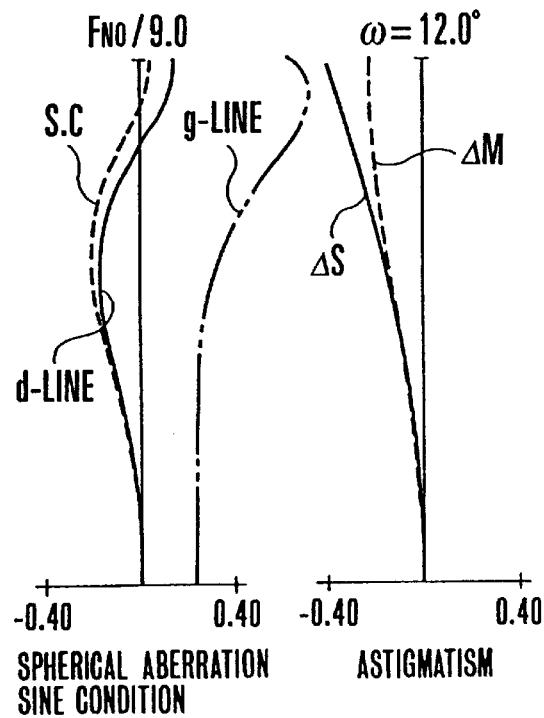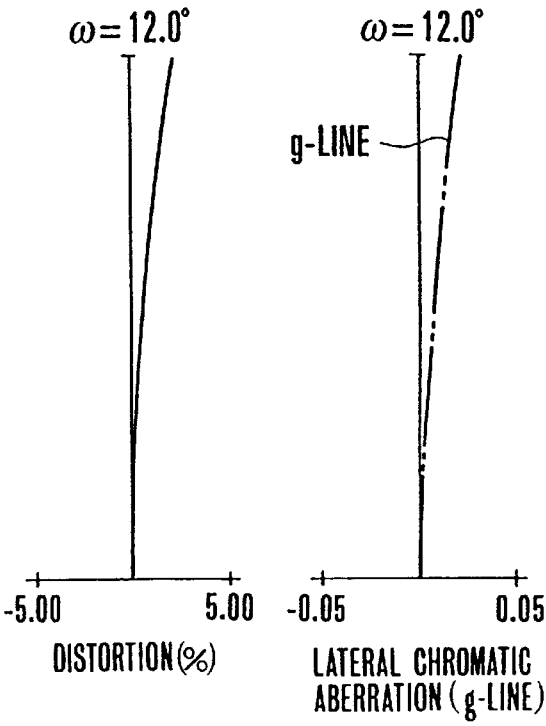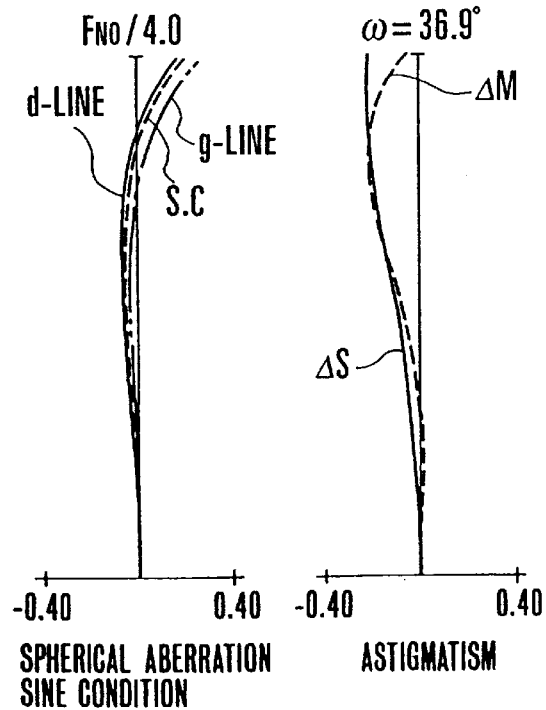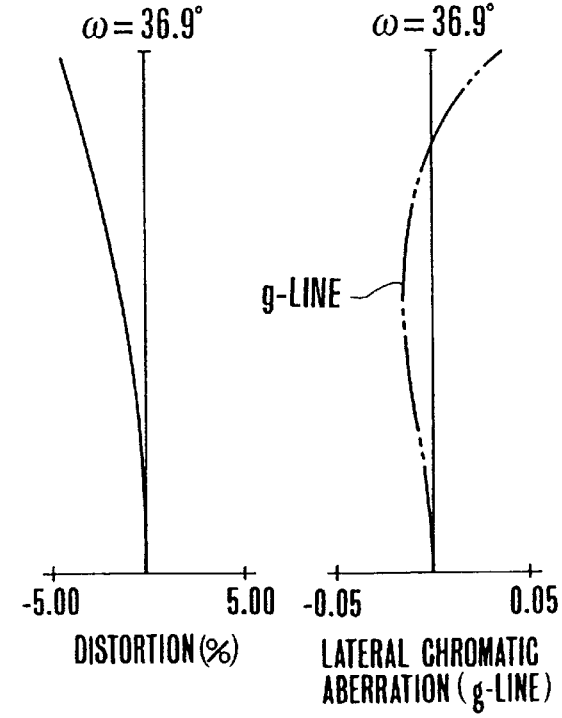

FNO/6.0
d-LINE
g-LINE
S.C
-0.40  0.40
SPHERICAL ABERRATION
SINE CONDITION

ω=21.8°
ΔM
ΔS
-0.40  0.40
ASTIGMATISM

ω=21.8°
-5.00  5.00
DISTORTION(%)

ω=21.8°
g-LINE
-0.05  0.05
LATERAL CHROMATIC
ABERRATION (g-LINE)

FNO/8.75
g-LINE
d-LINE
S.C
-0.40  0.40
SPHERICAL ABERRATION
SINE CONDITION

ω=12.1°
ΔS
ΔM
-0.40  0.40
ASTIGMATISM

ω=12.1°
-5.00  5.00
DISTORTION(%)

ω=12.1°
g-LINE
-0.05  0.05
LATERAL CHROMATIC
ABERRATION (g-LINE)

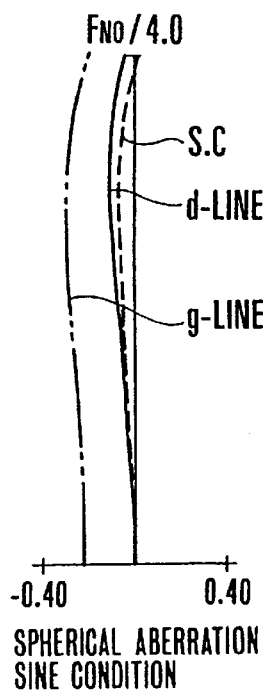
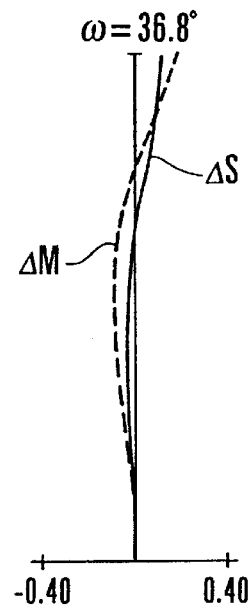
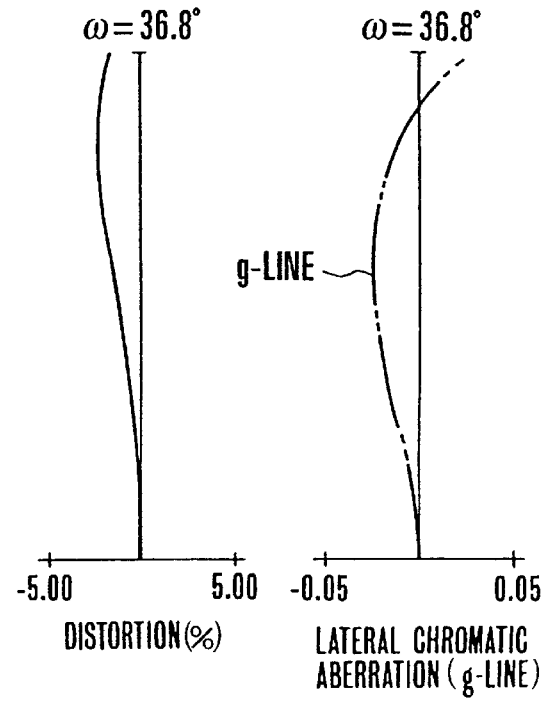
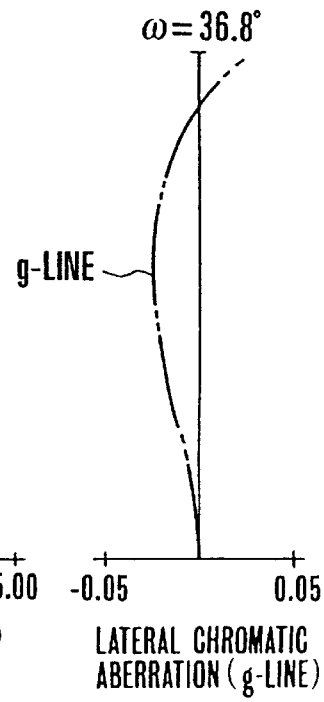
FIG. 94A  FIG. 94B  FIG. 94C  FIG. 94D
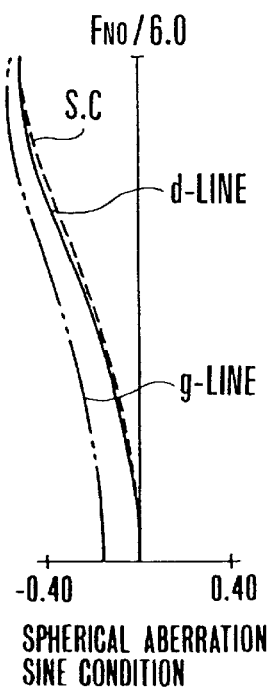
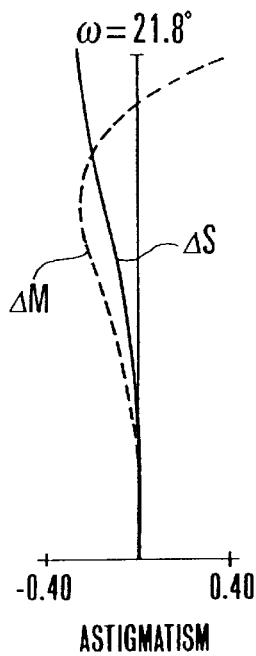
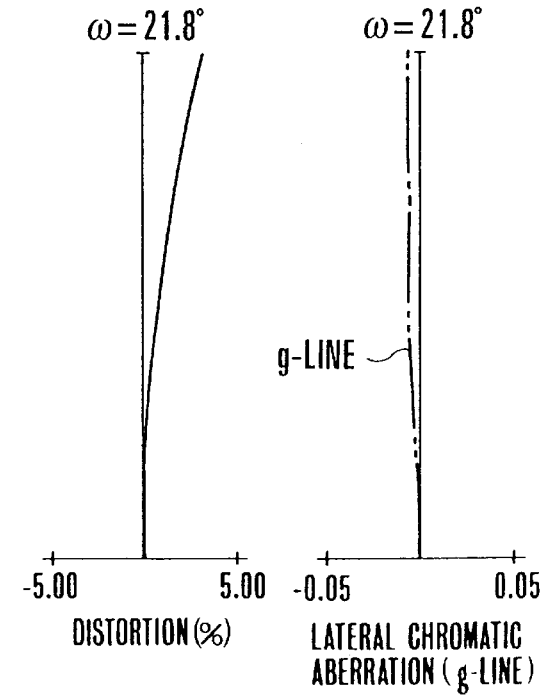
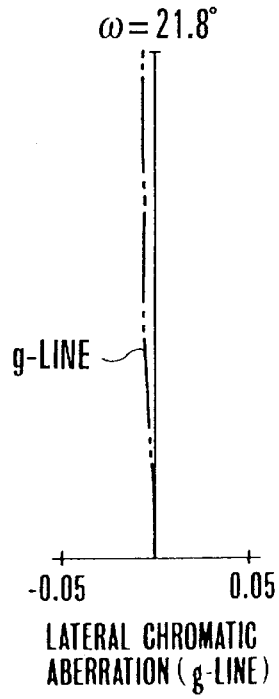
FIG. 95A  FIG. 95B  FIG. 95C  FIG. 95D

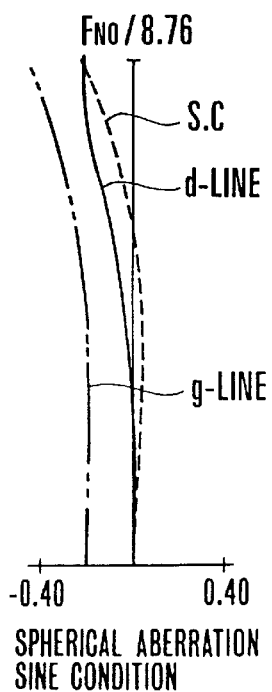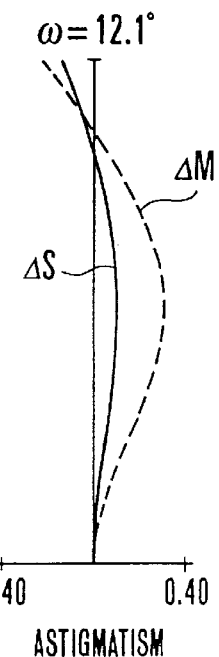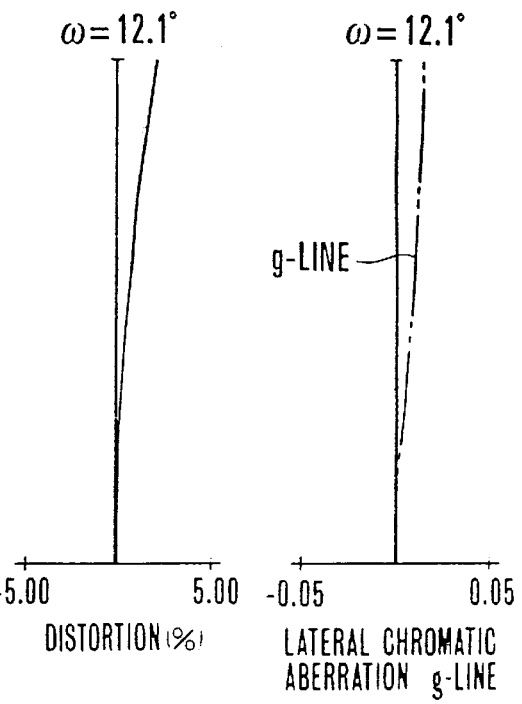

ZOOM LENS

This application is a division of Application Ser. No. 08/892,878 filed Jul. 15, 1997 now U.S. Pat. No. 6,028,716, which is a continuation of Application Ser. No. 08/348,816 filed Nov. 28, 1994, now abandoned.

BACKGROUND OF THE INVENTION

1. Field of the Invention

This invention relates to zoom lenses suited to be used in photographic cameras for 35 mm film, video cameras or still video cameras and, more particularly, to wide-angle high range zoom lenses. Still more particularly, it relates to improvements of the compact form of the entire lens system along with high optical performance by setting forth appropriate rules of design for the construction and arrangement of the constituent lenses in each of the lens groups and by applying aspheric surfaces of appropriate shapes to prescribed lens surfaces.

2. Description of the Related Art

It has been known to provide a zoom lens in which the leading lens group is negative in the refractive power as one of the zoom types. This so-called "negative lead" type is relatively feasible for widening the angle of field and has found its use in many wide-angle zoom lenses of not less than 70° in the maximum angle of field.

For example, Japanese Patent Publication No. Sho 59-16248 proposes a zoom lens having a first group of negative refractive power and a second group of positive refractive power, totaling two lens groups, wherein zooming is performed by varying the separation between these two groups. This is usually called the "short" zoom lens.

Other Japanese Laid-Open Patent Applications Nos. Hei 2-72316 and Hei 3-233422 propose 3-group wide-angle zoom lenses of which the first group, when counted from the object side, is of negative refractive power, the second group is of positive refractive power and the third group is of negative refractive power, wherein these groups are all made movable for zooming.

Another Japanese Laid-Open Patent Application No. Hei 2-72316 proposes a 4-group zoom lens of which the first group, when counted from the object side, is of negative refractive power, the second group is of positive refractive power, the third group is of positive refractive power and the fourth group is of negative refractive power, wherein these four groups are all made movable for zooming.

Meanwhile, as another zoom type, there has been known a zoom lens comprising, from front to rear, a first group of positive refractive power and a second group of negative refractive power, totaling two lens groups, both of which are made movable for zooming. Such a so-called 2-group zoom type is feasible for minimizing the bulk and size of the entire lens system, so that it has been used in many leaf shutter cameras or like compact cameras. Since, in the 2-group zoom type, all the function of varying the focal length is laid on only one lens group (that is, the second group), many zoom lenses of this type have their ranges limited to 1.6 to 2 or thereabout. If the 2-group type is applied to form a zoom lens of too much increased range, the lens system suffers from a rapid increase of the size. Moreover, it becomes difficult to keep the optical performance at a high level.

With the 2-group zoom lens, the first group may be divided into two parts of positive refractive powers. The total number of lens groups amounts to 3 and the plus-plus-minus refractive power arrangement is thus formed to aim at a great increase of the range. Such a 3-group zoom type is proposed in, for example, Japanese Laid-Open Patent Applications Nos. Hei 3-73907, Hei 3-282409, Hei 4-37810 and Hei 4-76511.

When the 3-group type is applied to achieve a zoom lens of wider maximum semi-angle of field than 35°, the entrance pupil is caused to vary its position to a larger extent with zooming. For the range to increase, therefore, it becomes difficult to suppress the variation of aberrations with zooming to a minimum.

In general, zoom lenses of the negative lead type are relatively easily amenable to widen the angle of field. However, to fulfill the requirements of increasing the maximum angle of field to more than 70° and of obtaining good optical image quality over the entire area of the image frame at once, there is a need to find out appropriate rules of design for the refractive power arrangement of all the lens groups and the forms of the constituent members in the lens groups. If the refractive power arrangement of the lens groups and their forms are inappropriate, the variation of aberrations with zooming increases so greatly that good stability of high optical performance is hardly maintained throughout the entire zooming range, no matter how many constituent lenses may be used.

For a zoom lens to have not only wider angles of field, but also an increased range, the use of aspheric surfaces is very effective to achieve minimization of the size of the entire lens system and improvement of the optical performance. In this regard, however, to make a determination of what lens surfaces to select for introduction of an aspheric surface is very important, since it is depending on this that the aspheric surfaces produce greatly different effects of correcting aberrations. If the aspheric sphere is not introduced into the appropriate lens surface, effective correction of aberrations becomes difficult to do.

For example, the before-mentioned Japanese Laid-Open Patent Applications Nos. Hei 3-282409, Hei 4-37810 and Hei 4-76511 show that the positive lens in the second lens unit is selected to introduce an aspheric surface of such shape that the positive refractive power gets progressively weaker as the distance from the optical axis increases. In any of these zoom lenses, the selected one of the lens surface for introduction of the aspheric surface takes its place at a considerable axial distance from the stop so that the height of incidence of either the on-axial ray or the off-axial ray on that selected lens surface differs with different focal lengths. This phenomenon is used to correct the variation of aberrations. However, as the maximum angle of field widens and the range also increases, the ranges of variation of spherical aberration, for example, and of off-axial aberrations are caused to increase greatly. So, it becomes difficult for this aspheric surface to correct these aberrations simultaneously.

U.S. Patent No. 5,069,536 discloses a 3-group zoom lens of plus-plus-minus power arrangement, wherein an aspheric surface is introduced into that lens surface in the second lens unit of positive refractive power which lies near the stop, is concave toward the object side and has a negative refracting function. However, if, in this zoom lens, a widening of the maximum angle of field and a great increase of the range are to be achieved, the total zooming movement of each of the lens groups increases rapidly and also the front lens members in the first lens group get a large diameter. Thus, a long bulky lens system results. Moreover, as the refractive power of each of the lens groups is strengthened, the range of variation of aberrations increases, which is difficult to correct well by that aspheric surface.

Japanese Laid-Open Patent Application No. Hei 3-49614 shows a wide-angle high range zoom lens comprising four lens groups of plus-plus-plus-minus refractive power arrangement, or four lens groups of plus-minus-plus-minus refractive power arrangement. However, the total number of constituent lenses is too large and the aspheric surface does not effect sufficient results.

Japanese Laid-Open Patent Application No. Hei 3-73907 shows a zoom lens comprising three lens groups of plus-plus-minus refractive power arrangement, wherein at least that positive lens in the second lens group of positive refractive power which lies near-the stop is selected to introduce an aspheric surface of such shape that the positive refractive power gets progressively weaker as the height from the optical axis increases. With the help of this, a wide-angle zoom lens is achieved. However, the second group has a large number of lens elements and the aspheric surface in the same lens group does not sufficiently contribute to improvements of the compact form.

Japanese Laid-Open Patent Application No. Hei 3-233422 shows a zoom lens comprising three lens groups of minus-plus-minus refractive power arrangement, wherein a plurality of aspheric surfaces are used in the third lens group. However, the optical total length is of the order of 66 mm even at the wide-angle end. So, it can hardly be said that the total length of the whole lens system is short. Moreover, if a further widening of the maximum angle of field is done, good correction of aberrations is difficult to perform over the entire zooming range.

SUMMARY OF THE INVENTION

The invention is applied to the zoom lens having a plurality of lens groups, for example, three in total, and sets forth rules for selection of an appropriate lens group or lens surface to which an aspheric surface is applied. Thus, the aberrations which would come to be a problem when the maximum angle of field widens and the zooming range increases are corrected well. It is, therefore, an object of the invention to provide a zoom lens which is improved in the compact form of the entire lens system, while still permitting maintenance of high optical performance throughout the entire zooming range to be achieved.

Another object of the invention is to provide a wide-angle high range zoom lens employing the "rear" focusing method. As the zooming movements of the lens groups and the paraxial refractive power arrangements are made appropriate, good stability of optical performance is maintained against zooming from the wide-angle end to the telephoto end, or throughout the entire zooming range, and against focusing to suit from infinity to the minimum object distance, or throughout the entire focusing range.

In application of the invention to the zoom lens comprising four lens groups in total, proper rules of design for the lens groups are set forth and the contributions of the lens groups to the variation of the focal length are made appropriate to obtain high optical performance throughout the entire zooming range when the maximum angle of field increases to 74° or so and the range increases to 3.5 or so.

A zoom lens of the invention comprises, from front to rear, a first lens group of negative refractive power, a second lens group of positive refractive power and a third lens group of negative refractive power, a separation between each adjacent two of the lens groups being varied to effect zooming, wherein letting the heights of incidence of an on-axial ray of light on the i-th surface for the wide-angle and telephoto ends with an object at infinity be denoted by Hiw (Hiw>0) and Hit (Hit>0), respectively, and letting the heights of incidence of an off-axial principal ray of light from the maximum angle of field on the i-th surface for the wide-angle and telephoto ends be denoted by Hbiw and Hbit, respectively, an aspheric surface is applied to a lens surface which lens surface is concave toward the object side and which lens surface is negative in the refracting power and which satisfies the following conditions:

$$Hiw > |Hbiw| \quad (1)$$

$$Hiw > |Hbit| \quad (2)$$

and the aspheric surface is formed to such shape that the negative refractive power gets progressively stronger from the lens center toward the lens margin.

Another zoom lens of the invention comprises a first lens group whose overall refractive power for the wide angle end is positive and a second lens group of negative refractive power, a separation between the first and second lens groups being varied to vary the focal length, wherein the second lens group has a first lens unit of negative refractive power and a second lens unit of negative refractive power, a separation between the first and second lens units being varied for focusing.

Still another zoom lens of the invention has a first lens group which, in the wide-angle end, takes a negative refractive power, a second lens group which takes a positive refractive power, a third lens group which takes a positive refractive power and a fourth lens group which takes a negative refractive power, a separation between each adjacent two of the lens groups being varied for zooming, wherein letting the lateral magnifications for the wide-angle and telephoto ends of the i-th lens group (i≧2) be denoted by βiW and βiT, respectively, and putting the magnification ratio Δβi of the i-th lens group to be $$\Delta\beta i = |\beta iT/\beta iW|$$

the second lens group has the greatest magnification ratio among the lens groups of positive refractive powers under the condition of Δβi>1 and includes a three-cemented lens having a positive overall refractive power and composed of either two positive lenses or two negative lenses and one lens having a refractive power opposite thereto in cemented contact form.

BRIEF DESCRIPTION OF THE DRAWINGS

FIGS. 11A–11D are graphic representations of the aberrations of the numerical example 1 of the invention in the wide-angle end.

FIGS. 12A–12D are graphic representations of the aberrations of the numerical example 1 of the invention in a middle position.

FIGS. 21A–21D are graphic representations of the aberrations of the numerical example 4 of the invention in a middle position.

FIGS. 22A–22D are graphic representations of the aberrations of the numerical example 4 of the invention in the telephoto end.

FIGS. 23A–23D are graphic representations of the aberrations of the numerical example 5 of the invention in the wide-angle end.

FIGS. 24A–24D are graphic representations of the aberrations of the numerical example 5 of the invention in a middle position.

FIGS. 26(A) and 26(B) are diagrams of geometry to explain the aspheric surface relevant to the zoom lens of the invention.

FIGS. 35A–35D are graphic representations of the aberrations of the numerical example 6 of the invention in the wide-angle end with an object at 800 mm from the image plane.

FIGS. 36A–36D are graphic representations of the aberrations of the numerical example 6 of the invention in the middle position with an object at 800 mm from the image plane.

FIGS. 37A–37D are graphic representations of the aberrations of the numerical example 6 of the invention in the telephoto end with an object at 800 mm from the image plane.

FIGS. 38A–38D are graphic representations of the aberrations of the numerical example 7 of the invention in the wide-angle end with an object at infinity.

FIGS. 39A–39D are graphic representations of the aberrations of the numerical example 7 of the invention in a middle position with an object at infinity.

FIGS. 40A–40D are graphic representations of the aberrations of the numerical example 7 of the invention in the telephoto end with an object at infinity.

FIGS. 41A–41D are graphic representations of the aberrations of the numerical example 7 of the invention in the wide-angle end with an object at 800 mm from the image plane.

FIGS. 42A–42D are graphic representations of the aberrations of the numerical example 7 of the invention in the middle position with an object at 800 mm from the image plane.

FIGS. 43A–43D are graphic representations of the aberrations of the numerical example 7 of the invention in the telephoto end with an object at 800 mm from the image plane.

FIGS. 44A–44D are graphic representations of the aberrations of the numerical example 7 of the invention in the wide-angle end when focused to 800 mm from the image plane by moving the lens unit L21 and the lens unit L22 to respective distances of 1:0.5.

FIGS. 57A–57D are graphic representations of the aberrations of the numerical example 9 of the invention in the middle position with an object at 800 mm from the image plane.

FIGS. 58A–58D are graphic representations of the aberrations of the numerical example 9 of the invention in the telephoto end with an object at 800 mm from the image plane.

FIGS. 76A–76D are graphic representations of the aberrations of the numerical example 11 of the invention in the wide-angle end.

FIGS. 77A–77D are graphic representations of the aberrations of the numerical example 11 of the invention in a middle position.

FIGS. 78A–78D are graphic representations of the aberrations of the numerical example 11 of the invention in the telephoto end.

FIGS. 79A–79D are graphic representations of the aberrations of the numerical example 12 of the invention in the wide-angle end.

FIGS. 80A–80D are graphic representations of the aberrations of the numerical example 12 of the invention in a middle position.

FIGS. 81A–81D are graphic representations of the aberrations of the numerical example 12 of the invention in the telephoto end.

FIGS. 84A–84D are graphic representations of the aberrations of the numerical example 13 of the invention in the telephoto end.

FIGS. 85A–85D are graphic representations of the aberrations of the numerical example 14 of the invention in the wide-angle end.

FIGS. 86A–86D are graphic representations of the aberrations of the numerical example 14 of the invention in a middle position.

FIGS. 87A–87D are graphic representations of the aberrations of the numerical example 14 of the invention in the telephoto end.

FIGS. 90A–90D are graphic representations of the aberrations of the numerical example 15 of the invention in the telephoto end.

FIGS. 91A–91D are graphic representations of the aberrations of the numerical example 16 of the invention in the wide-angle end.

FIGS. 94A–94D are graphic representations of the aberrations of the numerical example 17 of the invention in the wide-angle end.

FIGS. 95A–95D are graphic representations of the aberrations of the numerical example 17 of the invention in a middle position.

FIGS. 96A–96D are graphic representations of the aberrations of the numerical example 17 of the invention in the telephoto end.

Figure 1:
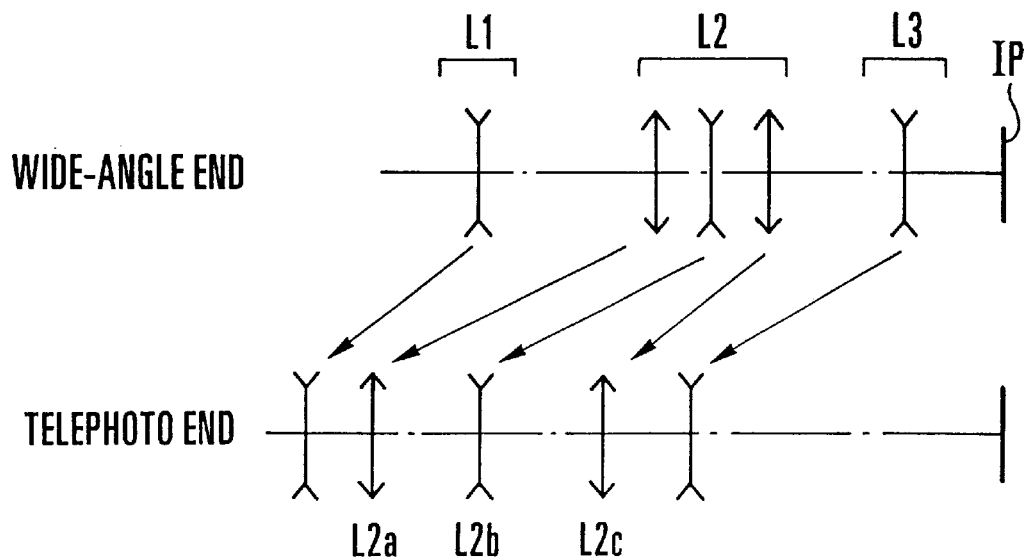
FIG. 1 is a diagram to explain the paraxial refractive power arrangements of a numerical example 1 of the invention.

In these drawings, L1 denotes the first lens group, L2 the second lens group, L3 the third lens group, and L4 the fourth lens group. SP stands for the stop and SPP for the fixed stop. IP denotes the image plane. d represents the spectral d-line, g the spectral g-line, S.C the sine condition, ΔS the sagittal image surface, and ΔM the meridional image surface.

DETAILED DESCRIPTION OF THE PREFERRED EMBODIMENTS

FIG. 1 to FIG. 5 are schematic diagrams showing the variations with zooming of the paraxial refractive power arrangements for the numerical examples 1 to 5 of zoom lenses of the invention. FIG. 6 to FIG. 10 are longitudinal section views of the numerical examples 1 to 5 of the zoom lenses of the invention in the wide-angle end. FIG. 11A to FIG. 13D show the aberrations of the zoom lens of the numerical example 1 of the invention in the wide-angle end, a middle position and the telephoto end, respectively. FIG. 14A to FIG. 16D show the aberrations of the numerical example 2 of the invention in the wide-angle end, a middle position and the telephoto end, respectively. FIG. 17A to FIG. 19D show the aberrations of the numerical example 3 of the invention in the wide-angle end, a middle position and the telephoto end, respectively. FIG. 20A to FIG. 22D show the aberrations of the numerical example 4 of the invention in the wide-angle end, a middle position and the telephoto end, respectively. FIG. 23A to FIG. 25D show the aberrations of the numerical example 5 of the invention in the wide-angle end, a middle position and the telephoto end, respectively.

In these drawings, L1 is the first lens group of negative refractive power, L2 is the second lens group of positive refractive power, L3 is the third lens group of negative refractive power, SP is the aperture stop, and IP is the image plane.

A zoom lens of the invention comprises a plurality of lens groups. In the numerical examples 1 to 5 of FIG. 1 to FIG. 5, however, for the purpose of convenience, the total number of lens groups is limited to 3, so that the entire system comprises a first lens group L1 of negative refractive power, a second lens group L2 of positive refractive power and a third lens group L3 of negative refractive power. Then, a fundamental rule is set forth that all these lens groups, when zooming from the wide-angle end to the telephoto end, axially move in such relation that the separations between the first lens group L1 and the second lens group L2 and between the second lens group L2 and the third lens group L3 vary as indicated by the arrows.

In addition, as the zoom lens is constructed with such a plurality of lens groups, aspheric surface of prescribed shape is applied to a lens surface which satisfies the conditions (1) and (2) described before, thereby giving an advantage that despite the widening of the maximum angle of field and the increasing of the zooming range, the variation of aberrations is well corrected to obtain high optical performance throughout the entire zooming range.

Next, the features of the design for the zoom lens which are characteristic of the invention are described below.

A zoom lens of the invention comprises, from front to rear, as in the wide-angle end, a first lens group L1 whose overall refractive power is negative, followed, after a considerable space, by a second lens group L2 whose overall refractive power is positive, which in turn is followed, after a considerable space, by a third lens group L3 whose overall refractive power is negative. By taking such a symmetric, or minus-plus-minus, refractive power arrangement in the wide-angle end, it is made possible to strengthen the refractive power for the second lens group L2. With the help of this, the widening of the maximum angle of field and the minimizing of the bulk and size are achieved in such a manner as to correct well all aberrations.

Another feature is that the first lens group L1 of negative overall refractive power and the second lens group L2 of positive overall refractive power are considerably spaced apart from each other, thus taking the form of the retrofocus type. This makes it easy to secure the back focal distance, which would otherwise become a problem when widening the maximum angle of field. The second lens group L2 is then constructed as comprising, from front to rear, a front lens unit L2a of positive refractive power, a middle lens unit L2b of negative refractive power and a rear lens unit L2c of positive refractive power, the arrangement being such that when zooming to the wide-angle end, they approach each other. When in the wide-angle end, they take a symmetric form, thus effectively correcting the aberrations that the second lens group L2 produces.

To fulfill the requirements of minimizing the bulk and size of the lens system and of increasing the range at once, it is necessary in the general case to strengthen the refractive power of each lens group and, at the same time, to remove as many constituent lenses from each lens group as possible. If this approach to the improvement of the compact form and the increase of the range is pushed, the difficulty of correcting the positive Lens groups for spherical aberration of the negative direction increases rapidly. In the invention, therefore, for the purpose of correcting such spherical aberration, aspheric surface is introduced into a lens surface on which the height of incidence of the off-axial light ray is smaller in the absolute value than the height of incidence of the on-axial light ray in the wide-angle end and the telephoto end and is concave toward the object side and negative in the refracting power.

In more detail, the lens surface which satisfies the conditions (1) and (2) simultaneously is selected to introduce the aspheric surface of such a shape that the negative refractive power gets progressively stronger as the distance from the optical axis increases. Mainly, the spherical aberration of the negative direction is thus corrected toward the positive direction.

Besides this, there is an advantage that, without giving too much influence to the variation of astigmatism with zooming, good correction of spherical aberration and coma is assured throughout the entire zooming range, so long as the provision of the aspheric sphere of prescribed shape is made in the lens surfaces whose parameters fall within the ranges that satisfy the conditions (1) and (2). When these conditions are violated, good correction of on-axial aberrations becomes difficult to do so effectively as not to greatly affect off-axial aberrations over the entire zooming range. It is also to be noted that the selection of the front surface of the negative lens which is concave toward the object side is desirable for introduction of the aspheric surface of the aforesaid shape, because, if so, it has much strong an effect of correcting spherical aberration.

FIGS. 26(A) and 26(B) are diagrams of geometry to explain the situations when the marginal ray of the axial beam and the principal ray of the off-axial beam enter a lens surface that satisfies the conditions (1) and (2).

Another feature is that when applying the aspheric surface to the lens surface which satisfies the conditions (1) and (2), it is preferable to first choose the second lens group L2 whose overall refractive power is positive, then its middle lens unit L2b and then a negative lens therein, because the variation of spherical aberration can be effectively corrected without giving too much influence to the variation of off-axial aberrations.

It will be appreciated from the foregoing that in the invention, at least one aspheric surface is introduced into the lens surface which satisfies the conditions (1) and (2) described before and is concave toward the object side and has a negative refracting function. Hence, the on-axial aberrations and the off-axial aberrations are corrected in good balance, while the increase of the range and the widening of the angular field are simultaneously achieved.

In the invention, focusing of the zoom lens is performed by using a desired one of those lens groups or lens units which do not take unity of lateral magnification during zooming. If the first lens group L1 includes a lens unit whose refractive power is considerably strong, it is recommended to use this lens unit for focusing. In this case, for any object distance, the focusing movement can be kept constant throughout the entire zooming range. So, a simplification of the structure of the operating mechanism can be expected.

If the back focal distance is sufficiently long in the wide-angle end, the last lens group or unit has a negative refractive power and this refractive power is considerably strong, then this last lens group or unit may be moved toward the image side. In this case, reduction of the outer diameter of the first lens group can be expected. Of the first to the last lens groups, two or more lens groups or units may be moved simultaneously. If the focusing lens group or unit contains the stop, it is preferred to keep the stop axially stationary during focusing, because the driving torque can be reduced by the amount necessary to move the diaphragm mechanism.

The features of each of the zoom lenses shown in FIG. 1 to FIG. 5 are described below.

FIG. 1 shows the paraxial refractive power arrangements of the numerical example 1 of the invention. In FIG. 1, the first lens group L1 is constructed with one lens unit (L1) having a negative refractive power. The second lens group L2 is constructed with three lens units, of which the front lens unit (L2a), as viewed to the object side, is of positive refractive power, the middle lens unit (L2b) is of negative refractive power and the rear lens unit (L2c) is of positive refractive power. The third lens group L3 is constructed with one lens unit (L3) having a negative refractive power.

The separation between the first lens group L1 and the front lens unit L2a is made smaller when in the telephoto end than when in the wide-angle end. As will be understood from an equation (9) to be described later, the first lens group L1 and the front lens unit L2a in combination with each other thus gets a weaker overall refractive power (longer overall focal length). As a result, the front lens unit L2a and the third lens group L3 function to increase the magnification. By this, the zooming range is extended toward the telephoto side with high efficiency, giving an advantage of increasing the range. Again, when in the telephoto end, the separation between the middle lens unit L2b and the rear lens unit L2c is made longer, so that the off-axial light ray passes through the rear lens unit L2c at a farther position away from the optical axis. Thus, on-axial aberrations and off-axial aberrations are corrected in good balance.

Figure 2:
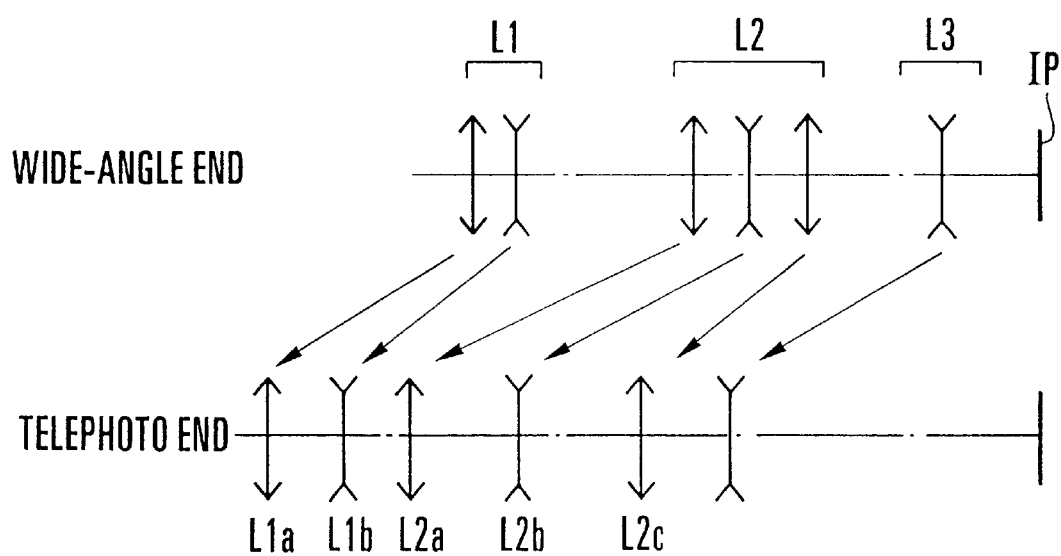
FIG. 2 is a diagram to explain the paraxial refractive power arrangements in a numerical example 2 of the invention.

FIG. 2 shows the paraxial refractive power arrangements of the numerical example 2 of the invention. In FIG. 2, the first lens group is constructed with two lens units, of which the front lens unit (L1a), as viewed to the object side, is of positive refractive power and the rear lens unit (L1b) is of negative refractive power. The second lens group L2 is constructed with three lens units, of which the front lens unit (L2a), as viewed to the object side, is of positive refractive power, the middle lens unit (L2b) is of negative refractive power and the rear lens unit (L2c) is of positive refractive power. The third lens group L3 is constructed with one lens unit (L3) of negative refractive prower.

For the wide-angle end, the first lens group L1 and the second lens group L2 are arranged in considerably spaced relation. As a result, the first lens group L1 and the second lens group L2 take the form of the retrofocus type. By this, it is made easier to secure the back focal distance, which becomes a problem when to widen the angle of field. Another feature is that the separation between the rear lens unit L1b and the front lens unit L2a and the separation between the rear lens unit L2c and the third lens group L3 are made shorter when in the telephoto end than when in the wide-angle end. As is understandable from the equation (9), the lens units L1b and L2a or the unit L2c and the group L3 in combination with each other thus gets a weaker overall refractive power (longer overall focal length). As a result, the middle lens unit L2b and the third lens group L3 produce an effect of increasing the magnification. This increases the efficiency with which the zooming range is extended toward the telephoto side, thereby making it easier to increase the range. When in the wide-angle end, the separation between the front lens unit L1a and the rear lens unit L1b is made shorter to correct well particularly the negative distortion that is produced from the rear lens unit L1b when the maximum angle of field widens.

Figure 3:
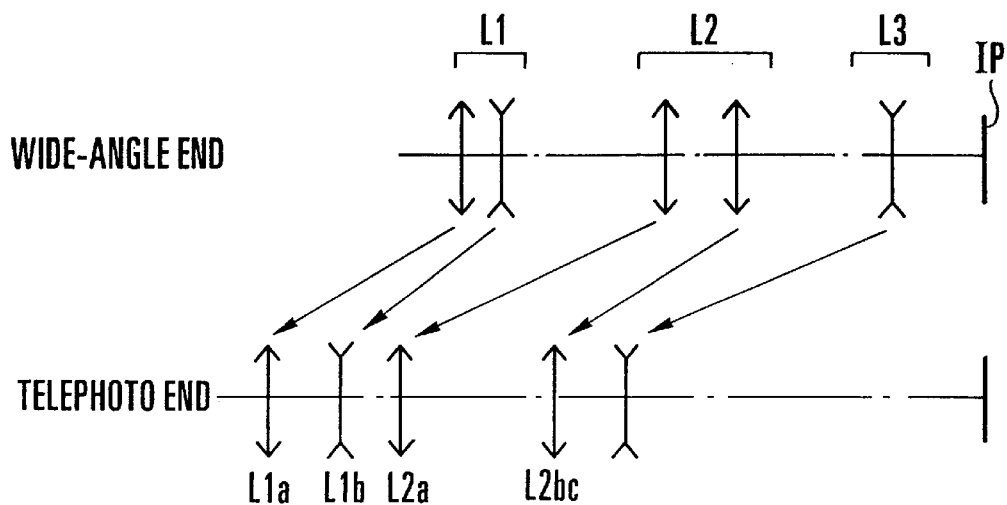
FIG. 3 is a diagram to explain the paraxial refractive power arrangements in a numerical example 3 of the invention.

FIG. 3 shows the paraxial refractive power arrangements of the numerical example 3 of the invention. In FIG. 3, the first lens group L1 is constructed with two lens units, of which the front lens unit (L1a), as viewed to the object side, is of positive refractive power and the rear lens unit (L1b) is of negative refractive power. The second lens group L2 is constructed with three lens units, of which the front lens unit (L2a), as viewed to the object side, is of positive refractive power, the middle lens unit (L2b) is of negative refractive power, and the rear lens unit (L2c) is of positive refractive power. The third lens group L3 is constructed with one lens unit (L3) having a negative refractive power. Notice that the middle lens unit L2b and the rear lens unit L2c move in unison during zooming, so they are depicted in FIG. 3 as one lens unit L2bc of positive overall refractive power.

In here, the separation between the front lens unit L1a and the rear lens unit L1b is made longer and the separation between the rear lens unit L1*b* and the front lens unit L2*a* is made shorter when in the telephoto end than when in the wide-angle end. With this, when in the wide-angle end, negative distortion is corrected. When in the telephoto end, as they form the telephoto type, the total length of the complete lens is shortened.

Figure 4:
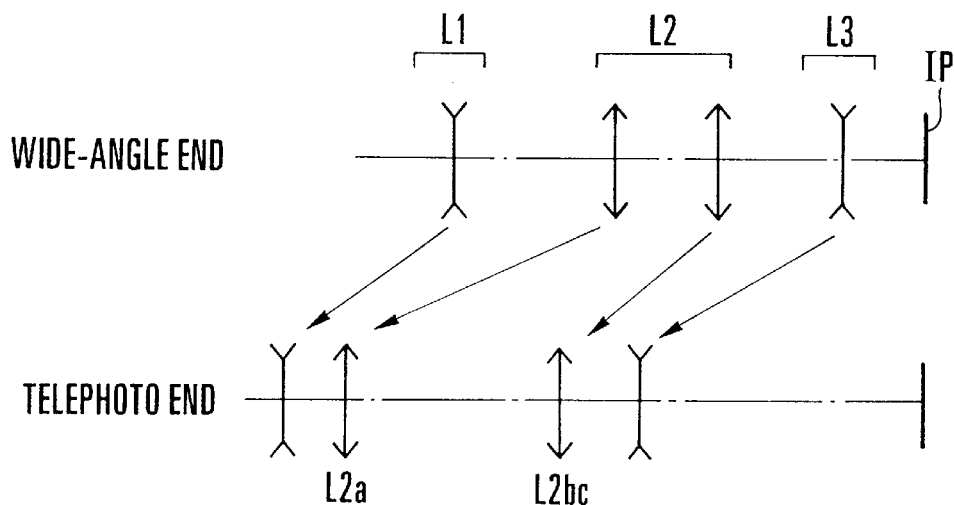
FIG. 4 is a diagram to explain the paraxial refractive power arrangements in a numerical example 4 of the invention.

FIG. 4 shows the paraxial refractive power arrangements of the numerical example 4 of the invention. In FIG. 4, the first lens group L1 is constructed with one lens unit (L1) having a negative refractive power. The second lens group L2 is constructed with three lens units, of which the front lens unit (L2*a*), as viewed to the object side, is of positive refractive power, the middle lens unit (L2*b*) is of negative refractive power and the rear lens unit (L2C) is of positive refractive power. The third lens unit L3 is constructed with one lens unit (L3) having a negative refractive power. Notice that the middle lens unit L2*b* and the rear lens unit L2*c* move in unison during zooming, so that they are depicted in FIG. 4 as one lens unit L2*bc* whose overall refractive power is positive.

The separation between the first lens group L1 and the front lens unit L2*a* and the separation between the combined lens unit L2*bc* and the third lens group L3 are made shorter when in the telephoto end than when in the wide-angle end. With this, the lens system as a whole keeps the symmetric form during zooming, thereby making it easier to obtain good optical performance. Moreover, when in the wide-angle end, the entire lens system gets a shorter total length.

Figure 5:
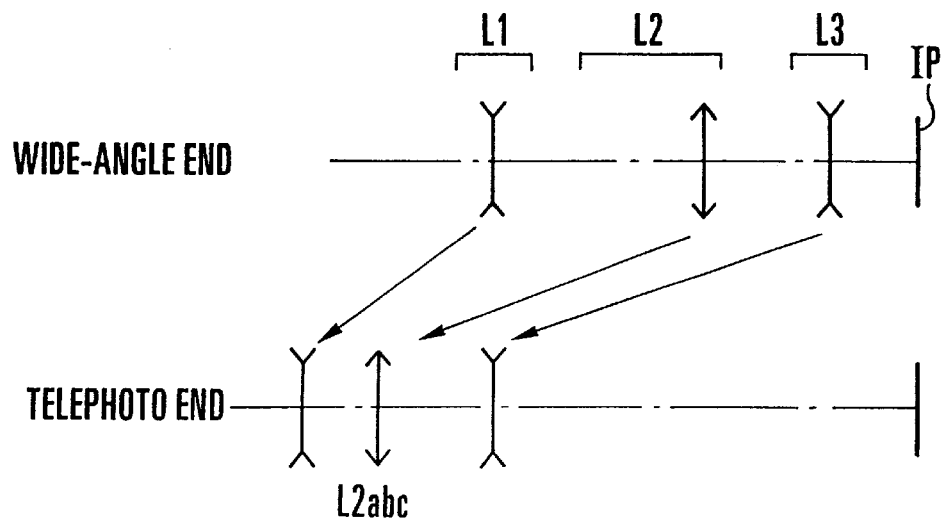
FIG. 5 is a diagram to explain the paraxial refractive power arrangements in a numerical example 5 of the invention.
Figure 6:
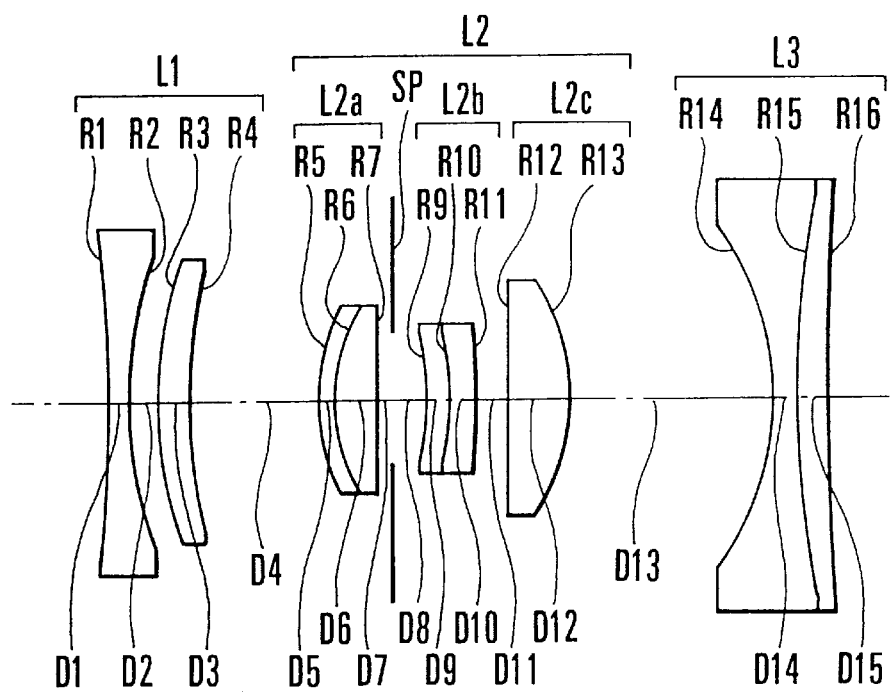
FIG. 6 is a lens block diagram of the numerical example 1 of the invention in the wide-angle end.
Figure 7:
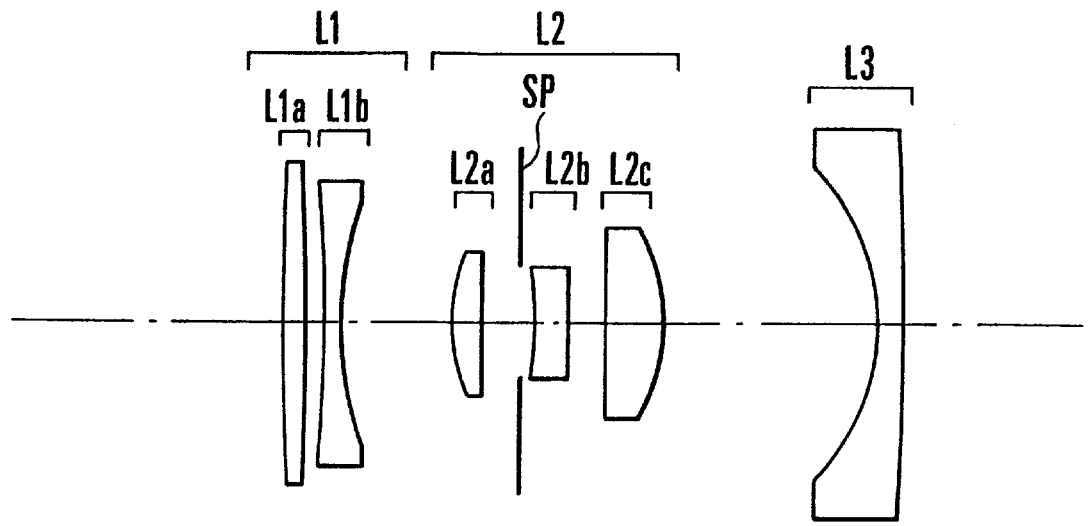
FIG. 7 is a lens block diagram of the numerical example 2 of the invention in the wide-angle end.
Figure 8:
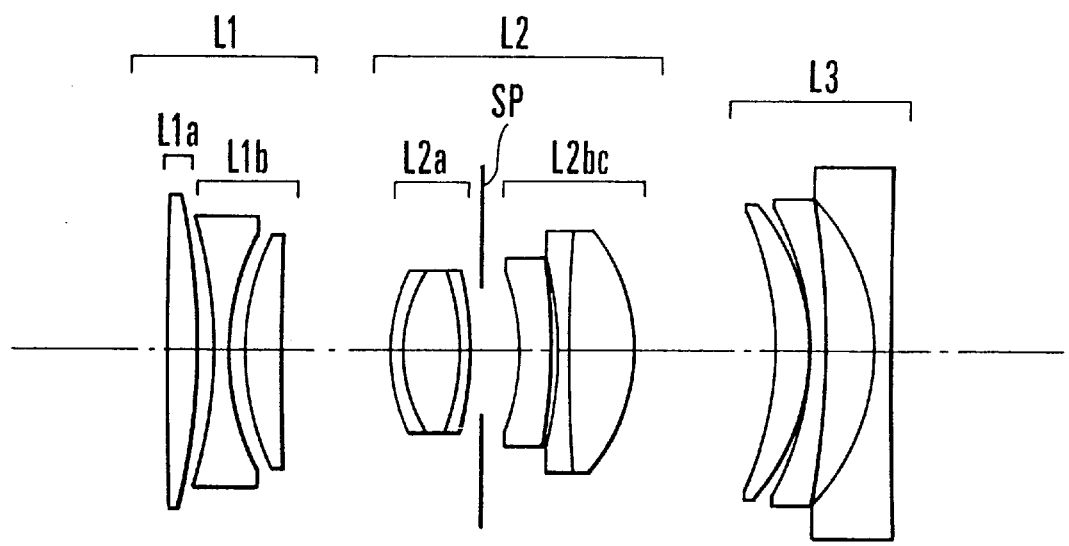
FIG. 8 is a lens block diagram of the numerical example 3 of the invention in the wide-angle end.
Figure 9:
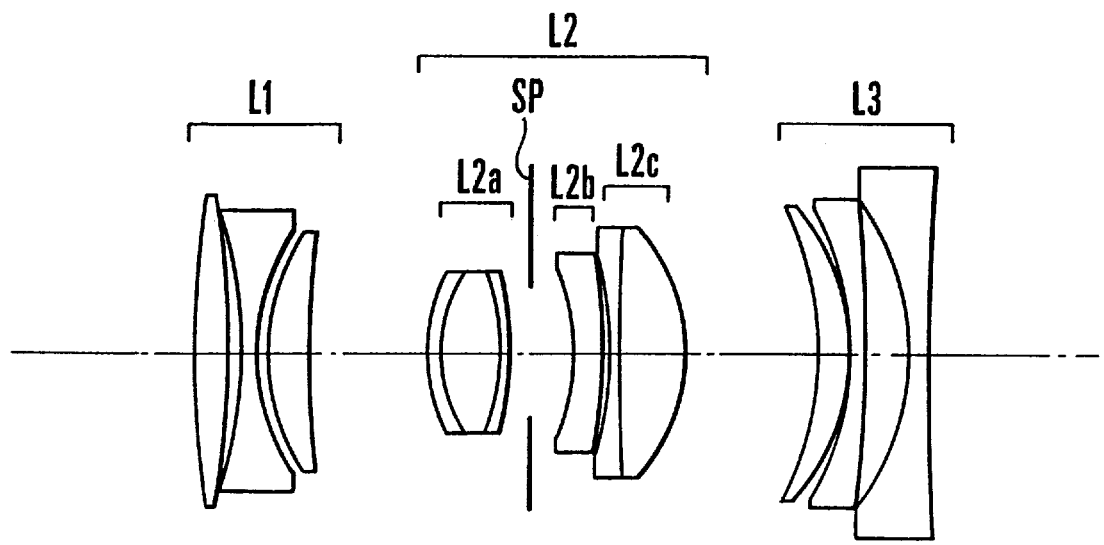
FIG. 9 is a lens block diagram of the numerical example 4 of the invention in the wide-angle end.
Figure 10:
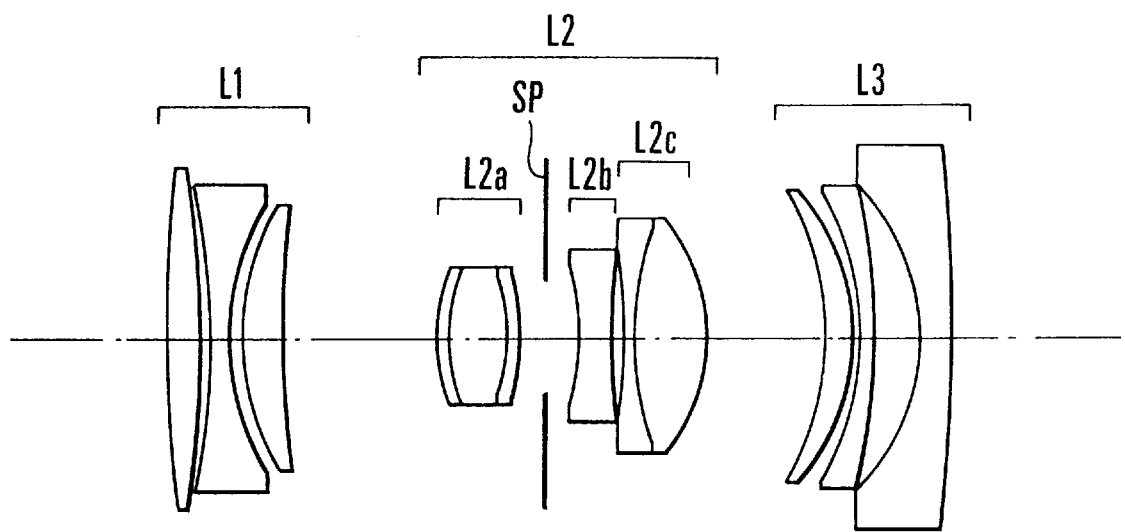
FIG. 10 is a lens block diagram of the numerical example 5 of the invention in the wide-angle end.
Figure 13A:
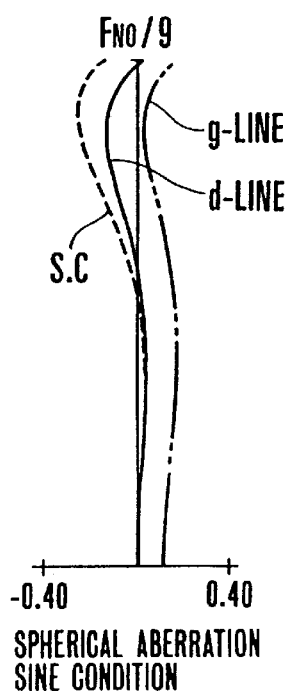
FIGS. 13A–13D are graphic representations to the aberrations of the numerical example 1 of the invention in the telephoto end.
Figure 13B:
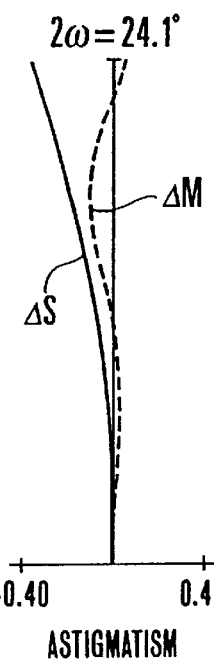
Figure 13C:
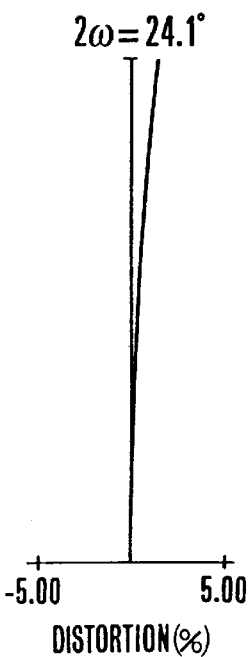
Figure 13D:
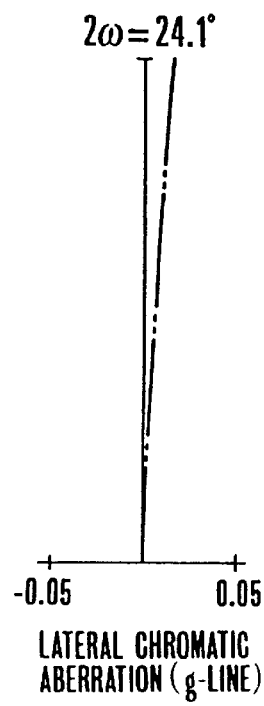
Figure 14A:
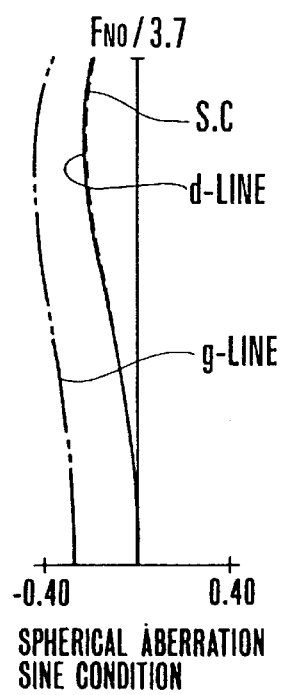
FIGS. 14A–14D are graphic representations of the aberrations of the numerical example 2 of the invention in the wide-angle end.
Figure 14B:
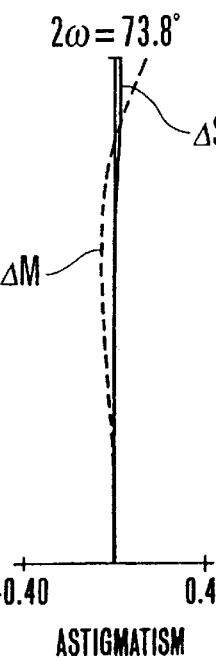
Figure 14C:
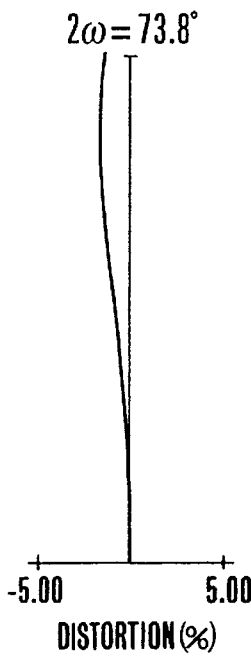
Figure 14D:
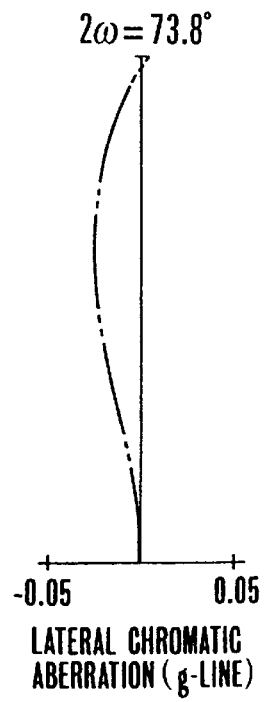
Figure 15A:
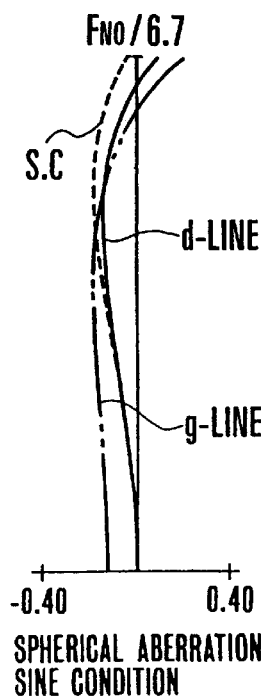
FIGS. 15A–15D are graphic representations of the aberrations of the numerical example 2 of the invention in a middle position.
Figure 15B:
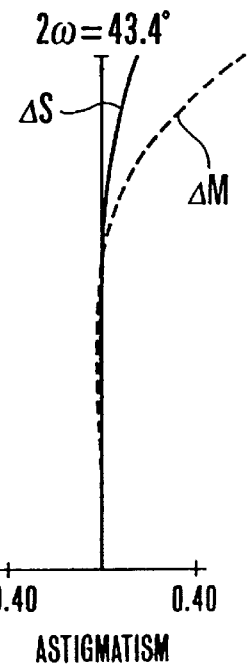
Figure 15C:
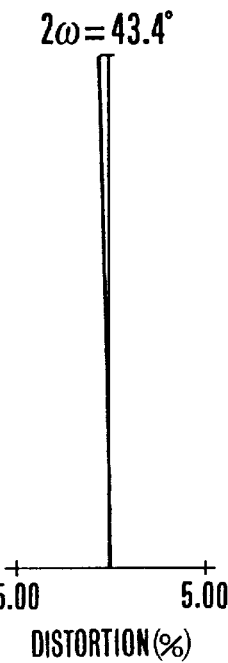
Figure 15D:
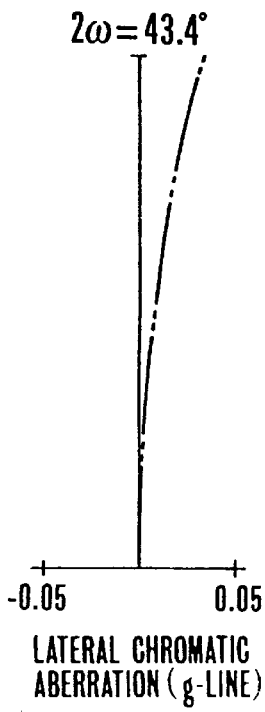
Figure 16A:
FIGS. 16A–16D are graphic representations of the aberrations of the numerical example 2 of the invention in the telephoto end.
Figure 16B:
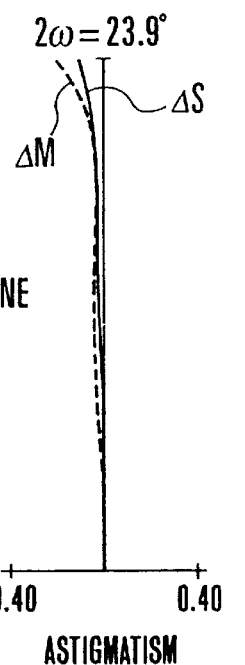
Figure 16C:
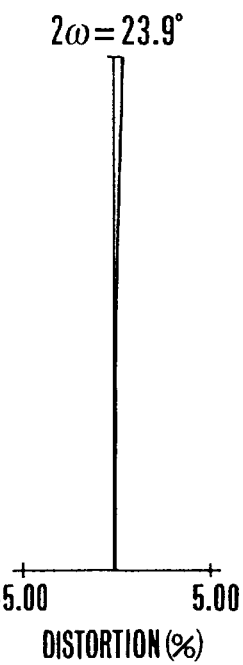
Figure 16D:
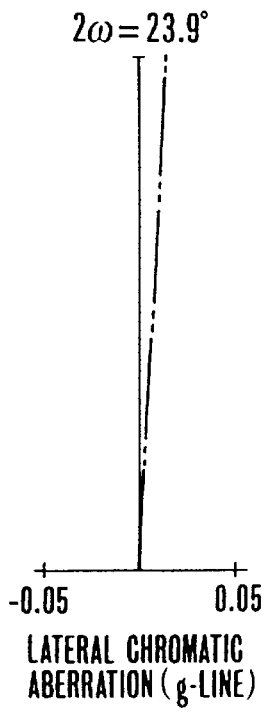
Figure 17A:
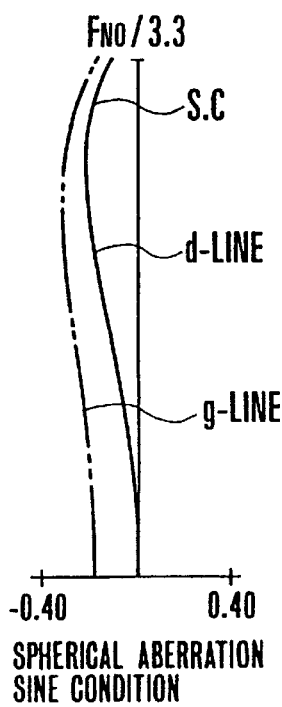
FIGS. 17A–17D are graphic representations of the aberrations of the numerical example 3 of the invention in the wide-angle end.
Figure 17B:
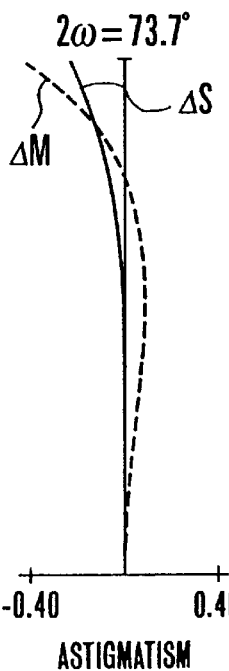
Figure 17C:
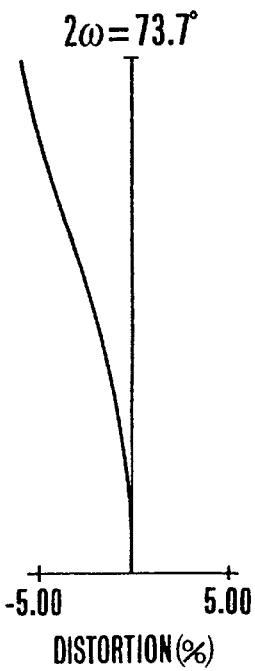
Figure 17D:
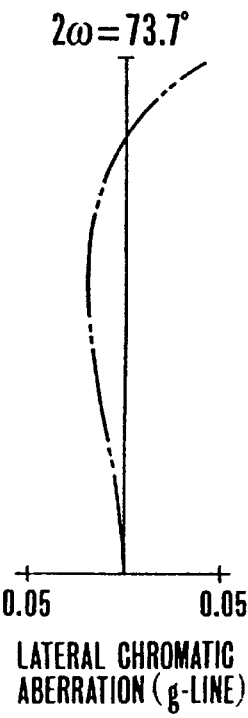
Figure 18A:
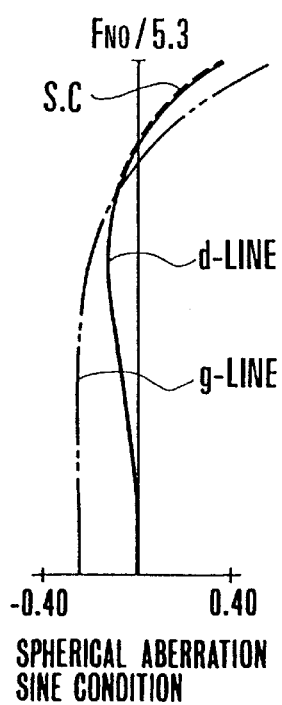
FIGS. 18A–18D are graphic representations of the aberrations of the numerical example 3 of the invention in a middle position.
Figure 18B:
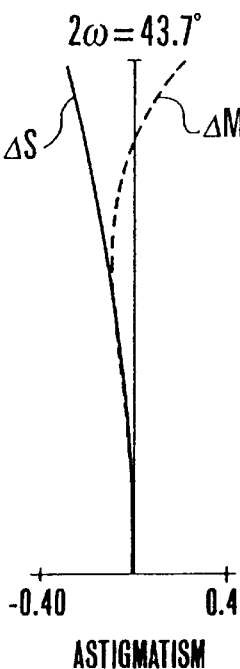
Figure 18C:
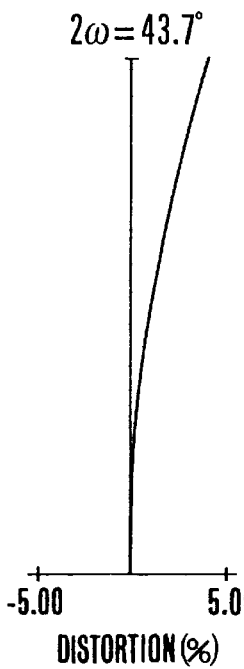
Figure 18D:
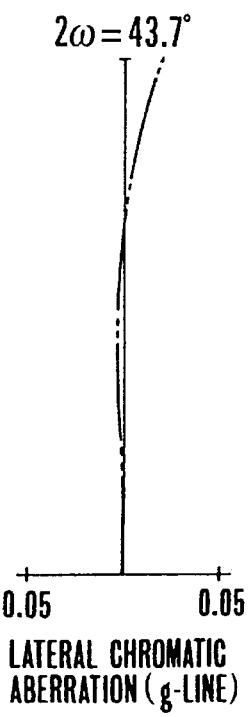
Figure 19A:
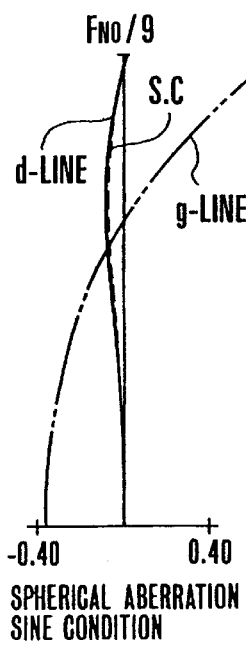
FIGS. 19A–19D are graphic representations of the aberrations of the numerical example 3 of the invention in the telephoto end.
Figure 19B:
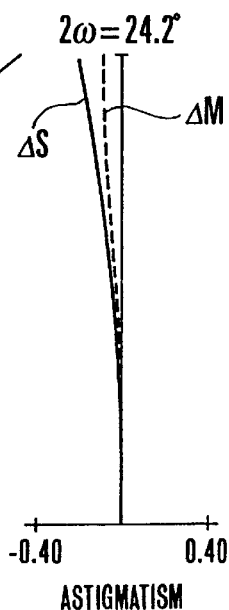
Figure 19C:
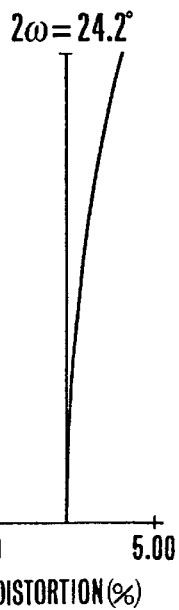
Figure 19D:
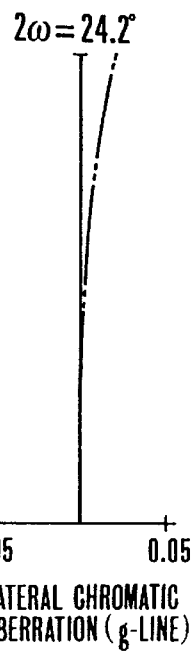
Figure 20A:
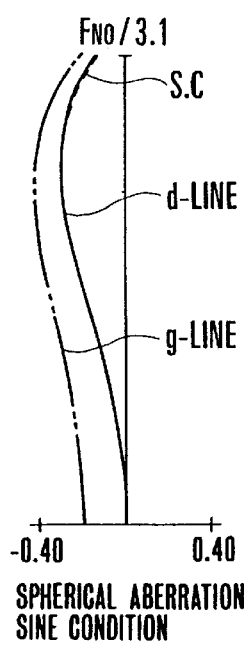
FIGS. 20A–20D are graphic representations of the aberrations of the numerical example 4 of the invention in the wide-angle end.
Figure 20B:
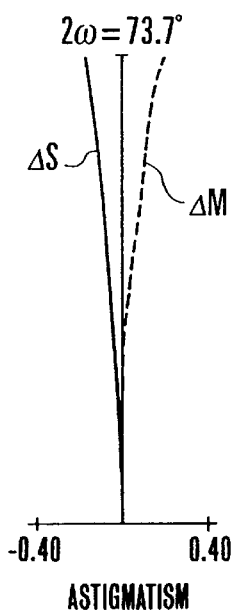
Figure 20C:
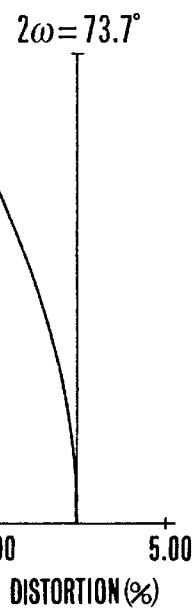
Figure 20D:
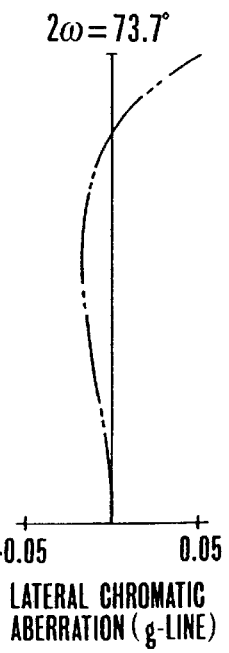
Figure 25A:
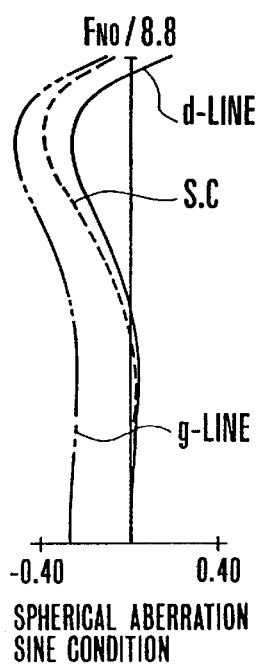
FIG. 25A–25D are graphic representations of the aberrations of the numerical example 5 of the invention in the telephoto end.
Figure 25B:
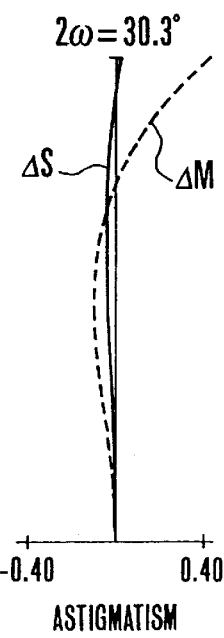
Figure 25C:
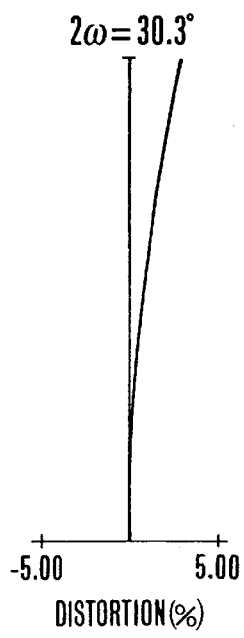
Figure 25D:
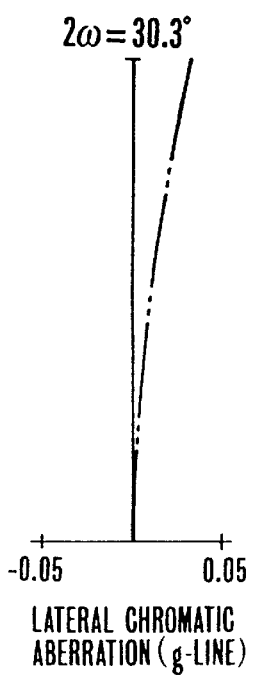

FIG. 5 shows the paraxial refractive power arrangements of the numerical example 5 of the invention. In FIG. 5, the first lens group L1 is constructed with one lens unit (L1) having a negative refractive power. The second lens group L2 is constructed with three lens units, of which the front lens unit (L2*a*), as viewed to the object side, is of positive refractive power, the middle lens unit (L2*b*) is of negative refractive power and the rear lens unit (L2*c*) is of positive refractive power. The third lens group L3 is constructed with one lens unit (L3) having a negative refractive power. Notice that the front lens unit L2*a*, the middle lens unit L2*b* and the rear lens unit L2*c* move in unison during zooming, so that they are depicted in FIG. 5 as one lens unit L2*abc* whose overall refractive power is positive.

When zooming from the wide-angle end to the telephoto end, all the lens groups axially move toward the object side in such relation that the separation between the first lens group L1 and the second lens group L2 and the separation between the second lens group L2 and the third lens gr oup L3 decrease. So, during zooming, the lens system as a whole keeps the symmetric form, thereby making it easier to obtain good optical performance. Along with this, variation of the focal length is performed effectively.

The features or conditions described above suffice for accomplishing the objects of the invention. To achieve further improvements of the compact form and optical performance of such a wide-angle high range zoom lens, the following additional features or conditions are then recommended.

(1-1) Letting the focal length of the third lens group be denoted by f3 and the shortest focal length of the entire system by Fw, the following condition is satisfied:

$$0.7 < |Fw/f3| \leq 2.5 \quad (3)$$

The equalities or inequalities (3) are concerned with the negative refractive power of the third lens group L3. When the upper limit is exceeded, as this means that the third lens group L3 has too strong a refractive power, the back focal distance becomes too short in the wide-angle end. Therefore, the third lens group L3 must have an unduly large diameter. Otherwise, the corner illumination could not be secured at a satisfactory level. When the refractive power of the third lens group L3 is too weak as exceeding the lower limit, the zooming movement of the third lens group L3 contributes to a weaker effect of varying the focal length. As a result, to secure the predetermined value of the zoom ratio, the zooming movements of the other lens groups must be increased. This increases the total length of the entire lens system objectionably.

(1-2) The stop is better positioned within the second lens group. It is also good that when zooming, the stop is made to axially move either. in unison with, or in differential relation to, the other lens groups. Incidentally, besides the interior of the second lens group, the stop may otherwise be positioned in the air space between the first lens group L1 and the second lens group L2. This latter case is desirable from the point of view of minimizing the lens diameter and improving the balance of aberration correction.

(1-3) The invention is not confined to the scope of the conditions (1) and (2) described before, when the aspheric surface is introduced. To further improve the aberration correction, an additional aspheric surface is better introduced into one of the other lens surfaces. For example, at least one negative lens in the third lens group L3 may be selected to introduce at least one aspheric surface. If so, it becomes possible to better correct the variation of mainly off-axial aberrations. Another additional aspheric surface may be introduced into the second lens group L2 except at that lens surface which was selected for the aspheric surface of principal interest described before. If so, off-axial aberrations can be corrected well. For example, that lens surface in the lens unit L2*c* which is convex toward the image side is better selected to introduce thereto an aspheric sphere of such shape that the positive refractive power gets progressively weaker as the height from the optical axis increases. If an aspheric surface is introduced into the first lens group L1, mainly distortion becomes easy to correct.

(1-4) Letting the focal lengths for the wide-angle end of the first and second lens groups be denoted by f1 and f2, respectively, the following conditions are satisfied:

$$0.2 < |Fw/f1| \leq 1.0 \quad (4)$$

$$1.0 < Fw/f2 \leq 2.5 \quad (5)$$

When the upper limit of the condition (4) is exceeded, as this means that the first lens group L1 has too strong a negative refractive power in the wide-angle end, the retrofocus system takes a strong action. So, the total length of the complete lens increases objectionably. Moreover, the first lens group L1 produces strong spherical aberration as is over-corrected, which is difficult to correct by any design of the other lens groups. When the lower limit is exceeded, it becomes difficult to secure the predetermined value of the back focal distance.

The equalities or inequalities (5) are concerned with the positive refractive power of the second lens group L2. When the upper limit of the condition (5) is exceeded, as this means that the second lens group L2 has too strong a refractive power, the second lens group L2 and the third lens group L3 form the telephoto type that functions too strongly. Therefore, the predetermined value of the back focal distance is hardly secured. Conversely, when the lower limit of the condition (5) is exceeded, as this means that the second lens group L2 has too weak a refractive power, the refractive powers of the negative lens groups must be weakened to obtain the predetermined value of the shortest focal length. As a result, the total length of the complete lens increases objectionably.

(1-5) Letting the image magnification for the wide-angle end of the third lens group be denoted by β3w, the following condition is satisfied:

$$0.1 \leq f3 \cdot (1-\beta 3w)/Fw \leq 0.5 \quad (6)$$

The equalities or inequalities (6) are concerned with an appropriate condition to determine the back focal distance for the wide-angle end. When the upper limit of the condition (6) is exceeded, the back focal distance becomes longer than necessary in the wide-angle end. Therefore, the size of the entire lens system is difficult to minimize. When the lower limit is exceeded, it becomes difficult to secure the predetermined value of the back focal distance in the wide-angle end. As a result, the third lens group L3 gets an objectionably larger diameter.

(1-6) Letting the lateral magnification for the wide-angle end of the third lens group be denoted by β3w, the following condition is satisfied:

$$1.1 < \beta 3w < 1.8 \quad (7)$$

The inequalities (7) are concerned with the lateral magnification of the third lens group L3. When the third lens group L3 has too large a lateral magnification as exceeding the upper limit, a long back focal distance is obtained, but the preceding lens groups get too strong refractive powers. Therefore, aberrations become difficult to correct. When the third lens group L3 has too weak a lateral magnification as exceeding the lower limit, it becomes difficult to minimize the size of the entire lens system.

(1-7) Letting the lateral magnification for the wide angle end of the second lens group be denoted by β2w (β2w<0), the following condition is satisfied:

$$0.1 < |\beta 2w| < 0.6 \quad (8)$$

It is considered that the two adjacent lens groups (called the "k-th" lens group and the "j-th" lens group) are combined with each other. Then, the combined lens group has an overall refractive power ϕkj given by the following equation:

$$\phi kj = \phi k + \phi j - \phi k \cdot \phi j \cdot e \quad (9)$$

where
 ϕk: the refractive power of the k-th lens group;
 ϕj: the refractive power of the j-th lens group; and
 e: the interval between the principal points of the k-th lens group and the j-th-lens group.

The second lens group L2 and the third lens group L3 have refractive powers of opposite sign to each other. As is understandable from the equation (9), therefore, if the air separation is made shorter when in the telephoto end than when in the wide-angle end, the combined lens group can take a weaker overall refractive power.

The inequalities (8) give a range for the lateral magnification for the wide-angle end of the second lens group L2, as is determined by referring to the equation (9). When the upper limit of the condition (8) is exceeded, the necessary back focal distance is hard to take in the wide-angle end. As a result, the third lens group L3 gets a larger diameter. When the lower limit is exceeded, the refractive powers of the other lens groups becomes much too strong in order to obtain the predetermined focal lengths. Therefore, many aberrations increase objectionably.

Next, the numerical data for the numerical examples 1 to 5 of the invention are given in the following tables, wherein Ri is the radius of curvature of the i-th lens surface, when counted from the object side, Di is the i-th lens thickness or air separation, when counted from the object side, and Ni and vi are respectively the refractive index and Abbe number of the glass of the i-th lens element, when counted from the object side.

The values of the factors in the before-described conditions for the numerical examples 1 to 5 are listed in Table-1.

The shape of the aspheric surface is expressed in the coordinates with an X axis in the axial direction and an H axis in the perpendicular direction to the optical axis, the direction in which light advances being taken as positive by the following equation:

$$X = (1/R)H^2/(1+\sqrt{1-(1+K)(H/R)^2}) + AH^2 + BH^4 + CH^6 + DH^8 + EH^{10}$$

where R is the radius of the osculating sphere, and K, A, B, C, D and E are the aspheric coefficients.

NUMERICAL EXAMPLE 1 f = 28.84–101.45   Fno. = 3.5–9   2ω = 73.8°–24.1°

| | | |
|---|---|---|
| R1 = −129.95 | D1 = 1.30 | N1 = 1.48749  v1 = 70.2 |
| R2 = 29.51 | D2 = 1.99 | |
| R3 = 29.12 | D3 = 2.20 | N2 = 1.84666  v2 = 23.8 |
| R4 = 39.39 | D4 = Variable | |
| R5 = 14.00 | D5 = 1.10 | N3 = 1.84666  v3 = 23.8 |
| R6 = 11.92 | D6 = 3.00 | N4 = 1.48749  v4 = 70.2 |
| R7 = −234.68 | D7 = Variable | |
| R8 = (Stop) | D8 = 2.50 | |
| R9 = −19.70 | D9 = 1.50 | N5 = 1.69320  v5 = 33.7 |
| R10 = −21.42 | D10 = 2.00 | N6 = 1.84666  v6 = 23.8 |
| R11 = −62.22 | D11 = Variable | |
| R12 = 25202.75 | D12 = 4.10 | N7 = 1.77250  v7 = 49.6 |
| R13 = −15.62 | D13 = Variable | |
| R14 = −18.26 | D14 = 1.50 | N8 = 1.69680  v8 = 55.5 |
| R15 = 73.66 | D15 = 2.30 | N9 = 1.84666  v9 = 23.8 |
| R16 = 218.48 | | |

The Values of Aspheric Coefficients:
 R9:  K = 5.081       A = 0  B = 2.434 × 10⁻⁶    C = 6.462 × 10⁻⁷
    D = 0          E = 0
 R13: K = −2.521      A = 0  B = −5.677 × 10⁻⁵   C = 1.319 × 10⁻⁷
    D = 0          E = 0
 R14: K = 4.719 × 10⁻¹ A = 0  B = 2.780 × 10⁻⁵   C = 8.034 × 10⁻⁸
    D = 0          E = 0

| Variable Separations | Focal Length | | |
|---|---|---|---|
| | 28.84 | 53.10 | 101.45 |
| D4 | 9.00 | 14.18 | 0.80 |
| D7 | 1.00 | 6.08 | 8.04 |
| D11 | 2.27 | 4.78 | 9.15 |
| D13 | 14.06 | 4.20 | 0.95 |

NUMERICAL EXAMPLE 2 f = 28.83–102.38   Fno. = 3.71–10.00   2ω = 73.8°–23.9°

| | | |
|---|---|---|
| R1 = 519.61 | D1 = 1.60 | N1 = 1.80518  v1 = 25.4 |
| R2 = −351.51 | D2 = Variable | |
| R3 = −112.82 | D3 = 1.30 | N2 = 1.49699  v2 = 81.6 |
| R4 = 28.78 | D4 = Variable | |

-continued

| | | | |
|---|---|---|---|
| R5 = 13.78 | D5 = 2.50 | N3 = 1.49699 | ν3 = 81.6 |
| R6 = 2684.81 | D6 = Variable | | |
| R7 = (Stop) | D7 = 1.00 | | |
| R8 = −35.81 | D8 = 2.80 | N4 = 1.84665 | ν4 = 23.8 |
| R9 = 1454.82 | D9 = Variable | | |
| R10 = −317.50 | D10 = 4.50 | N5 = 1.77249 | ν5 = 49.6 |
| R11 = −16.39 | D11 = Variable | | |
| R12 = −15.81 | D12 = 1.80 | N6 = 1.63999 | ν6 = 60.1 |
| R13 = −425.93 | | | |

The Values of Aspheric Coefficients:
R8: K = −2.282 × 10$^{+1}$    A = 0        B = −1.474 × 10$^{−4}$
    C = 1.145 × 10$^{−8}$    D = −5.666 × 10$^{−9}$    E = 0
R11: K = −2.726 × 10$^{−2}$    A = 0        B = 6.307 × 10$^{−6}$
    C = 3.236 × 10$^{−8}$    D = −5.515 × 10$^{−11}$    E = 0
R12: K = −1.579 × 10$^{−1}$    A = 0        B = 1.052 × 10$^{−5}$
    C = 3.604 × 10$^{−8}$    D = −9.831 × 10$^{−11}$    E = 0

| Variable Separations | Focal Length | | |
|---|---|---|---|
| | 28.83 | 54.33 | 102.38 |
| D2 | 1.49 | 1.64 | 3.36 |
| D4 | 8.73 | 14.26 | 0.80 |
| D6 | 3.06 | 7.24 | 8.88 |
| D9 | 2.85 | 5.91 | 10.58 |
| D11 | 17.12 | 5.44 | 4.31 |

NUMERICAL EXAMPLE 3 f = 28.85–101.00    Fno. = 3.30–9.00    2ω = 73.7°–24.2°

| | | | |
|---|---|---|---|
| R1 = 424.11 | D1 = 2.40 | N1 = 1.51633 | ν1 = 64.2 |
| R2 = −60.06 | D2 = Variable | | |
| R3 = −38.54 | D3 = 1.20 | N2 = 1.80400 | ν2 = 46.6 |
| R4 = 19.56 | D4 = 1.35 | | |
| R5 = 21.49 | D5 = 2.90 | N3 = 1.84665 | ν3 = 23.8 |
| R6 = 176.01 | D6 = Variable | | |
| R7 = 15.65 | D7 = 0.90 | N4 = 1.84665 | ν4 = 23.8 |
| R8 = 11.27 | D8 = 4.50 | N5 = 1.48749 | ν5 = 70.2 |
| R9 = −21.44 | D9 = 0.90 | N6 = 1.84665 | ν6 = 23.8 |
| R10 = −29.88 | D10 = Variable | | |
| R11 = (Stop) | D11 = 3.00 | | |
| R12 = −24.67 | D12 = 2.55 | N7 = 1.80518 | ν7 = 25.4 |
| R13 = −47.29 | D13 = 0.50 | | |
| R14 = −36.54 | D14 = 1.00 | N8 = 1.65159 | ν8 = 58.5 |
| R15 = 155.75 | D15 = 5.80 | N9 = 1.77249 | ν9 = 49.6 |
| R16 = −14.23 | D16 = Variable | | |
| R17 = −28.76 | D17 = 2.30 | N10 = 1.84665 | ν10 = 23.8 |
| R18 = −20.20 | D18 = 0.30 | | |
| R19 = −25.76 | D19 = 1.30 | N11 = 1.69679 | ν11 = 55.5 |
| R20 = −80.69 | D20 = 3.51 | | |
| R21 = −18.83 | D21 = 1.50 | N12 = 1.77249 | ν12 = 49.6 |
| R22 = 431.90 | | | |

The Values of Aspheric Coefficients:
R12: K = 4.963        A = 0        B = −6.074 × 10$^{−5}$
    C = −3.607 × 10$^{−7}$    D = 3.331 × 10$^{−9}$    E = 0
R16: K = −2.664        A = 0        B = −1.127 × 10$^{−4}$
    C = 1.634 × 10$^{−7}$    D = −1.376 × 10$^{−9}$    E = 0

| Variable Separations | Focal Length | | |
|---|---|---|---|
| | 28.85 | 53.98 | 101.00 |
| D2 | 1.23 | 2.21 | 5.15 |
| D6 | 8.73 | 4.75 | 0.81 |
| D10 | 0.79 | 4.84 | 8.26 |
| D16 | 10.75 | 4.72 | 0.85 |

NUMERICAL EXAMPLE 4 f = 28.86–101.58    Fno. = 3.06–9.00    2ω = 73.7°–24.1°

| | | | |
|---|---|---|---|
| R1 = 101.89 | D1 = 2.85 | N1 = 1.51633 | ν1 = 64.2 |
| R2 = −61.28 | D2 = 0.84 | | |
| R3 = −39.42 | D3 = 1.20 | N2 = 1.80400 | ν2 = 46.6 |
| R4 = 17.90 | D4 = 1.07 | | |
| R5 = 19.60 | D5 = 3.35 | N3 = 1.84665 | ν3 = 23.8 |
| R6 = 95.82 | D6 = Variable | | |
| R7 = 16.21 | D7 = 0.90 | N4 = 1.84665 | ν4 = 23.8 |
| R8 = 11.92 | D8 = 4.80 | N5 = 1.48749 | ν5 = 70.2 |
| R9 = −19.85 | D9 = 0.90 | N6 = 1.84665 | ν6 = 23.8 |
| R10 = −27.78 | D10 = Variable | | |
| R11 = (Stop) | D11 = 3.50 | | |
| R12 = −26.05 | D12 = 2.42 | N7 = 1.80518 | ν7 = 25.4 |
| R13 = −45.55 | D13 = 0.56 | | |
| R14 = −34.59 | D14 = 1.00 | N8 = 1.65159 | ν8 = 58.5 |
| R15 = 310.25 | D15 = 5.80 | N9 = 1.77249 | ν9 = 49.6 |
| R16 = −13.79 | D16 = Variable | | |
| R17 = −28.83 | D17 = 2.30 | N10 = 1.84665 | ν10 = 23.8 |
| R18 = −20.42 | D18 = 0.24 | | |
| R19 = −25.56 | D19 = 1.30 | N11 = 1.69679 | ν11 = 55.5 |
| R20 = −131.56 | D20 = 3.53 | | |
| R21 = −20.55 | D21 = 1.50 | N12 = 1.77249 | ν12 = 49.6 |
| R22 = 204.29 | | | |

The Values of Aspheric Coefficients:
R12: K = 6.017        A = 0        B = −6.890 × 10$^{−5}$
    C = −6.114 × 10$^{−7}$    D = −4.934 × 10$^{−9}$    E = 0
R16: K = −2.445        A = 0        B = −1.158 × 10$^{−4}$
    C = 1.246 × 10$^{−7}$    D = −1.894 × 10$^{−9}$    E = 0

| Variable Separations | Focal Length | | |
|---|---|---|---|
| | 28.86 | 54.15 | 101.58 |
| D6 | 9.49 | 5.78 | 0.79 |
| D10 | 1.56 | 5.74 | 8.67 |
| D16 | 9.64 | 3.97 | 0.79 |

NUMERICAL EXAMPLE 5 f = 29.47–80.02    Fno. = 3.80–8.79    2ω = 72.6°–30.3°

| | | | |
|---|---|---|---|
| R1 = 104.99 | D1 = 2.85 | N1 = 1.51633 | ν1 = 64.2 |
| R2 = −79.20 | D2 = 0.84 | | |
| R3 = −58.17 | D3 = 1.20 | N2 = 1.88299 | ν2 = 40.8 |
| R4 = 18.99 | D4 = 1.07 | | |
| R5 = 19.98 | D5 = 3.35 | N3 = 1.80518 | ν3 = 25.4 |
| R6 = 81.43 | D6 = Variable | | |
| R7 = 14.33 | D7 = 0.90 | N4 = 1.84665 | ν4 = 23.8 |
| R8 = 15.71 | D8 = 4.80 | N5 = 1.48749 | ν5 = 70.2 |
| R9 = −16.46 | D9 = 0.90 | N6 = 1.84665 | ν6 = 23.8 |
| R10 = −25.87 | D10 = 2.36 | | |
| R11 = (Stop) | D11 = 2.70 | | |
| R12 = −26.70 | D12 = 2.42 | N7 = 1.80518 | ν7 = 25.4 |
| R13 = 65.44 | D13 = 1.00 | | |
| R14 = −59.75 | D14 = 1.00 | N8 = 1.65159 | ν8 = 58.5 |
| R15 = 27.74 | D15 = 5.80 | N9 = 1.80400 | ν9 = 46.6 |
| R16 = −14.65 | D16 = Variable | | |
| R17 = −25.00 | D17 = 2.49 | N10 = 1.84665 | ν10 = 23.8 |
| R18 = −17.35 | D18 = 0.40 | | |
| R19 = −23.62 | D19 = 1.30 | N11 = 1.69679 | ν11 = 55.5 |
| R20 = −62.18 | D20 = 4.00 | | |
| R21 = −16.00 | D21 = 1.99 | N12 = 1.77249 | ν12 = 49.6 |
| R22 = −170.60 | | | |

The Values of Aspheric Coefficients:
R12: K = −6.839 × 10$^{−1}$    A = 0        B = −1.773 × 10$^{−4}$
    C = 2.030 × 10$^{−7}$    D = −4.463 × 10$^{−8}$    E = 0
R16: K = −2.383        A = 0        B = −1.044 × 10$^{−4}$
    C = 1.158 × 10$^{−7}$    D = −1.694 × 10$^{−9}$    E = 0

-continued

| Variable | Focal Length | | |
|---|---|---|---|
| Separations | 29.47 | 51.94 | 80.02 |
| D6 | 12.01 | 11.00 | 0.80 |
| D16 | 8.72 | 2.56 | 2.48 |

TABLE 1

| | Numerical Example | | | | |
|---|---|---|---|---|---|
| Factor | 1 | 2 | 3 | 4 | 5 |
| Hiw | 4.11 | 4.01 | 4.68 | 4.83 | 3.66 |
| \|Hbiw\| | 1.87 | 0.84 | 3.23 | 3.89 | 3.07 |
| Hit | 4.13 | 4.02 | 4.27 | 4.28 | 3.74 |
| \|Hbit\| | 1.01 | 0.67 | 1.96 | 2.18 | 1.52 |
| Fw/f1 | 0.35 | 0.51 | 0.43 | 0.44 | 0.53 |
| Fw/f2 | 1.35 | 1.36 | 1.37 | 1.38 | 1.30 |
| Fw/f3 | 1.18 | 1.12 | 1.45 | 1.55 | 1.40 |
| f3(1-β3w)/Fw | 0.32 | 0.32 | 0.32 | 0.32 | 0.29 |
| β3w | 1.38 | 1.29 | 1.47 | 1.49 | 1.41 |
| \|β2w\| | 0.26 | 0.39 | 0.29 | 0.29 | 0.37 |

According to the invention, as applied to the zoom lens having a plurality of lens groups, for example, three lens groups in total, to which all the constituent lenses are divided, an appropriate one of the lens groups and an appropriate lens surface therein are selected to introduce an aspheric surface. This leads to a possibility of improving the compact form of the entire lens system in such a manner that those aberrations which become serious when the maximum angle of field widens and the range increases are all corrected well. Thus, a wide-angle high range zoom lens having high optical performance throughout the entire zooming range can be achieved.

Figure 65A:
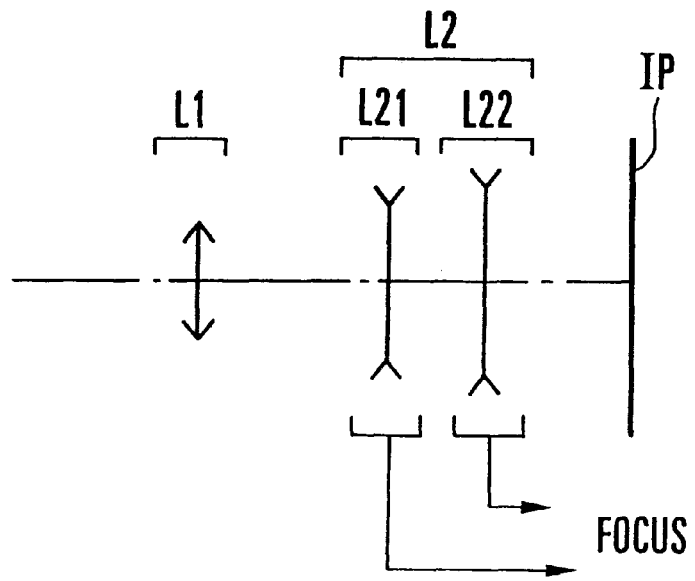
FIGS. 65(A) and 65(B) are diagrams to explain the paraxial refractive power arrangements of a zoom lens of the invention.
Figure 65B:
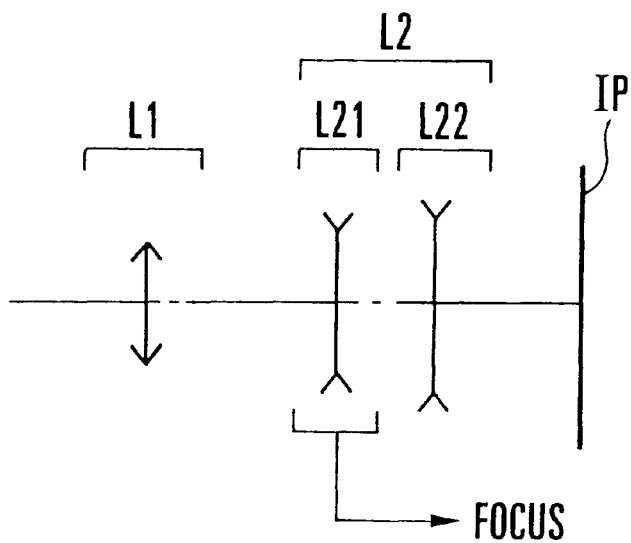

FIG. 27 to FIG. 31 are longitudinal section views of numerical examples 6 to 10 of zoom lenses of the invention in the wide-angle end, respectively. FIG. 32A to FIG. 64D show the aberrations of the numerical examples 5 to 10 of the invention. FIGS. 65(A) and 65(B) are schematic diagrams to explain the paraxial refractive power arrangement of the zoom lens with the focusing lens unit of the invention shown.

In these drawings, L1 is the first lens group having a plurality of lens units L1i (where i=1 to 5 inclusive) and whose overall refractive power is positive, and L2 is the second lens group whose overall refractive power is negative. The second lens group has two lens units, of which the first lens unit L21 is of negative refractive power and the second lens unit L22 is of negative refractive power. SP is the stop. IP is the image plane. The arrows indicate the directions in which the lens group or units axially move when zooming from the wide-angle end to the telephoto end. In more detail, zooming is performed by varying the separation s between each adjacent two of all the lens units in the first lens group L1 and between the first lens group L1 and the second lens group L2.

In the numerical examples 6 to 10 of the present embodiment, as shown in FIGS. 65(A) and 65(B), focusing is performed by varying the separation between the lens unit L21 and the lens unit L22. Specifically speaking, while the lens unit L22 is fixed, the lens unit L21 moves toward the image side as shown in FIG. 65(B). Another method is to move both of the lens unit L21 and the lens unit L22 toward the image side, while simultaneously varying their separation as shown in FIG. 65(A). These two focusing methods are selectively employed one at a zoom lens.

In general, the zoom lenses for photographic cameras or video cameras have their exit pupil on the object side of the image plane (film surface). For this reason, the lens unit L22 gets a larger effective diameter than the lens unit L21 does. The focal length fL2 of the second lens group can be defined as a function of the focal lengths fL21 and fL22 of the lens unit L21 and the lens unit L22, respectively, and the principal point interval, e, of the lens unit L21 and and the lens unit L22 by the following equation:

$$fL2 = fL21 \cdot fL22/(fL21 + fL22 - e) \qquad (a)$$

On this account, in the numerical examples 6 to 10, when focusing down, the lens unit L21 and the lens unit L22 are made to axially move in such relation as to decrease their separation. In turn, this weakens the negative refractive power of the second lens group L2, thereby reducing the total focusing movement of the lens units L21 and L22 from that when the second lens group L2 does it alone. By this, the requirements of shortening the total length of the complete lens and of reducing the required drive torque for focusing are fulfilled simultaneously. Particularly in the case that when focusing, the lens unit L22 is fixed and the lens unit L21 of smaller diameter than that of the lens unit L22 is moved toward the image side, there are merits that the focusing movement requires a lower torque and that the focusing mechanism becomes simpler in structure.

In the numerical examples 6 to 10, by employing such a zoom lens configuration and such a focusing lens configuration, the maximum angle of field is widened and the range is increased to 2.5 to 3.5 in the zoom ratio with the limitation of the total length of the complete lens to a minimum, while still permitting the variation of aberrations with zooming to be corrected well. Thus, a high optical performance is obtained throughout the entire zooming range and throughout the entire focusing range.

To further improve the stability of aberration correction for a higher optical performance throughout the entire zooming range and throughout the entire focusing range, or to assist in constructing the lens mounting mechanism in a suitable form, the invention sets forth additional features or conditions. So, it is recommended to satisfy at least one of the following conditions:

(2-1) Letting the focal length for the wide-angle end of the first lens group L1 be denoted by fL1W, the shortest focal length of the entire system by fW, the focal lengths of the first lens unit L21 and the second lens group L2 by fL21 and fL2, respectively, and the lateral magnification for the wide-angle end of the second lens group L2 by βL2W, the following conditions are satisfied:

$$0.5 < |fL2/fW| < 0.95 \qquad (11)$$

$$0.25 < fL2/fL < 0.9 \qquad (12)$$

$$1.2 < \beta L2W < 1.85 \qquad (13)$$

$$0.5 < fL1W/fW < 0.95 \qquad (14)$$

The inequalities (11) are concerned with the the ratio of the negative refractive power of the lens group L2 including the focusing lens units to the shortest focal length of the entire system and have an aim chiefly to obtain the predetermined value of the zoom ratio, while still permitting a shortening of the total length of the complete lens to be achieved. When the upper limit of the condition (11) is exceeded, as this means that the second lens group L2 has too weak a negative refractive power, the zooming movements of all the lens units with inclusion of the second lens group L2 increase to obtain an equivalent zoom ratio. Therefore, the total length of the entire lens system increases greatly.

When the lower limit of the condition (11) is exceeded, the lens system as a whole takes a strong form of the telephoto type, because the negative refractive power of the second lens group L2 is too strong. Therefore, it becomes difficult to obtain the back focal distance of plus sign. Moreover, large off-axial aberrations are produced, which are difficult to correct well.

The inequalities (12) are concerned with the ratio of the negative refractive power of the second lens group L2 to the negative refractive power of the lens unit L21 as the focusing lens included in that group and have an aim chiefly to minimize the size of the lens system in such a manner as to suppress well the variation of aberrations with focusing.

When the lens unit L21 as the focusing lens has weaker negative refractive power beyond the upper limit of the condition (12), the total focusing movement of the lens unit L21 increases unduly greatly. For this reason, to avoid occurrence of its mechanical interference with the other lens unit L22 in the second lens group L2, the air separation between the lens unit L21 and the lens unit L22 must be previously taken wider. As a result, the lens system gets longer in size.

When the lower limit of the condition (12) is exceeded, as this means that the lens unit L21 as the focusing lens has too strong a refractive power, the range of variation of off-axial aberrations with focusing increases and, at the same time, the divergence of the off-axial light beam is strengthened as it passes through the lens unit L21. Therefore, the outer diameter of the lens unit L22 increases objectionably.

The inequalities (13) are concerned with the lateral magnification for the wide-angle end of the second lens group L2 and have an aim chiefly to shorten the total length of the complete lens and keep the optical performance in good balance. Now, letting the shortest focal length of the entire system be denoted by fW and the focal length for the wide-angle end of the first lens group L1 by fL1W, the equation for the shortest focal length fW is expressed by $$fW = fL1W \cdot \beta L2W \qquad (b)$$

When the second lens group L2 has a greater lateral magnification beyond the upper limit of the condition (13), as is understandable from the equation (b), widening of the maximum angle of field requires that the positive refractive power of the first lens group L1 be strengthened. Therefore, large spherical aberration is produced as is under-corrected, which is difficult to correct by the second lens group L2.

When the second lens group L2 has a smaller lateral magnification beyond the lower limit of the condition (13), as the paraxial back focal distance for the wide-angle end, βfW, of the lens system is derived from the following equation:

$$\beta fW = fL2 \cdot (1 - \beta L2W)$$

it becomes difficult to keep the back focal distance positive. Moreover, to hold an equivalent ratio of the corner illumination to the center one, the outer diameter of the second lens group L2 increases objectionably.

The inequalities (14) are concerned with the ratio of the overall refractive power for the wide-angle end of the multi-unit lens group L1 to the shortest focal length of the entire system and have an aim chiefly to minimize the size of the entire lens system in such a manner as to well correct aberrations.

When the upper limit of the condition (14) is exceeded, as this means that the first lens group has too weak a refractive power, the air separation between the lens group L1 and the lens group L2 must be previously taken wider to obtain an equivalent longest focal length. Therefore, the entire lens system increases in size objectionably.

When the lower limit of the condition (14) is exceeded, as this means that the first lens group L1 has too strong a positive refractive power, the entire lens system takes a strong form of the telephoto type. Therefore, it becomes difficult to keep the back focal distance positive. Moreover, strong under-correction of spherical aberration results, which is difficult to correct by the second lens group L2.

To achieve further improvements of the correction of aberrations with the limitation of the size of the entire lens system to a minimum, it is recommended in the invention to narrow the ranges given by the inequalities of conditions (11) to (14) by altering their upper and lower limits as follows:

$$0.6 < |fL2/fW| < 0.8 \qquad (11a)$$

$$0.35 < fL2/fL21 < 0.7 \qquad (12a)$$

$$1.3 < \beta L2W < 1.6 \qquad (13a)$$

$$0.6 < fL1W/fW < 0.8 \qquad (14a)$$

(2-2) The lens unit L21 has a negative lens having a concave surface facing the image side and the lens unit L22 has a negative lens having a concave surface facing the object side. By providing the negative lenses of such forms in the two lens units of the second lens group L2, good balance of spherical aberration and off-axial aberrations is maintained stable throughout the entire focusing range. A higher performance optical system is thus achieved.

(2-3) The second lens group L2 is made up by introducing at least one positive lens, so that good correction of chromatic aberrations is maintained stable throughout the entire zooming range. In this case, it is desirable that the Abbe number $v_p$ of the material of the introduced positive lens lies within the following range:

$$v_p < 35$$

(2-4) To introduce an aspheric surface into each of the lens groups is preferable from the standpoint of aberration correction.

(2-5) When zooming, two or more of the lens units may otherwise be moved in unison. If so, an advantage of simplifying the structure of construction of the lens barrel is produced.

(2-6) The stop SP is better arranged on zooming to axially move either in differential relation to, or in unison with, the lens units. According to this, despite the entrance pupil moving with zooming, the stop can be kept near to it. The curvature of field can thus be prevented from changing as the aperture opening decreases in size.

The characteristic features of the form and the construction and arrangement of the constituent lenses of each of the numerical examples 6 to 10 are described below.

Figure 27:
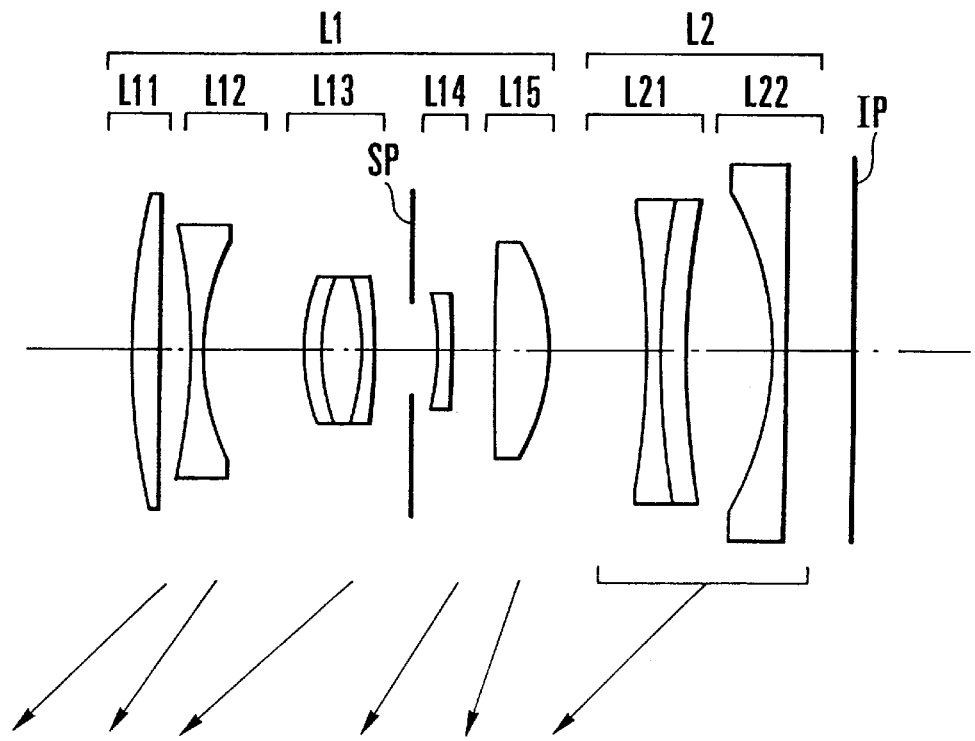
FIG. 27 is a lens block diagram of a numerical example 6 of the invention in the wide-angle end.

A zoom lens of the numerical example 6 shown in FIG. 27 includes, from front to rear, a first lens group L1 of positive refractive power which has a lens unit L11 of positive refractive power comprising a positive lens in the form of a singlet having a convex surface facing the object side, a lens unit L12 of negative refractive power comprising a negative lens in the form of a singlet of which both surfaces are concave, a lens unit L13 comprising three lenses in the form of a triplet consisting of a positive lens having a convex surface facing the object side, a positive lens of which both surfaces are convex, and a negative lens of meniscus shape convex toward the image side cemented together at their adjoining surfaces, and whose overall refractive power is positive, a stop SP, a lens unit L14 of negative refractive power comprising a negative lens in the form of a singlet of meniscus shape convex toward the image side, and a lens unit L15 of positive refractive power comprising a positive lens in the form of a singlet lens having a convex surface facing the image side, totaling five lens units.

A second lens group L2 of negative refractive power is further included, which has a lens unit L21 comprising a doublet consisting of a negative lens of which both surfaces are concave and a positive lens of meniscus shape convex toward the object side cemented at their adjoining surfaces and whose overall refractive power is negative, and a lens unit L22 of negative refractive power comprising a negative lens in the form of a singlet having a concave surface facing the object side, totaling two lens units.

When zooming from the wide-angle end to the telephoto end, the lens units axially move in differential relation like the arrows such that the separation between the lens unit L11 and the lens unit L12, the separation between the lens unit L13 and the lens unit L14 and the separation between the lens unit L14 and the lens unit L15 increase, while the separation between the lens unit L12 and the lens unit L13 and the separation between the lens group L1 and the lens group L2 decrease. Focusing is performed by the lens unit L21.

Figure 28:
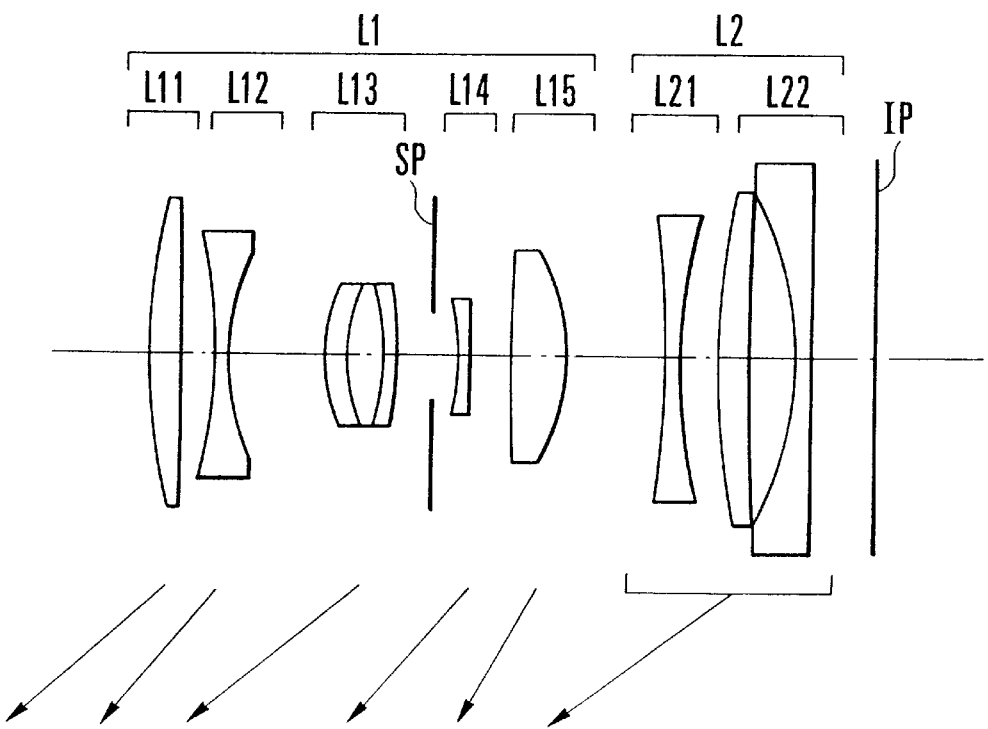
FIG. 28 is a lens block diagram of a numerical example 7 of the invention in the wide-angle end.

A zoom lens of numerical example 7 shown in FIG. 28 includes, from front to rear, a first lens group L1 of positive refractive power which has a lens unit L11 of positive refractive power comprising a positive lens in the form of a singlet having a convex surface facing the object side, a lens unit L12 of negative refractive power comprising a negative lens in the form of a singlet of which both surfaces are concave, a lens unit L13 comprising three lenses in the form of a triplet consisting of a positive lens having a convex surface facing the object side, a positive lens of which both surfaces are convex and a negative lens of meniscus shape convex toward the image side cemented together and whose overall refractive power is positive, a stop SP, a lens unit L14 of negative refractive power comprising a negative lens in the form of a singlet of meniscus shape convex toward the image side, and a lens unit L15 of positive refractive power comprising a positive lens in the form of a singlet having a convex surface facing the image side, totaling five lens units.

A second lens group L2 of negative refractive power is further included, which has a lens unit L21 of negative refractive power comprising a negative lens in the form of a singlet of which both surfaces are concave and a lens unit L22 of negative refractive power comprising a positive lens of meniscus shape convex toward the object side and a negative lens having a concave surface facing the object side, totaling two lens units.

When zooming from the wide-angle end to the telephoto end, the lens units axially move in differential relation like the arrows such that the separation between the lens unit L11 and the lens unit L2, the separation between the lens unit L13 and the lens unit L14 and the separation between the lens unit L14 and the lens unit L15 increase, while the separation between the lens unit L12 and the lens unit L13 and the separation between the lens group L1 and the lens group L2 decrease. Focusing is performed by the lens unit L21.

Figure 29:
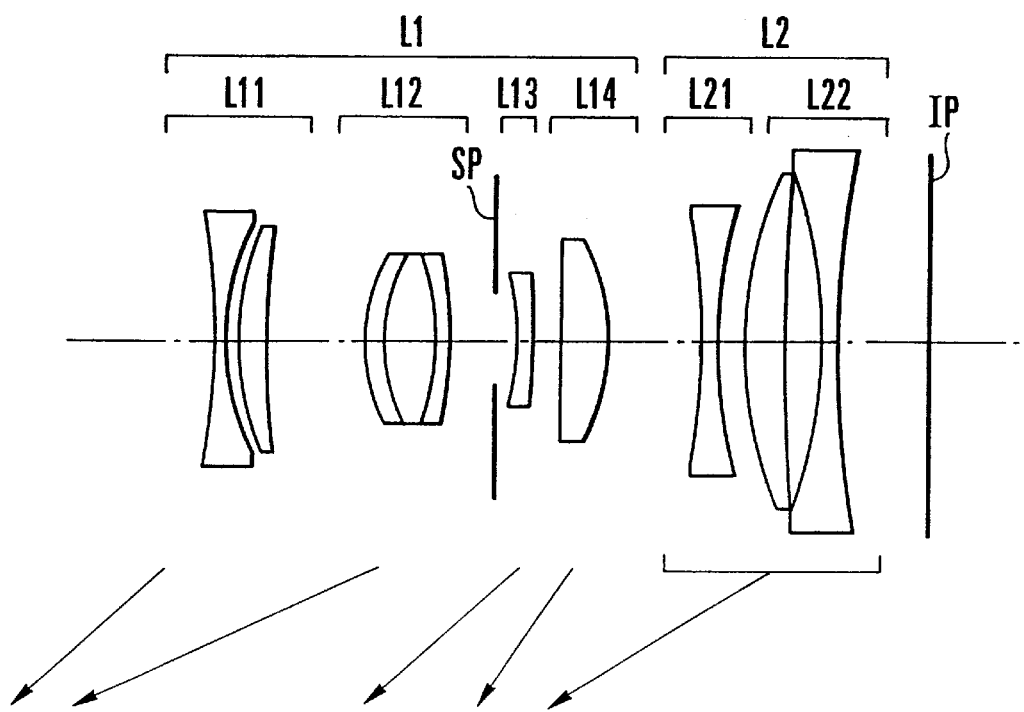
FIG. 29 is a lens block diagram of a numerical example 8 of the invention in the wide-angle end.

A zoom lens of numerical example 8 shown in FIG. 29 includes, from front to rear, a first lens group L1 of positive refractive power which has a lens unit L11 comprising a negative lens of which both surfaces are concave and a positive lens having a convex surface facing the object side, a lens unit L12 comprising three lenses in the form of a triplet consisting of a positive lens having a convex surface facing the object side, a positive lens of which both surfaces are convex and a negative lens of meniscus shape convex toward image side cemented together and whose overall refractive power is positive, a stop SP, a lens unit L13 of negative refractive power comprising a negative lens in the form of a singlet of meniscus shape convex toward the image side, and a lens unit L14 of positive refractive power comprising a positive lens in the form of a singlet having a convex surface facing the image side, totaling four lens units.

A second lens group L2 of negative refractive power is further included, which has a lens unit L21 of negative refractive power comprising a negative lens in the form of a singlet of which both surfaces are concave and a lens unit L22 of negative refractive power consisting of a positive lens of meniscus shape convex toward the object side and a negative lens of which both surfaces are concave, totaling two lens units.

When zooming from the wide-angle end to the telephoto end, the lens units axially move in differential relation like the arrows such that the separation between the lens unit L12 and the lens unit L3, the separation between the lens unit L13 and the lens unit L14 increase, while the separation between the lens unit L11 and the lens unit L12 and the separation between the lens group L1 and the lens group L2 decrease. Focusing is performed by the lens unit L21.

Figure 30:
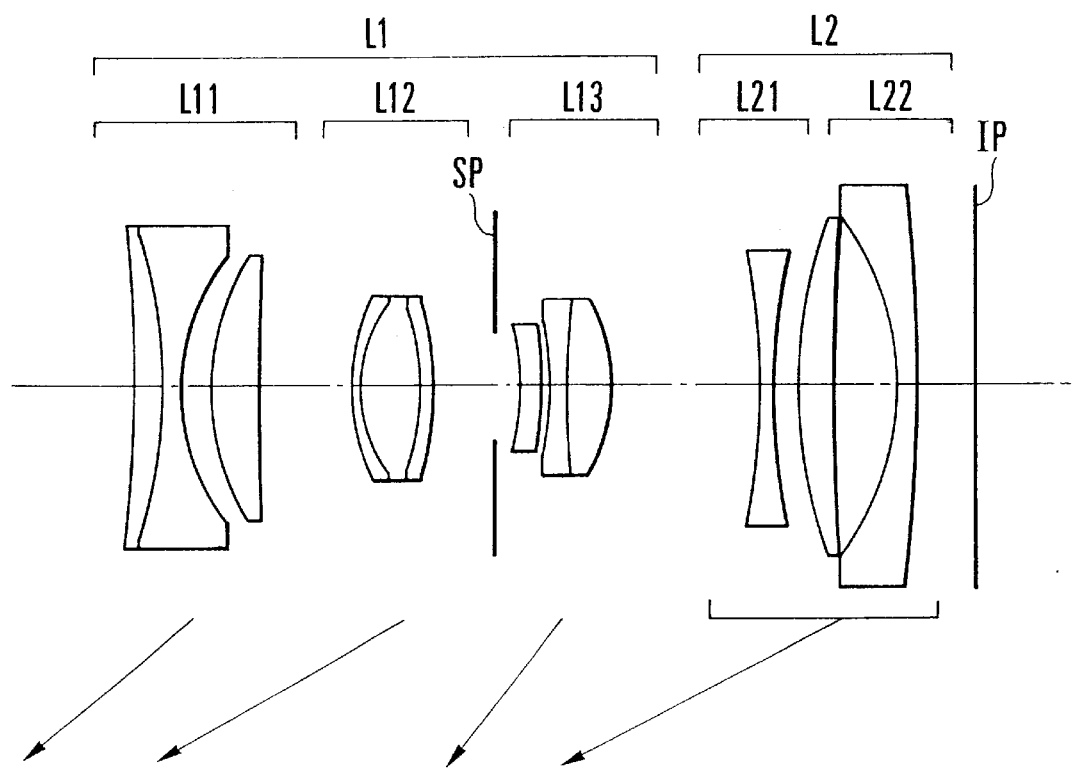
FIG. 30 is a lens block diagram of a numerical example 9 of the invention in the wide-angle end.

A zoom lens of numerical example 9 shown in FIG. 30 includes, from front to rear, a first lens group L1 of positive refractive power which has a lens unit L11 of negative refractive power comprising a doublet consisting of a positive lens having a convex surface facing the image side and a negative lens of which both surfaces are concave cemented together and a positive lens having a convex surface facing the object side, a lens unit L12 comprising three lenses in the form of a triplet consisting of a negative lens of meniscus shape convex toward the object side, a positive lens of which both surfaces are convex and a negative lens of meniscus shape convex toward the image side cemented together and whose overall refractive power is positive, a stop SP, a lens unit L13 of positive refractive power comprising a negative lens of meniscus shape convex toward the image side and a doublet consisting of a negative lens of which both surfaces are concave and a positive lens of which both surfaces are convex, totaling three lens units.

A second lens group L2 is further included, which has a lens unit L21 of negative refractive power comprising a negative lens in the form of a singlet of which both surfaces are concave and a lens unit L22 comprising a positive lens of meniscus shape convex toward the object side and a negative lens having a concave surface facing the object side, totaling two lens units.

When zooming from the wide-angle end to the telephoto end, the lens units axially move in differential relation like the arrows such that the separation between the lens unit L12 and the lens unit L13 increases, while the separation between the lens unit L11 and the lens unit L12 and the separation between the lens group L1 and the lens group L2 decrease. Focusing is performed by the lens unit L21.

Figure 31:
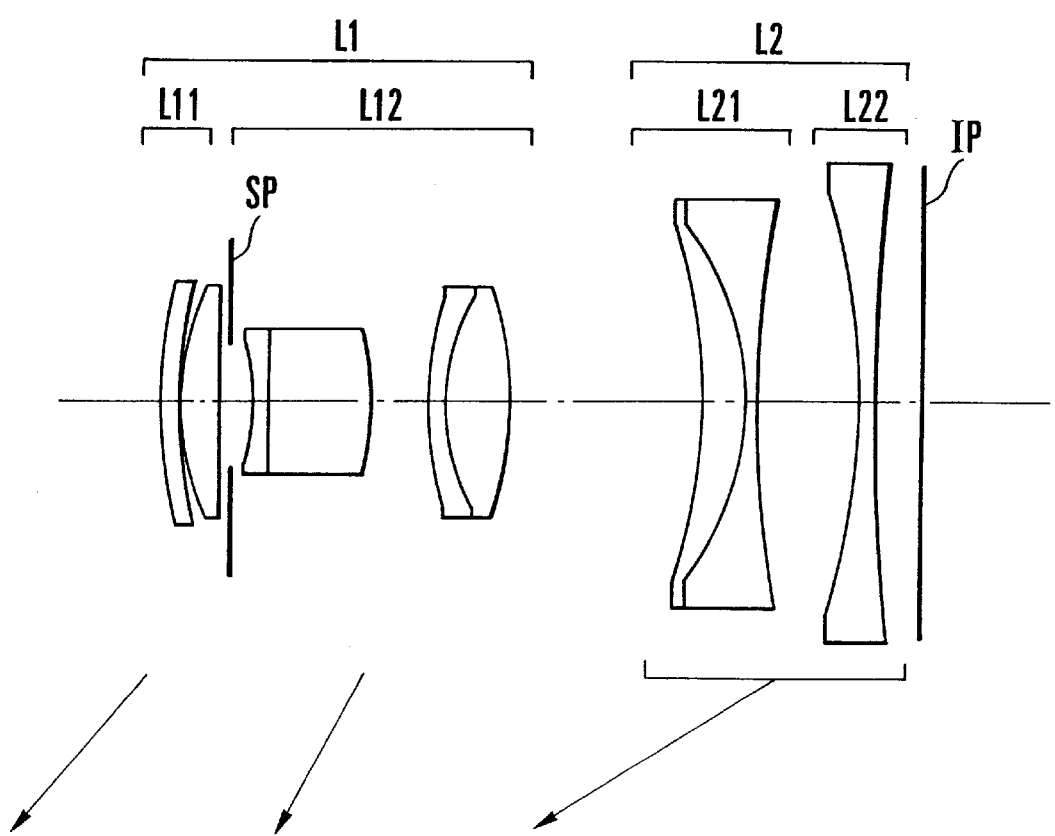
FIG. 31 is a lens block diagram of a numerical example 10 of the invention in the wide-angle end.
Figure 32A:
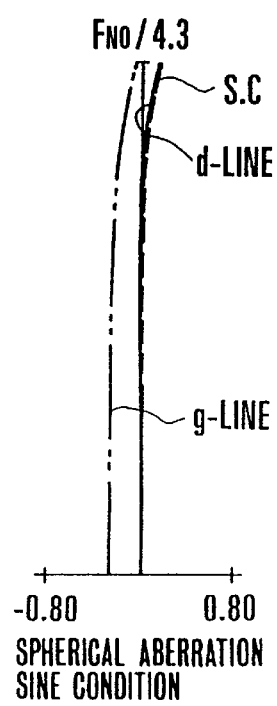
FIGS. 32A–32D are graphic representations of the aberrations of the numerical example 6 of the invention in the wide-angle end with an object at infinity.
Figure 32B:
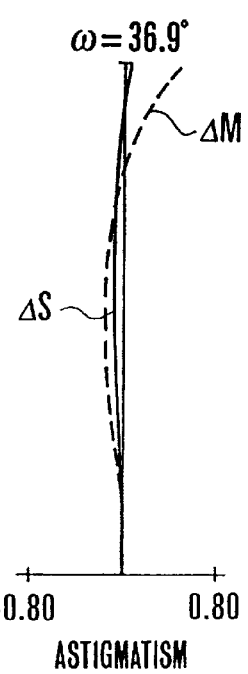
Figure 32C:
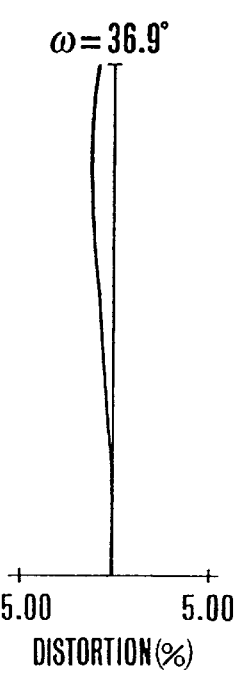
Figure 32D:
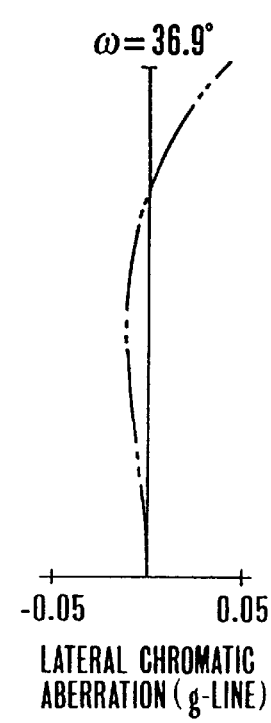
Figure 33A:
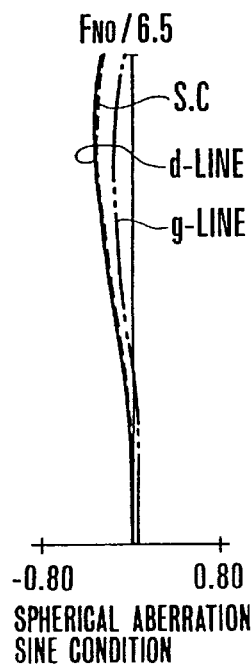
FIGS. 33A–33D are graphic representations of the aberrations of the numerical example 6 of the invention in a middle position with an object at infinity.
Figure 33B:
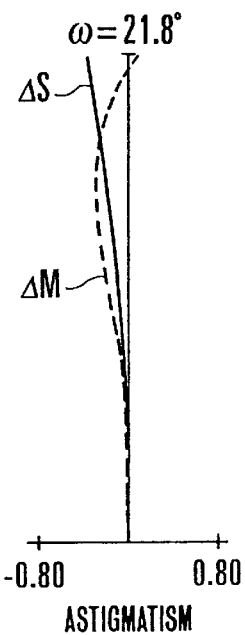
Figure 33C:
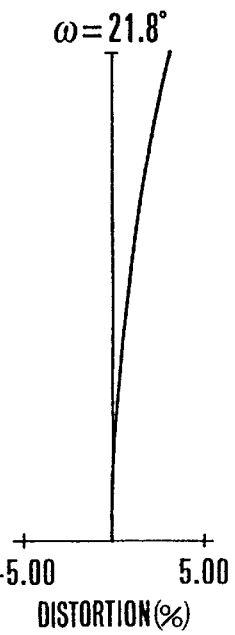
Figure 33D:
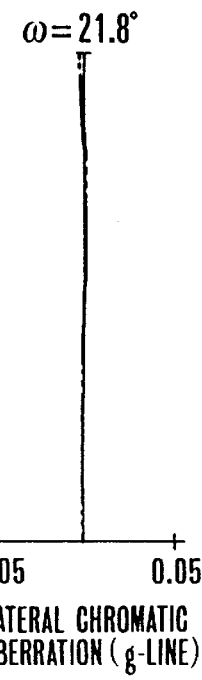
Figure 34A:
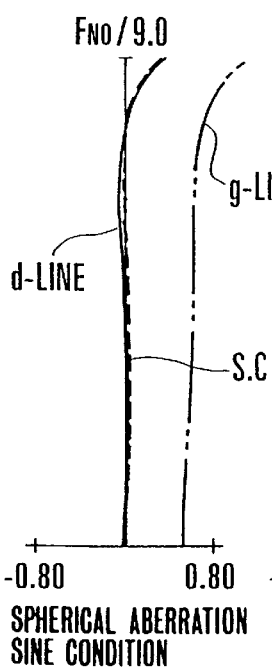
FIGS. 34A–34D are graphic representations of the aberrations of the numerical example 6 of the invention in the telephoto end with an object at infinity.
Figure 34B:
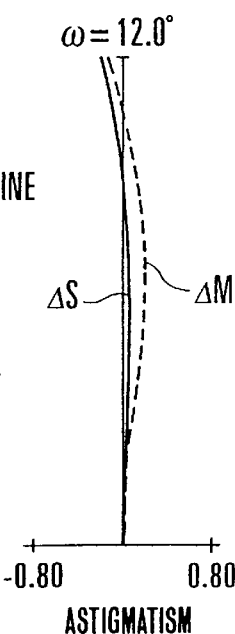
Figure 34C:
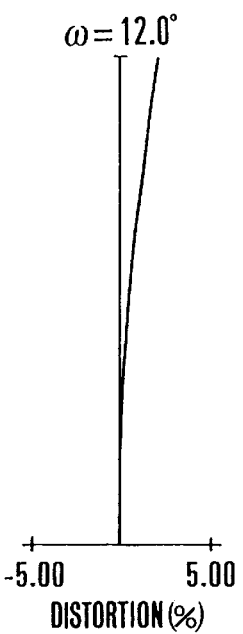
Figure 34D:
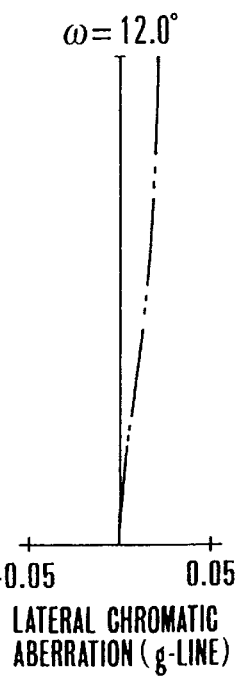
Figure 45A:
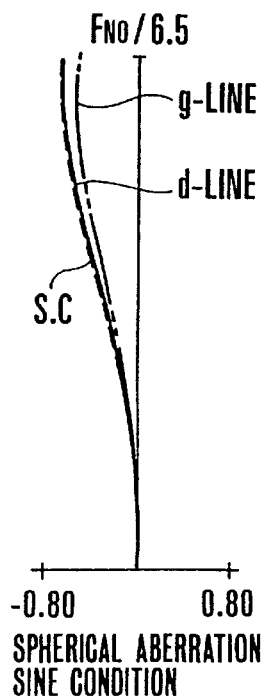
FIGS. 45A–45D are graphic representations of the aberrations of the numerical example 7 of the invention in the middle position when focused to 800 mm from the image plane by moving the lens unit L21 and the lens unit L22 to respective distances of 1:0.5.
Figure 45B:
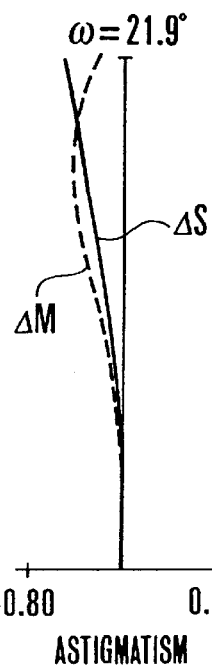
Figure 45C:
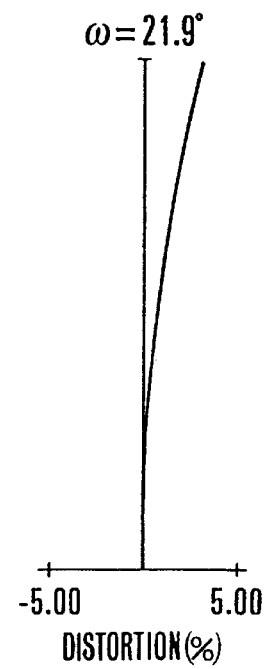
Figure 45D:
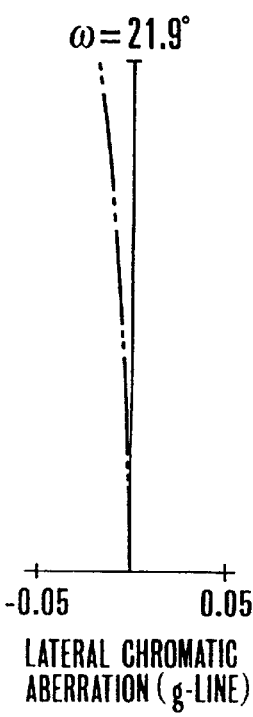
Figure 46A:
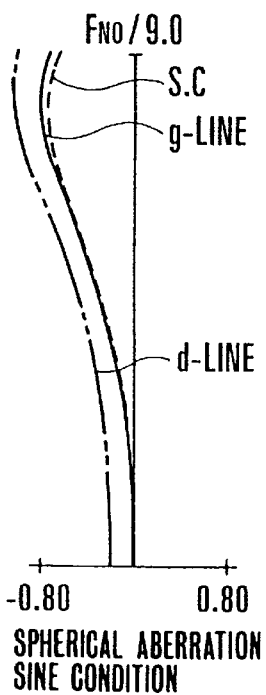
FIGS. 46A–46D are graphic representations of the aberrations of the numerical example 7 of the invention in the telephoto end when focused to 800 mm from the image plane by moving the lens unit L21 and the lens unit L22 to respective distances of 1:0.5.
Figure 46B:
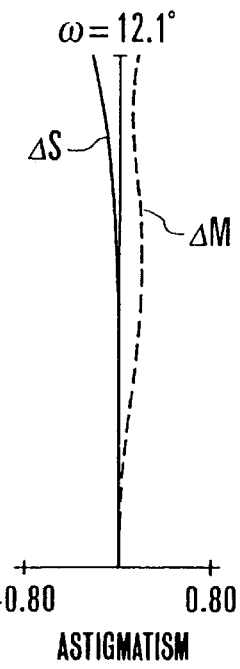
Figure 46C:
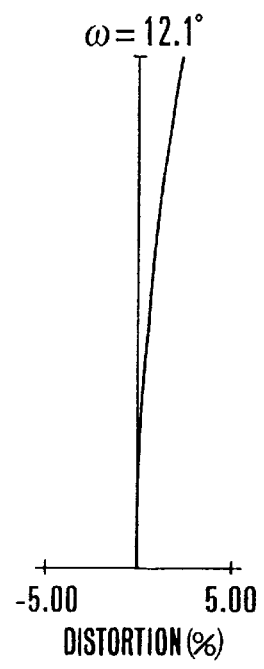
Figure 46D:
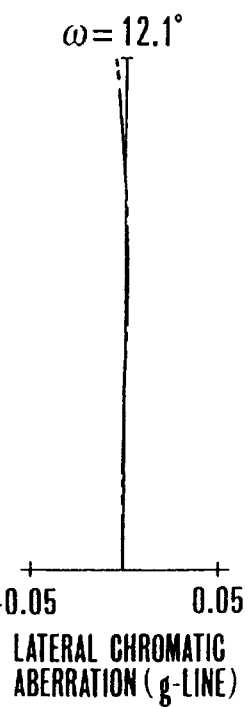
Figure 47A:
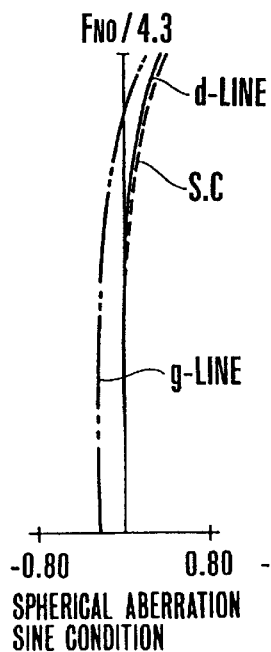
FIGS. 47A–47D are graphic representations of the aberrations of the numerical example 8 of the invention in the wide-angle end with an object at infinity.
Figure 47B:
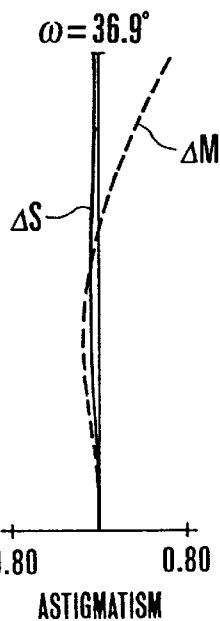
Figure 47C:
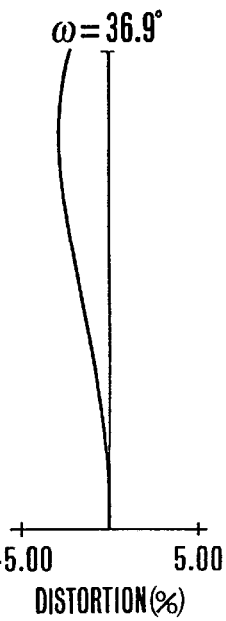
Figure 47D:
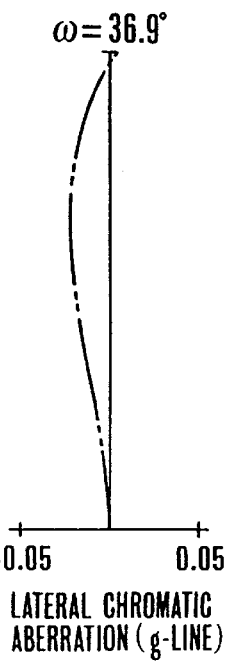
Figure 48A:
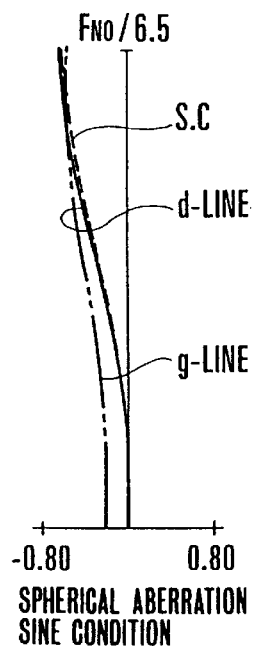
FIGS. 48A–48D are graphic representations of the aberrations of the numerical example 8 of the invention in a middle position with an object at infinity.
Figure 48B:
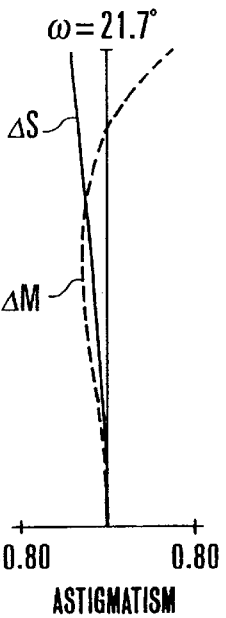
Figure 48C:
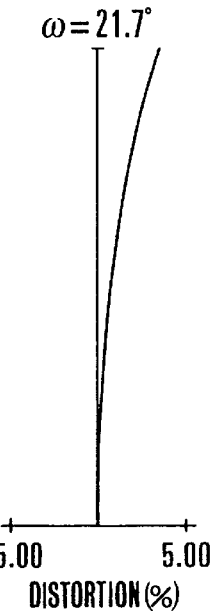
Figure 48D:
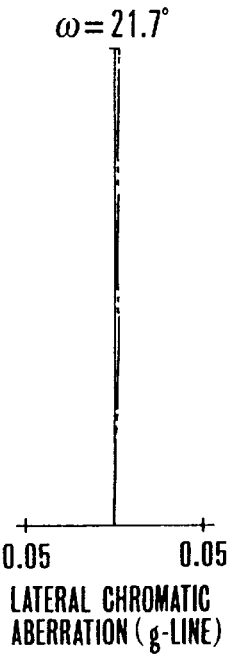
Figure 49A:
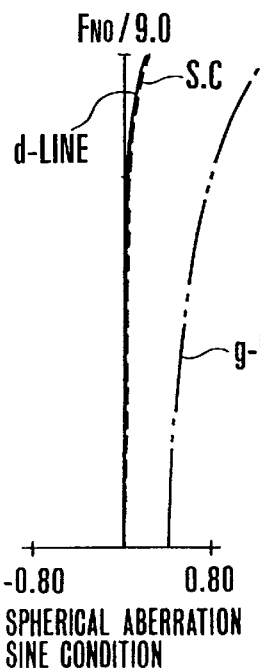
FIGS. 49A–49D are graphic representations of the aberrations of the numerical example 8 of the invention in the telephoto end with an object at infinity.
Figure 49B:
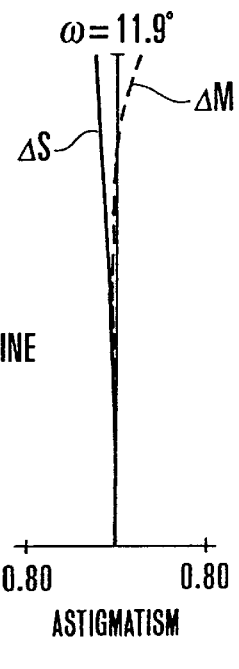
Figure 49C:
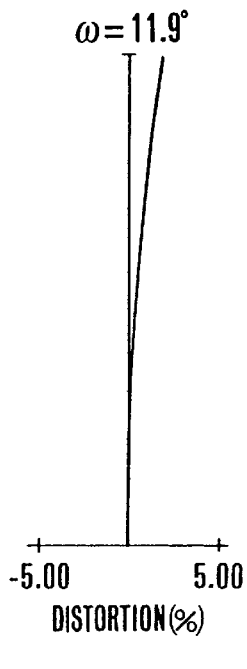
Figure 49D:
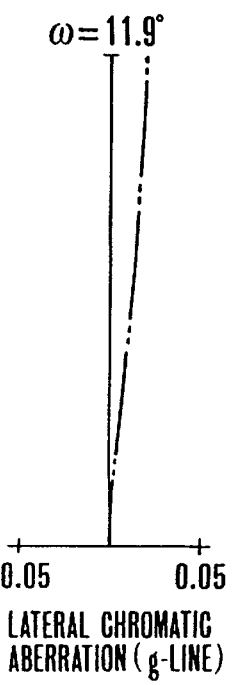
Figure 50A:
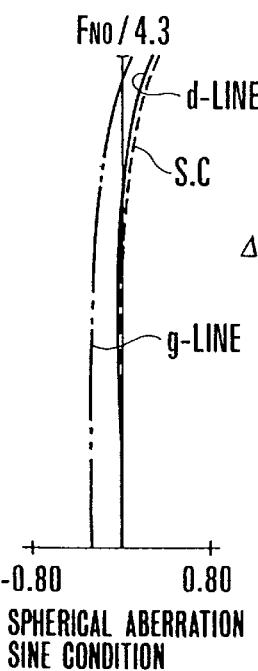
FIGS. 50A–50D are graphic representations of the aberrations of the numerical example 8 of the invention in the wide-angle end with an object at 800 mm from the image plane.
Figure 50B:
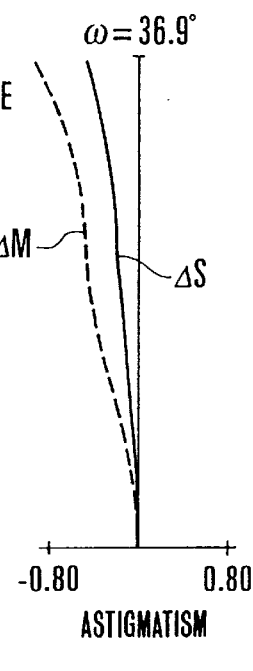
Figure 50C:
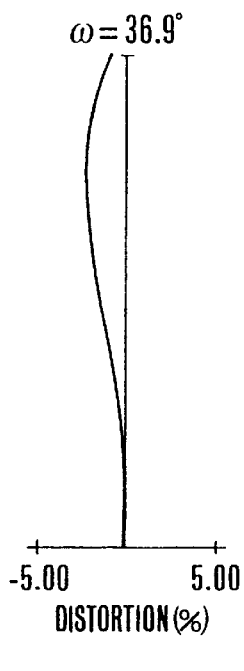
Figure 50D:
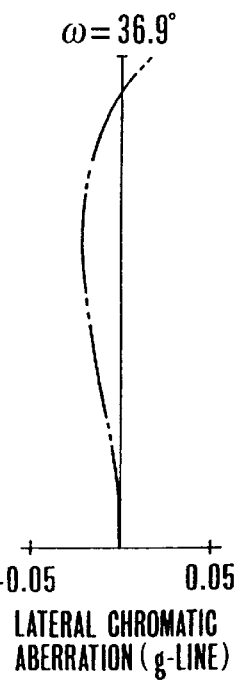
Figure 51A:
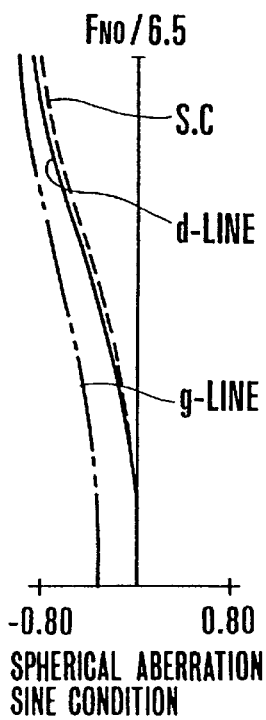
FIGS. 51A–51D are graphic representations of the aberrations of the numerical example 8 of the invention in the middle position with an object at 800 mm from the image plane.
Figure 51B:
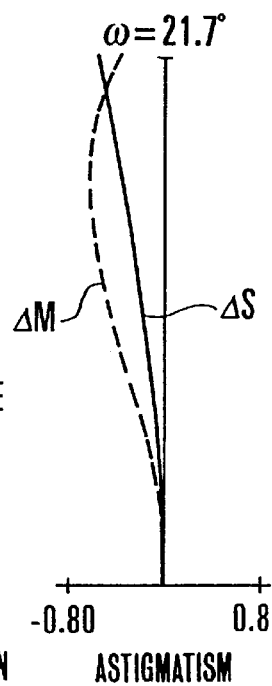
Figure 51C:
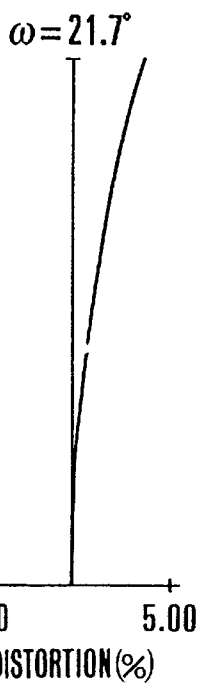
Figure 51D:
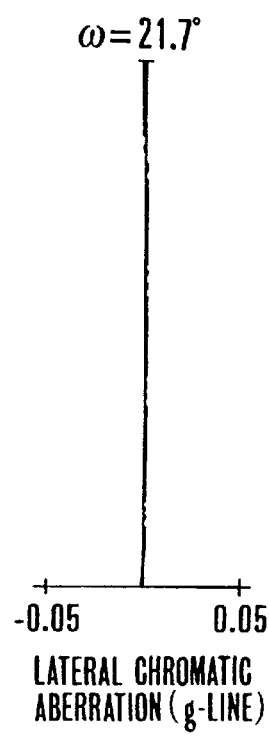
Figure 52A:
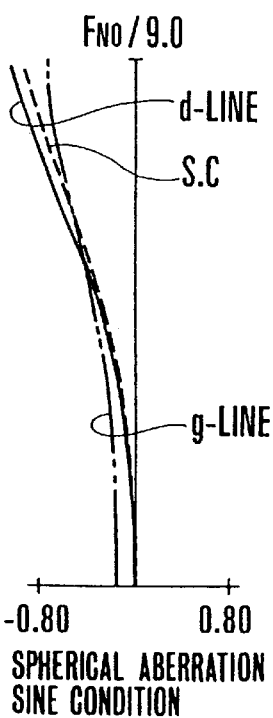
FIGS. 52A–52D are graphic representations of the aberrations of the numerical example 8 of the invention in the telephoto end with an object at 800 mm from the image plane.
Figure 52B:
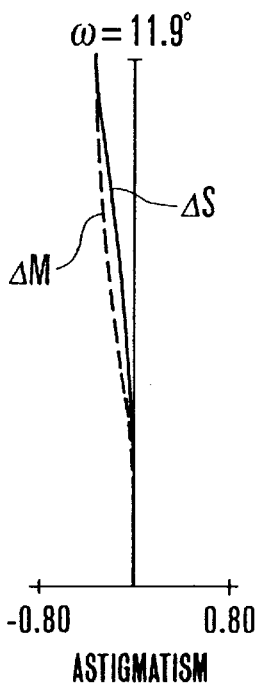
Figure 52C:
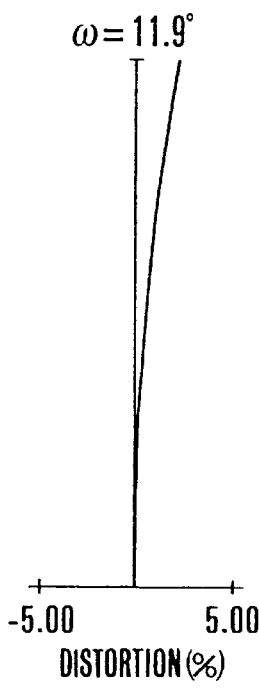
Figure 52D:
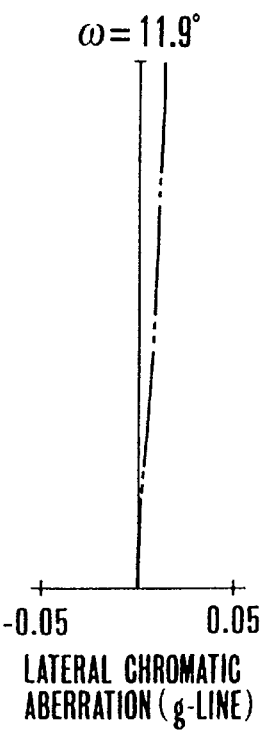
Figure 53A:
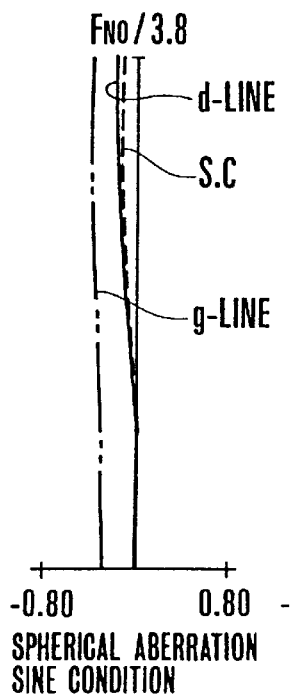
FIGS. 53A–53D are graphic representations of the aberrations of the numerical example 9 of the invention in he wide-angle end with an object at infinity.
Figure 53B:
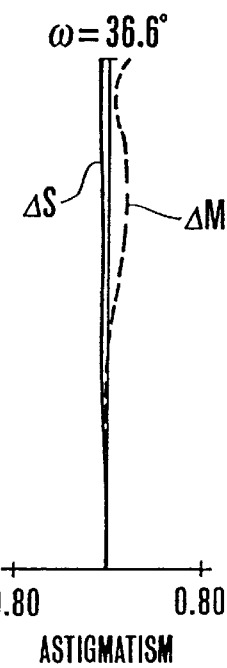
Figure 53C:
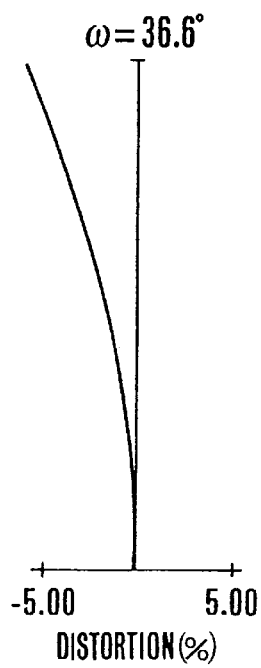
Figure 53D:
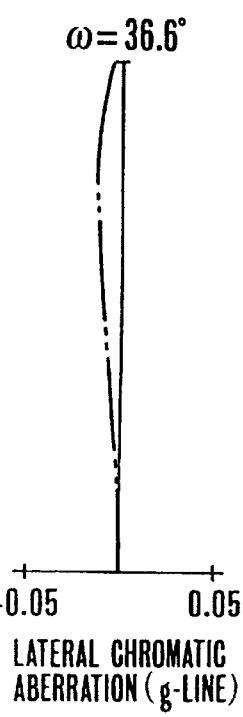
Figure 54A:
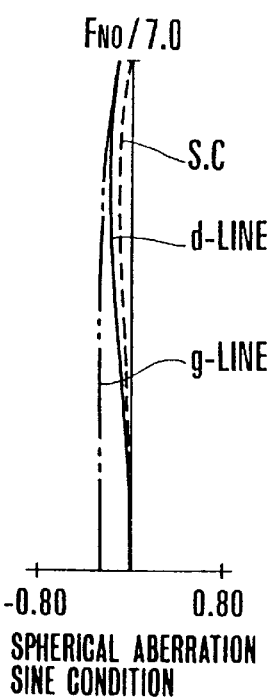
FIGS. 54A–54D are graphic representations of the aberrations of the numerical example 9 of the invention in a middle position with an object at infinity.
Figure 54B:
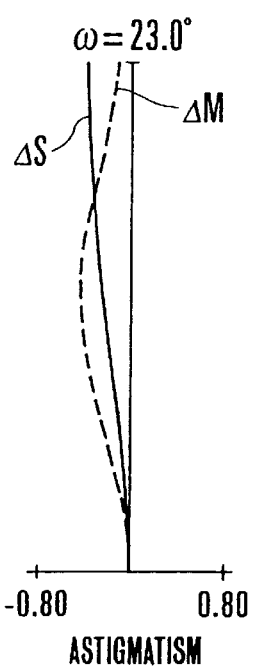
Figure 54C:
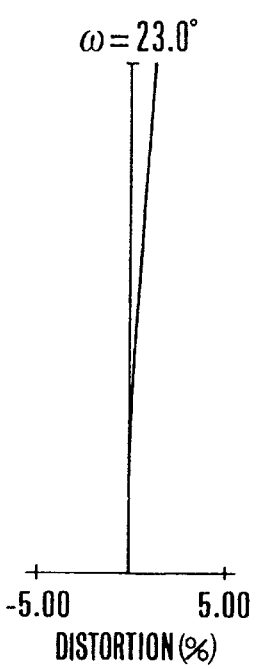
Figure 54D:
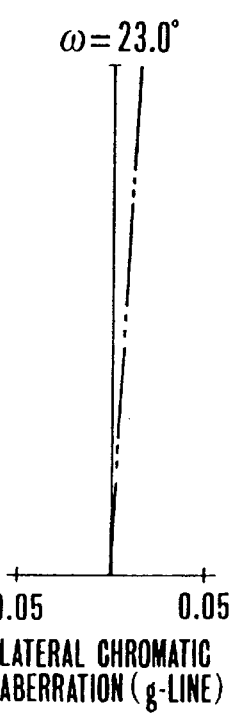
Figure 55A:
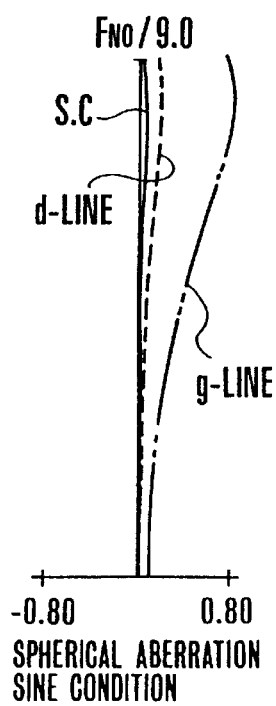
FIGS. 55A–55D are graphic representations of the aberrations of the numerical example 9 of the invention in the telephoto end with an object at infinity.
Figure 55B:
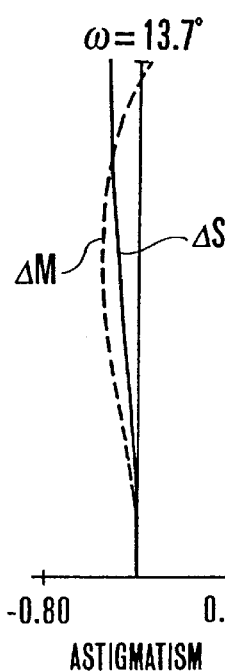
Figure 55C:
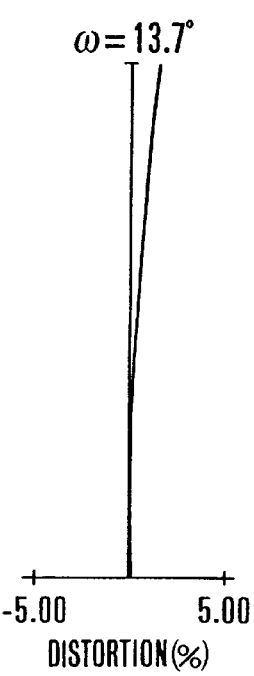
Figure 55D:
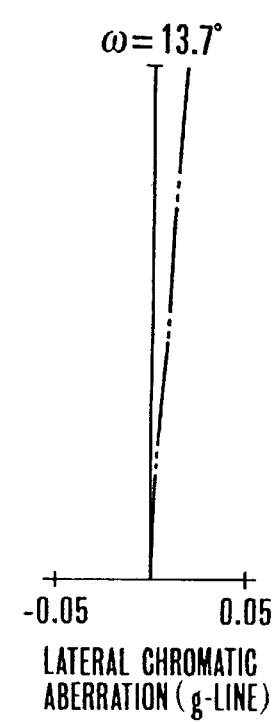
Figure 56A:
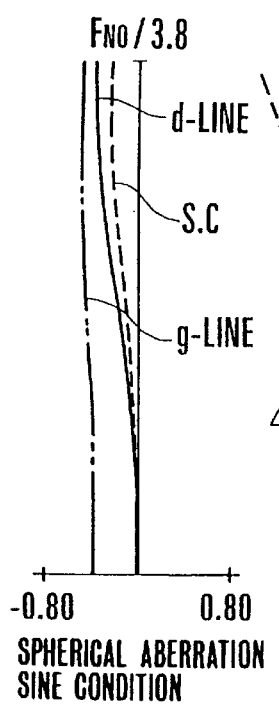
FIGS. 56A–56D are graphic representations of the aberrations of the numerical example 9 of the invention in the wide-angle end with an object at 800 mm from the image plane.
Figure 56B:
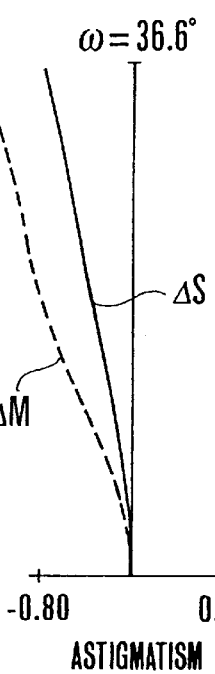
Figure 56C:
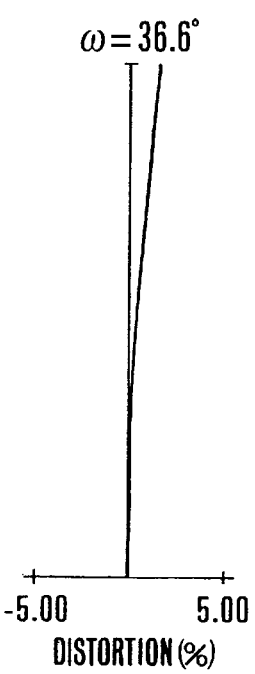
Figure 56D:
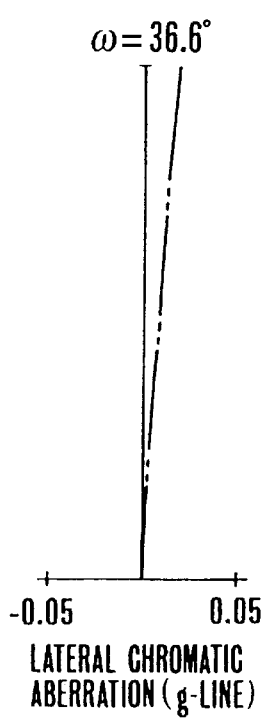
Figure 59A:
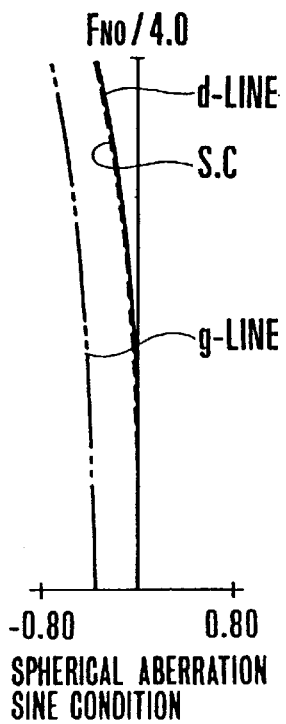
FIGS. 59A–59D are graphic representations of the aberrations of the numerical example 10 of the invention in the wide-angle end with an object at infinity.
Figure 59B:
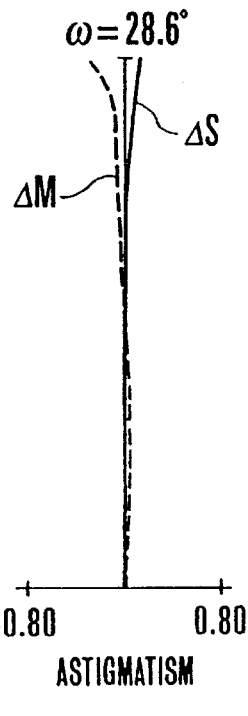
Figure 59C:
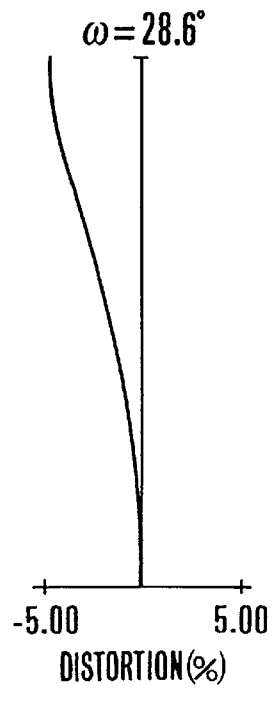
Figure 59D:
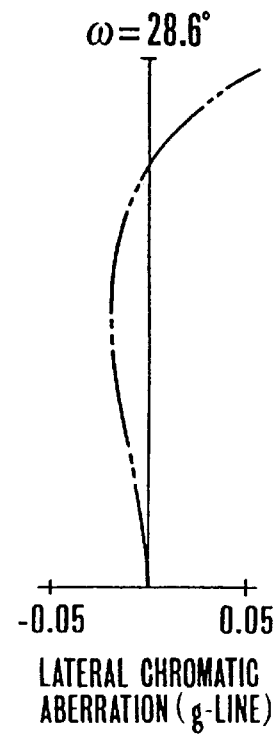
Figure 60A:
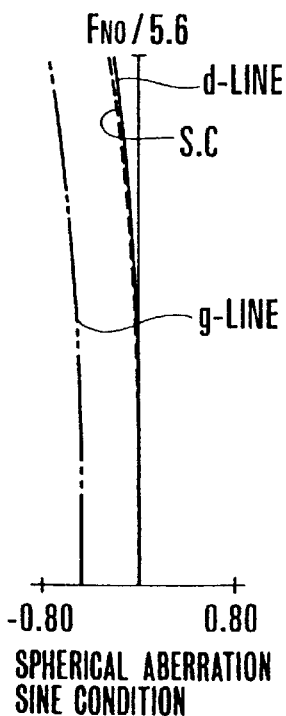
FIGS. 60A–60D are graphic representations of the aberrations of the numerical example 10 of the invention in a middle position with an object at infinity.
Figure 60B:
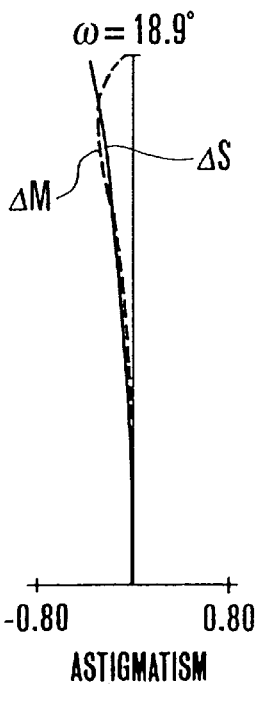
Figure 60C:
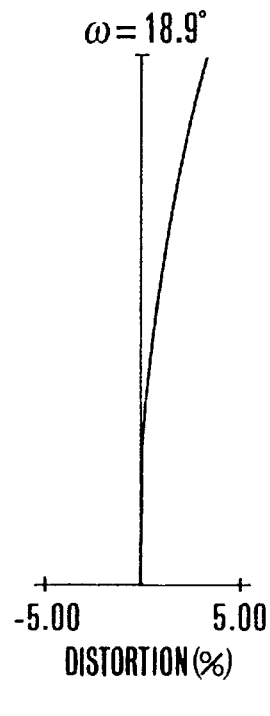
Figure 60D:
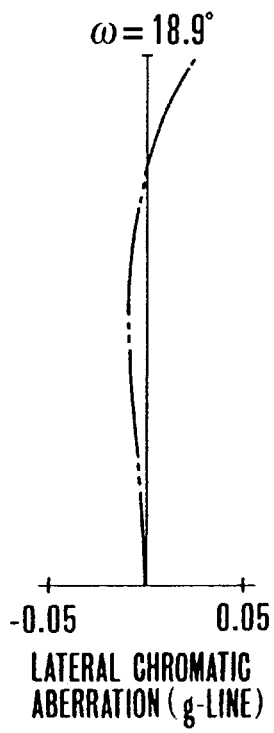
Figure 61A:
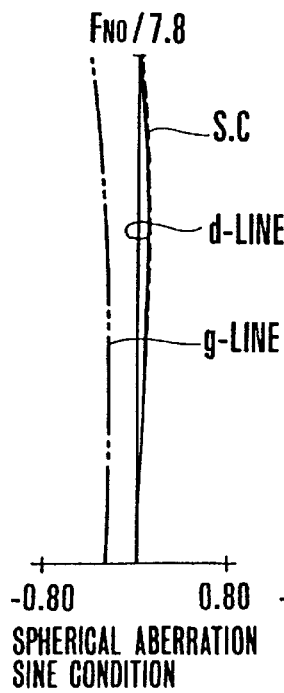
FIGS. 61A–61D are graphic representations of the aberrations of the numerical example 10 of the invention in the telephoto end with an object at infinity.
Figure 61B:
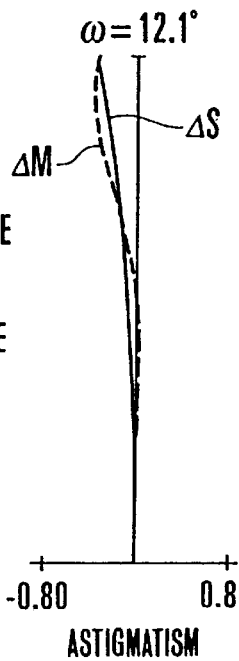
Figure 61C:
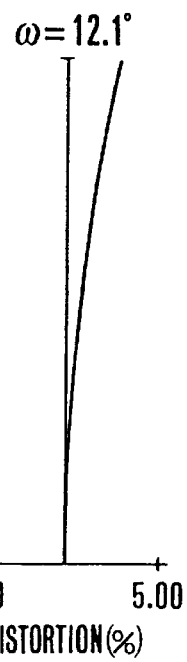
Figure 61D:
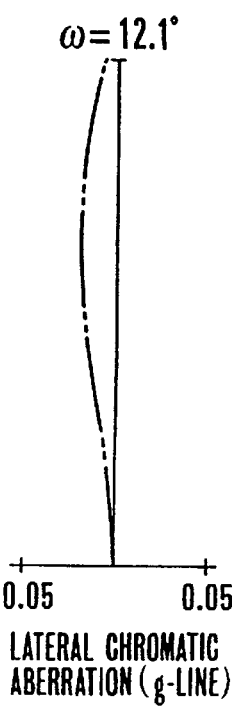
Figure 62A:
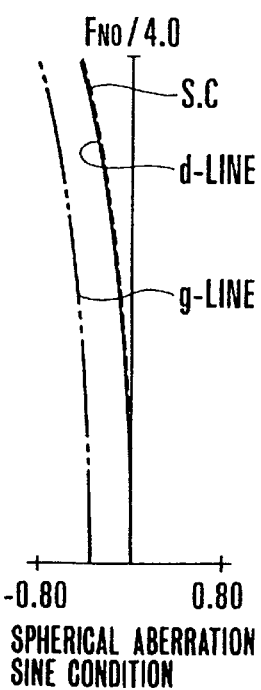
FIGS. 62A–62D are graphic representations of the aberrations of the numerical example 10 of the invention in the wide-angle end with an object at 800 mm from the image plane.
Figure 62B:
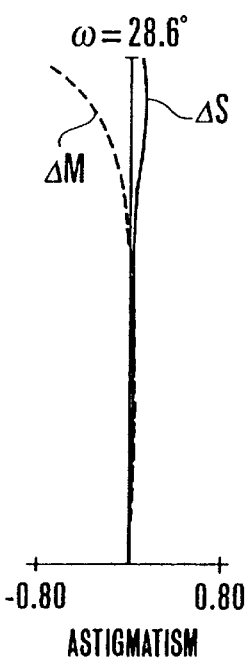
Figure 62C:
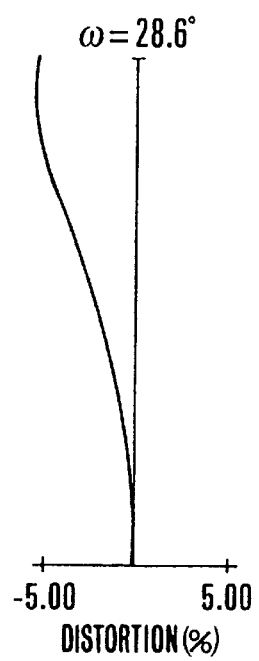
Figure 62D:
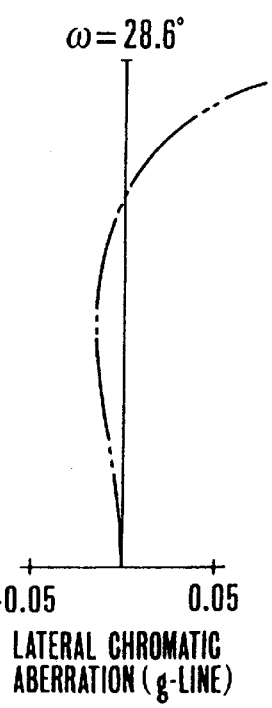
Figure 63A:
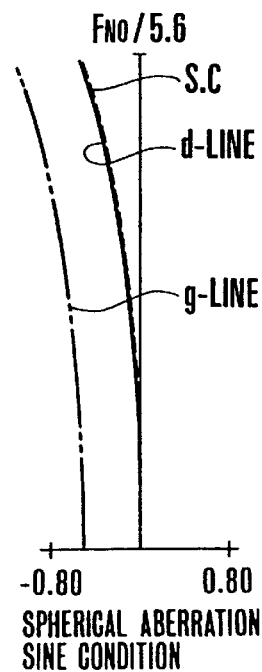
FIGS. 63A–63D are graphic representations of the aberrations of the numerical example 10 of the invention in the middle position with an object at 800 mm from the image plane.
Figure 63B:
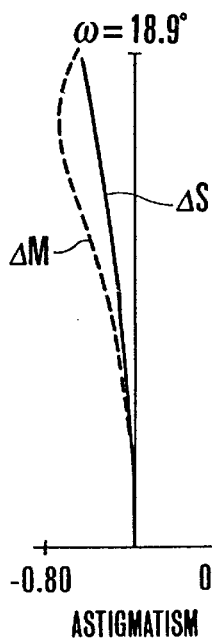
Figure 63C:
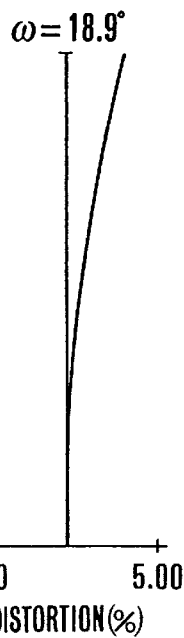
Figure 63D:
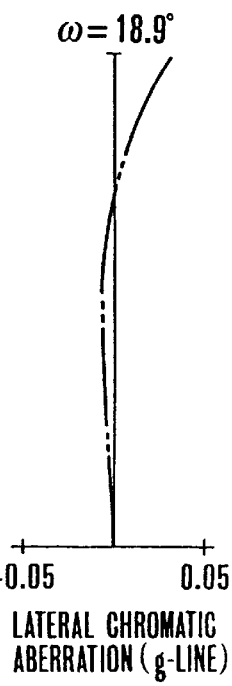
Figure 64A:
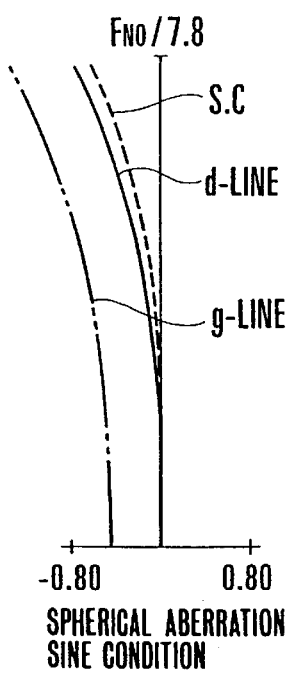
FIGS. 64A–64D are graphic representations of the aberrations of the numerical example 10 of the invention in the telephoto end with an object at 800 mm from the image plane.
Figure 64B:
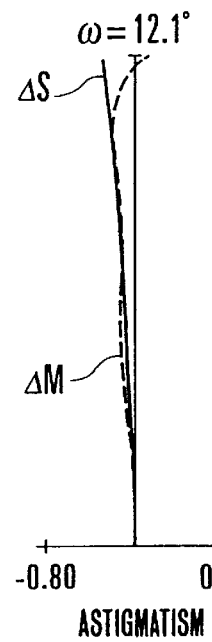
Figure 64C:
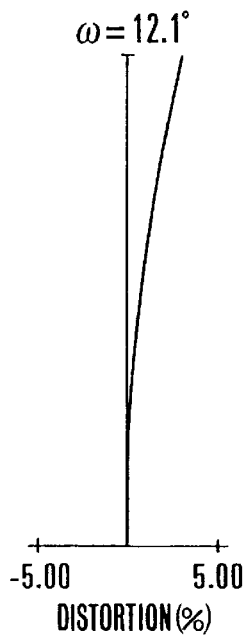
Figure 64D:
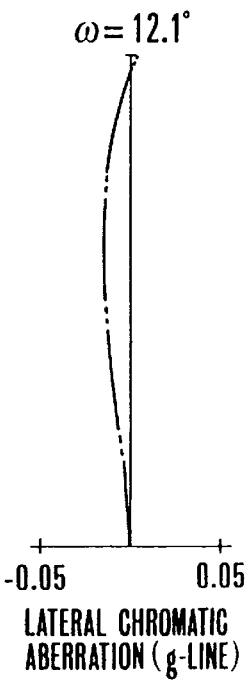

A zoom lens of numerical example 10 shown in FIG. 31 includes, from front to rear, a first lens group L1 of positive refractive power which has a lens unit L11 of positive refractive power comprising a negative lens of meniscus shape convex toward the object side and a positive lens having a convex surface facing the object side, a stop SP and a lens unit L12 of positive refractive power comprising a doublet consisting of a negative lens having a concave surface facing the object side and a positive lens cemented together and a doublet consisting of a negative lens of meniscus shape convex toward the object side and a positive lens of which both surfaces are convex cemented together, totaling two lens units.

A lens group L2 of negative refractive power is further included, which has a lens unit L21 in the form of a doublet consisting of a positive lens of meniscus shape convex toward the image side and a negative lens of which both surfaces are concave cemented together and whose overall refractive power is negative and a lens unit L22 of negative refractive power comprising a negative lens in the form of a singlet of which both surfaces are concave, totaling two lens units.

When zooming from the wide-angle end to the telephoto end, the lens units axially move in differential relation like the arrows such that the separation between the lens unit L11 and the lens unit L12 increases, while the separation between the lens group L1 and the lens group L2 decreases. Focusing is performed by the lens unit L21.

Next, the numerical data for the numerical examples 6 to 10 of the invention are shown in the following tables, wherein Ri is the radius of curvature of the i-th lens surface, when counted from the object side, Di is the i-th lens thickness or air separation, when counted from the object side, and Ni and vi are respectively the refractive index and Abbe number of the glass of the i-th lens element, when counted from the object side.

The values of the factors in the before-described conditions for the numerical examples 6 to 10 are listed in Table-2.

The shape of the aspheric surface is expressed in the coordinates with an X axis in the axial direction and an H axis in the perpendicular direction to the optical axis, the direction in which light advances being taken as positive, by the following equation:

$$X = (1/R)H^2/(1+\sqrt{1-(1+K)(H/R)^2}) + AH^2 + BH^4 + CH^6 + DH^8 + EH^{10}$$

where R is the radius of the osculating sphere, and K, A, A, B, C, D and E are the aspheric coefficients.

NUMERICAL EXAMPLE 6

| f = 28.86–101.39 | Fno. = 4.33–9.06 | 2ω = 73.7°–24.1° |
|---|---|---|

| | | | |
|---|---|---|---|
| R1 = 53.81 | D1 = 2.40 | N1 = 1.84665 | v1 = 23.8 |
| R2 = 1346.34 | D2 = Variable | | |
| R3 = −48.28 | D3 = 1.20 | N2 = 1.67790 | v2 = 54.9 |
| R4 = 20.69 | D4 = Variable | | |
| R5 = 14.96 | D5 = 1.80 | N3 = 1.80609 | v3 = 41.0 |
| R6 = 17.17 | D6 = 3.30 | N4 = 1.58913 | v4 = 61.2 |
| R7 = −20.02 | D7 = 1.00 | N5 = 1.84665 | v5 = 23.8 |
| R8 = −48.60 | D8 = Variable | | |
| R9 = Stop | D9 = 2.00 | | |
| R10 = −20.16 | D10 = 1.20 | N6 = 1.80518 | v6 = 25.4 |
| R11 = −63.02 | D11 = Variable | | |
| R12 = 283.18 | D12 = 4.90 | N7 = 1.73077 | v7 = 40.6 |
| R13 = −14.50 | D13 = Variable | | |
| R14 = −86.38 | D14 = 1.20 | N8 = 1.77249 | v8 = 49.6 |
| R15 = 69.98 | D15 = 2.20 | N9 = 1.69894 | v9 = 30.1 |
| R16 = 86.43 | D16 = 6.47 | | |
| R17 = −27.85 | D17 = 1.50 | N10 = 1.74319 | v10 = 49.3 |
| R18 = −4518.62 | | | |

| Variable | Focal Length | | |
|---|---|---|---|
| Separations | 28.86 | 54.10 | 101.39 |
| D2 | 2.58 | 2.02 | 2.92 |
| D4 | 8.10 | 5.59 | 0.99 |
| D8 | 3.19 | 5.94 | 6.94 |
| D11 | 3.31 | 5.68 | 7.36 |
| D13 | 7.73 | 2.31 | 0.99 |

The Values of Aspheric Coefficients:
R4: K = 2.482 × 10⁻¹  A = 0  B = −1.870 × 10⁻⁵
    C = −4.346 × 10⁻⁸  D = −2.257 × 10⁻¹⁰  E = 0
R10: K = 4.04329  A = 0  B = −6.210 × 10⁻⁵
    C = −2.925 × 10⁻⁷  D = −8.844 × 10⁻⁹  E = 0
R13: K = −2.81235  A = 0  B = −8.961 × 10⁻⁵
    C = 2.350 × 10⁻⁷  D = −6.170 × 10⁻¹⁰  E = 0

NUMERICAL EXAMPLE 7

| f = 28.87–100.96 | Fno. = 4.33–9.06 | 2ω = 73.7°–24.2° |
|---|---|---|

| | | | |
|---|---|---|---|
| R1 = 53.62 | D1 = 2.40 | N1 = 1.84665 | v1 = 23.8 |
| R2 = 2359.07 | D2 = Variable | | |
| R3 = −47.19 | D3 = 1.20 | N2 = 1.67790 | v2 = 54.9 |
| R4 = 20.14 | D4 = Variable | | |
| R5 = 15.03 | D5 = 1.80 | N3 = 1.80609 | v3 = 41.0 |
| R6 = 17.51 | D6 = 3.30 | N4 = 1.58913 | v4 = 61.2 |
| R7 = −18.42 | D7 = 1.00 | N5 = 1.84665 | v5 = 23.8 |
| R8 = −37.77 | D8 = Variable | | |
| R9 = Stop | D9 = 2.00 | | |
| R10 = −19.59 | D10 = 1.20 | N6 = 1.80518 | v6 = 25.4 |
| R11 = −103.12 | D11 = Variable | | |
| R12 = 158.88 | D12 = 4.90 | N7 = 1.73077 | v7 = 40.6 |
| R13 = −14.29 | D13 = Variable | | |
| R14 = −74.61 | D14 = 1.20 | N8 = 1.77249 | v8 = 49.6 |
| R15 = 48.59 | D15 = 2.93 | | |
| R16 = 62.86 | D16 = 2.50 | N9 = 1.69894 | v9 = 30.1 |
| R17 = 155.09 | D17 = 4.03 | | |
| R18 = −30.71 | D18 = 1.50 | N10 = 1.74319 | v10 = 49.3 |
| R19 = −2469.17 | | | |

| Variable | Focal Length | | |
|---|---|---|---|
| Separations | 28.87 | 53.99 | 100.96 |
| D2 | 2.60 | 1.78 | 3.17 |
| D4 | 8.13 | 6.00 | 0.99 |
| D8 | 3.11 | 5.62 | 6.81 |
| D11 | 3.14 | 5.32 | 7.05 |
| D13 | 7.90 | 2.07 | 0.99 |

The Values of Aspheric Coefficients:
R4: K = 2.354 × 10⁻¹  A = 0  B = −1.566 × 10⁻⁵
    C = −5.423 × 10⁻⁸  D = −1.294 × 10⁻¹⁰  E = 0
R10: K = 3.68674  A = 0  B = −6.371 × 10⁻⁵
    C = −3.434 × 10⁻⁷  D = −1.145 × 10⁻⁸  E = 0
R13: K = −2.86420  A = 0  B = −9.380 × 10⁻⁵
    C = 2.964 × 10⁻⁷  D = −8.088 × 10⁻¹⁰  E = 0

NUMERICAL EXAMPLE 8

| f = 28.84–102.90 | Fno. = 4.33–9.06 | 2ω = 73.8°–23.8° |
|---|---|---|

| | | | |
|---|---|---|---|
| R1 = −74.16 | D1 = 1.10 | N1 = 1.77249 | v1 = 49.6 |
| R2 = 20.25 | D2 = 1.12 | | |

-continued

| | | | |
|---|---|---|---|
| R3 = 26.77 | D3 = 2.20 | N2 = 1.84665 | ν2 = 23.8 |
| R4 = 62.61 | D4 = Variable | | |
| R5 = 14.84 | D5 = 1.80 | N3 = 1.80609 | ν3 = 41.0 |
| R6 = 17.26 | D6 = 4.10 | N4 = 1.58913 | ν4 = 61.2 |
| R7 = −19.94 | D7 = 1.00 | N5 = 1.84665 | ν5 = 23.8 |
| R8 = −39.89 | D8 = Variable | | |
| R9 = Stop | D9 = 2.00 | | |
| R10 = −19.68 | D10 = 1.20 | N6 = 1.80518 | ν6 = 25.4 |
| R11 = −75.03 | D11 = Variable | | |
| R12 = −5905.34 | D12 = 4.30 | N7 = 1.73077 | ν7 = 40.6 |
| R13 = −15.04 | D13 = Variable | | |
| R14 = −55.39 | D14 = 1.20 | N8 = 1.77249 | ν8 = 49.6 |
| R15 = 39.93 | D15 = 2.29 | | |
| R16 = 37.23 | D16 = 3.00 | N9 = 1.69894 | ν9 = 30.1 |
| R17 = 152.45 | D17 = 3.00 | | |
| R18 = −41.23 | D18 = 1.50 | N10 = 1.77249 | ν10 = 49.6 |
| R19 = 91.48 | | | |

| Variable Separations | Focal Length | | |
|---|---|---|---|
| | 28.84 | 54.48 | 102.90 |
| D4 | 8.25 | 5.09 | 1.03 |
| D8 | 3.89 | 6.21 | 7.23 |
| D11 | 2.44 | 4.74 | 6.03 |
| D13 | 7.56 | 2.56 | 0.97 |

The Values of Aspheric Coefficients:
R1: $K = -1.350 \times 10^{-1}$  $A = 0$  $B = -3.125 \times 10^{-6}$
   $C = -2.570 \times 10^{-8}$  $D = -3.970 \times 10^{-11}$  $E = 0$
R10: $K = 3.77316$  $A = 0$  $B = -8.280 \times 10^{-5}$
   $C = -4.129 \times 10^{-7}$  $D = -1.164 \times 10^{-8}$  $E = 0$
R13: $K = -2.97836$  $A = 0$  $B = -1.000 \times 10^{-4}$
   $C = 2.620 \times 10^{-7}$  $D = -1.139 \times 10^{-9}$  $E = 0$

NUMERICAL EXAMPLE 9 f = 29.18–88.82   Fno. = 3.75–9.00   2ω = 73.1°–27.4°

| | | | |
|---|---|---|---|
| R1 = −205.07 | D1 = 2.80 | N1 = 1.51633 | ν1 = 64.2 |
| R2 = −42.00 | D2 = 1.20 | N2 = 1.80400 | ν2 = 46.6 |
| R3 = 16.58 | D3 = 2.34 | | |
| R4 = 20.25 | D4 = 4.20 | N3 = 1.84665 | ν3 = 23.8 |
| R5 = 200.06 | D5 = Variable | | |
| R6 = 17.29 | D6 = 0.90 | N4 = 1.84665 | ν4 = 23.8 |
| R7 = 11.68 | D7 = 5.20 | N5 = 1.48749 | ν5 = 70.2 |
| R8 = −20.58 | D8 = 0.90 | N6 = 1.84665 | ν6 = 23.8 |
| R9 = −29.72 | D9 = Variable | | |
| R10 = Stop | D10 = 2.00 | | |
| R11 = −24.06 | D11 = 2.00 | N7 = 1.80518 | ν7 = 25.4 |
| R12 = −35.93 | D12 = 0.73 | | |
| R13 = −22.89 | D13 = 1.30 | N8 = 1.65159 | ν8 = 58.5 |
| R14 = 73.08 | D14 = 4.00 | N9 = 1.77249 | ν9 = 49.6 |
| R15 = −13.31 | D15 = Variable | | |
| R16 = −66.06 | D16 = 1.20 | N10 = 1.77249 | ν10 = 49.6 |
| R17 = 50.01 | D17 = 2.26 | | |
| R18 = 41.36 | D18 = 2.90 | N11 = 1.69894 | ν11 = 30.1 |
| R19 = 221.99 | D19 = 5.02 | | |
| R20 = −23.64 | D20 = 1.50 | N12 = 1.77249 | ν12 = 49.6 |
| R21 = −173.10 | | | |

| Variable Separations | Focal Length | | |
|---|---|---|---|
| | 29.18 | 50.91 | 88.82 |
| D5 | 7.60 | 5.46 | 2.62 |
| D9 | 5.30 | 10.56 | 13.45 |
| D15 | 11.94 | 5.16 | 0.99 |

The Values of Aspheric Coefficients:
R3: $K = 2.216 \times 10$  $A = 0$  $B = -1.254 \times 10^{-5}$
   $C = 2.253 \times 10^{-8}$  $D = -5.639 \times 10^{-10}$  $E = 0$
R11: $K = 6.26902$  $A = 0$  $B = -6.294 \times 10^{-5}$
   $C = -3.412 \times 10^{7}$  $D = -9.389 \times 10^{-9}$  $E = 0$ -continued R15: $K = -2.72205$  $A = 0$  $B = -1.510 \times 10^{-4}$
   $C = 1.387 \times 10^{-7}$  $D = -3.214 \times 10^{-9}$  $E = 0$

NUMERICAL EXAMPLE 10 f = 39.67–101.24   Fno. = 4.00–7.80   2ω = 57.2°–24.1°

| | | | |
|---|---|---|---|
| R1 = 48.86 | D1 = 1.20 | N1 = 1.84665 | ν1 = 23.9 |
| R2 = 35.56 | D2 = 0.30 | | |
| R3 = 24.35 | D3 = 2.80 | N2 = 1.48749 | ν2 = 70.2 |
| R4 = 166.60 | D4 = Variable | | |
| R5 = Stop | D5 = 2.00 | | |
| R6 = −17.23 | D6 = 1.20 | N3 = 1.48749 | ν3 = 70.2 |
| R7 = −168.98 | D7 = 8.49 | N4 = 1.80517 | ν4 = 25.4 |
| R8 = −33.56 | D8 = 4.74 | | |
| R9 = 36.00 | D9 = 1.10 | N5 = 1.84665 | ν5 = 23.9 |
| R10 = 17.05 | D10 = 5.30 | N6 = 1.58312 | ν6 = 59.4 |
| R11 = −30.35 | D11 = Variable | | |
| R12 = −49.04 | D12 = 3.40 | N7 = 1.69894 | ν7 = 30.1 |
| R13 = −25.21 | D13 = 1.10 | N8 = 1.58913 | ν8 = 61.2 |
| R14 = 85.79 | D14 = 8.00 | | |
| R15 = −65.34 | D15 = 1.50 | N9 = 1.63853 | ν9 = 55.4 |
| R16 = 169.94 | | | |

| Variable Separations | Focal Length | | |
|---|---|---|---|
| | 39.67 | 64.41 | 101.24 |
| D4 | 0.90 | 12.13 | 21.64 |
| D11 | 15.70 | 7.21 | 1.19 |

The Values of Aspheric Coefficients:
R11: $K = -3.015 \times 10^{-2}$  $A = 0$  $B = 8.045 \times 10^{-6}$
   $C = -1.134 \times 10^{-7}$  $D = 1.843 \times 10^{-9}$  $E = -1.305 \times 10^{-11}$

TABLE 2

| | Numerial Example | | | | |
|---|---|---|---|---|---|
| Factor | 6 | 7 | 8 | 9 | 10 |
| \|fL2/fW\| | 0.71 | 0.73 | 0.69 | 0.76 | 0.67 |
| fL2/fL21 | 0.38 | 0.55 | 0.66 | 0.61 | 0.51 |
| βL2W | 1.46 | 1.47 | 1.53 | 1.40 | 1.32 |
| fL1W/fW | 0.69 | 0.68 | 0.65 | 0.71 | 0.76 |

It will be appreciated from the foregoing that, according to the invention, in the second embodiment thereof, the rear focus type is used, and the paraxial refractive power arrangement of the entire system, the zooming movements of all the lens groups and units, and other rules of lens design are made appropriate to maintain good stability of aberration correction throughout the entire zooming range and throughout the entire focusing range, thus achieving a wide-angle high range zoom lens.

Figure 66:
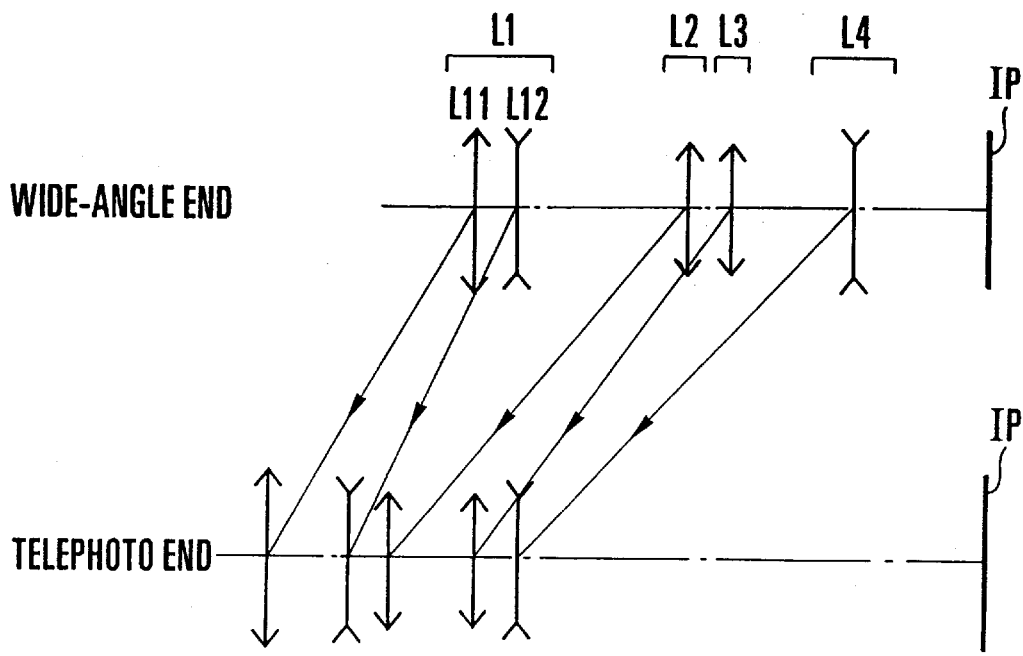
FIG. 66 is a diagram to explain the variation of the paraxial refractive power arrangement for numerical examples 11 to 13 of the invention.
Figure 67:
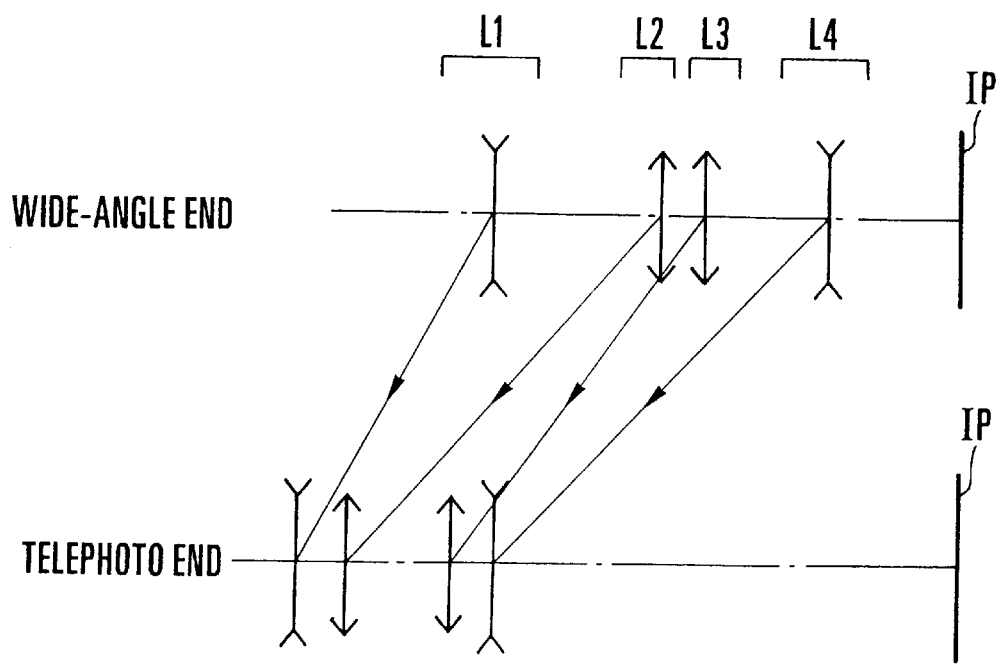
FIG. 67 is a diagram to explain the variation of the paraxial refractive power arrangement for numerical examples 14 and 15 of the invention.
Figure 68:
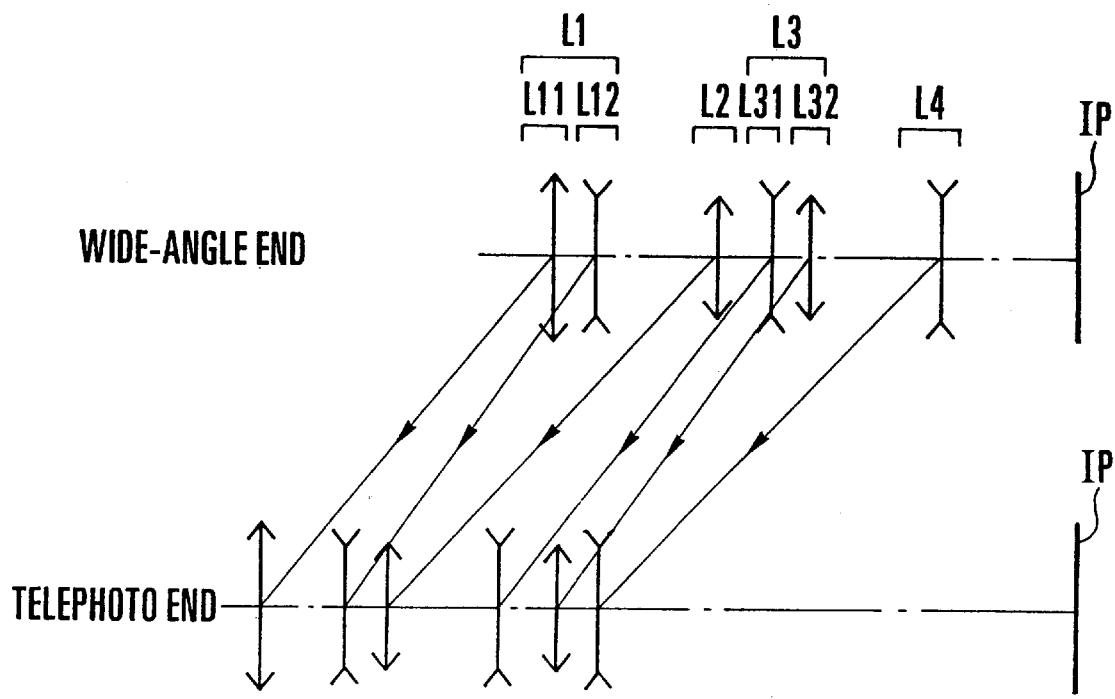
FIG. 68 is a diagram to explain the variation of the paraxial refractive power arrangement for numerical examples 16 and 17 of the invention.
Figure 69:
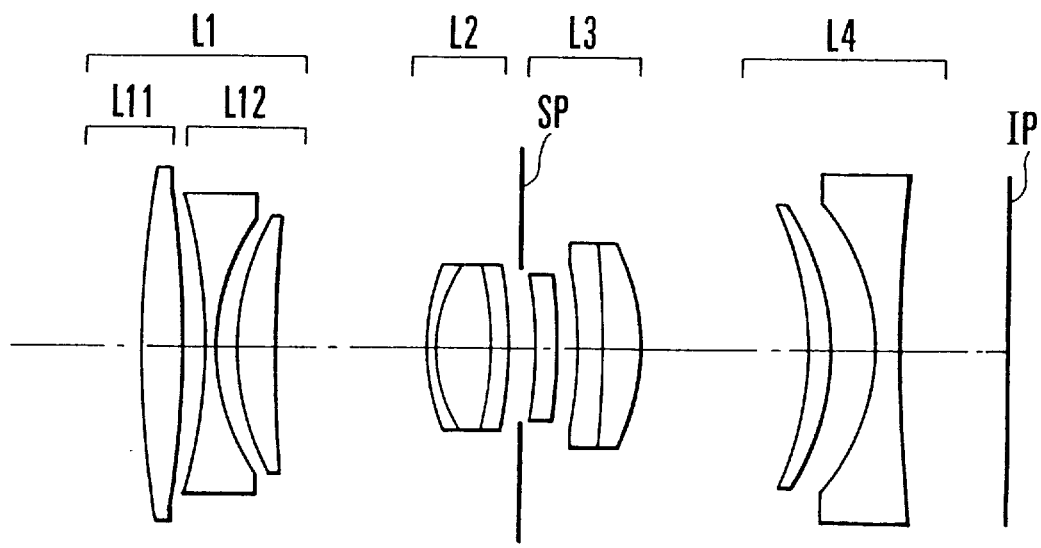
FIG. 69 is a lens block diagram of the numerical example 11 of the invention in the wide-angle end.
Figure 70:
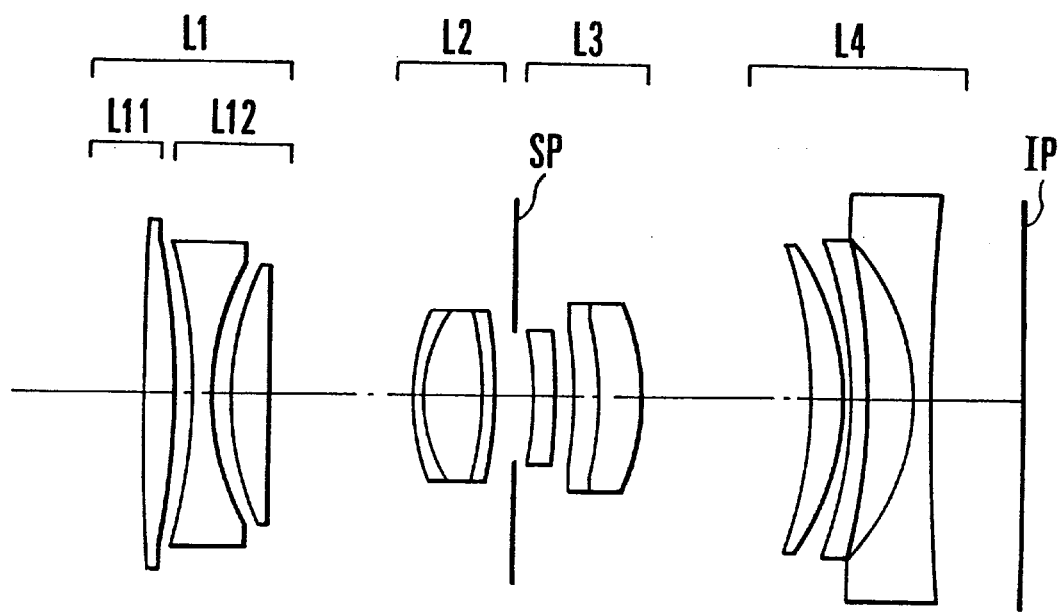
FIG. 70 is a lens block diagram of the numerical example 12 of the invention in the wide-angle end.
Figure 71:
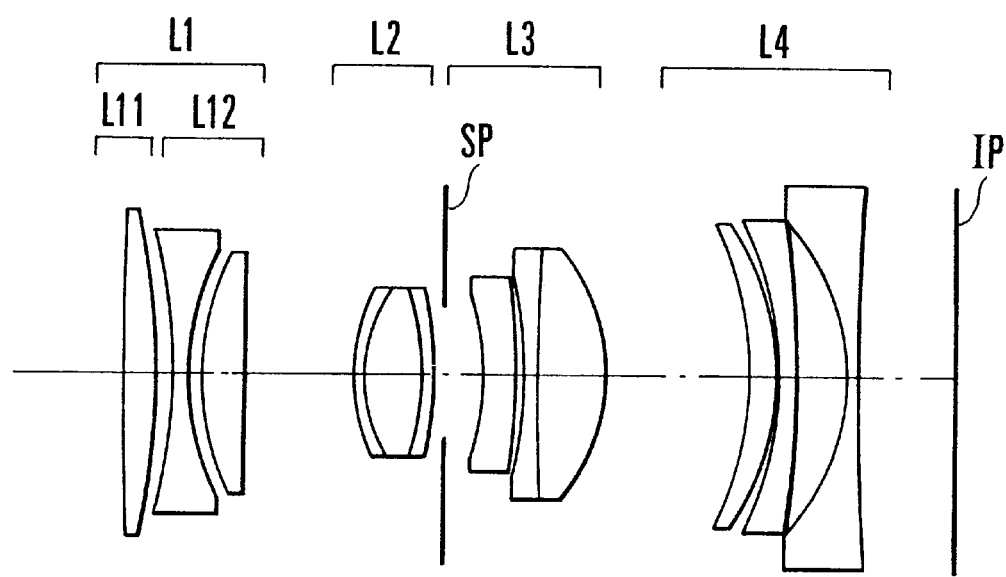
FIG. 71 is a lens block diagram of the numerical example 13 of the invention in the wide-angle end.
Figure 72:
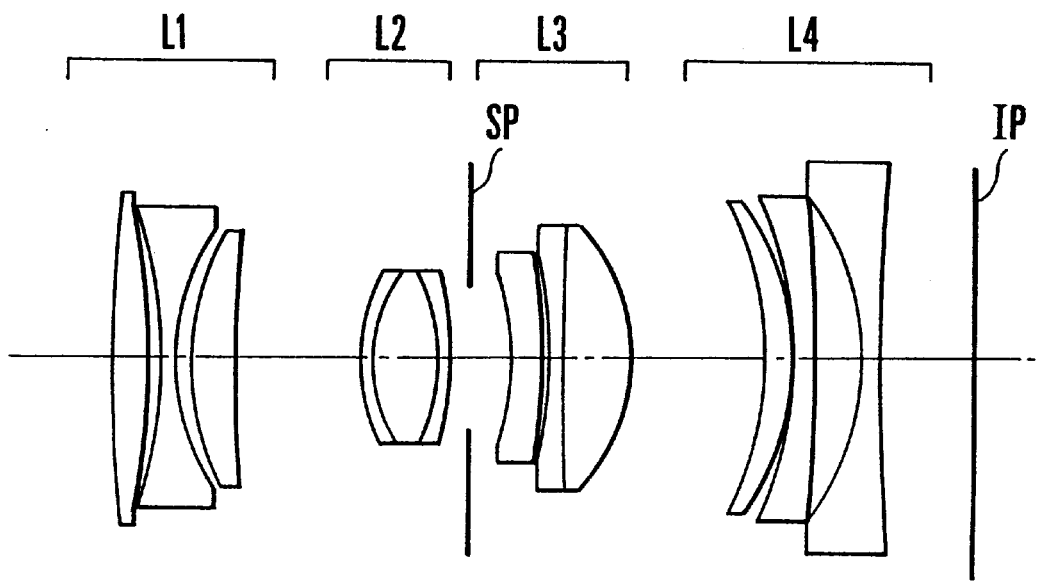
FIG. 72 is a lens block diagram of the numerical example 14 of the invention in the wide-angle end.
Figure 73:
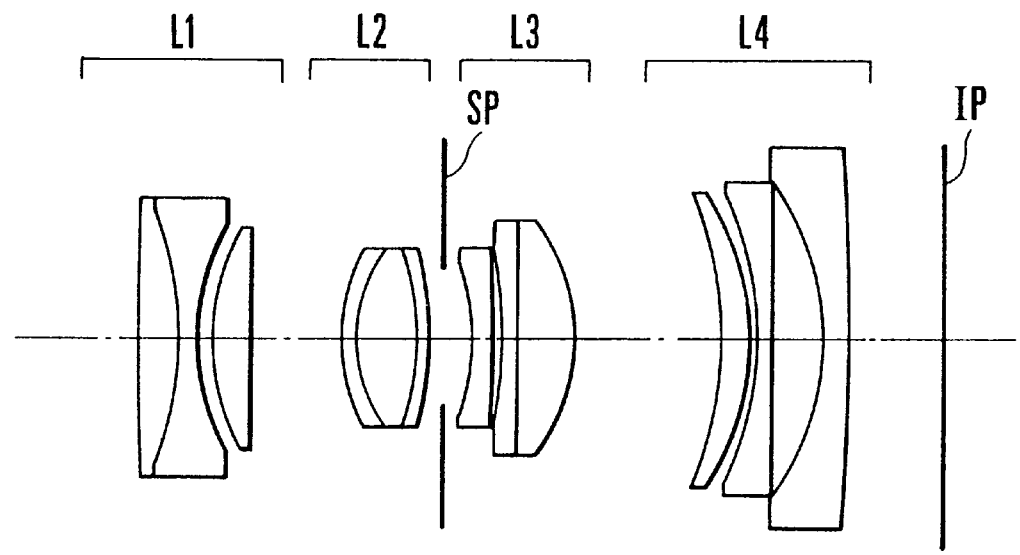
FIG. 73 is a lens block diagram of the numerical example 15 of the invention in the wide-angle end.
Figure 74:
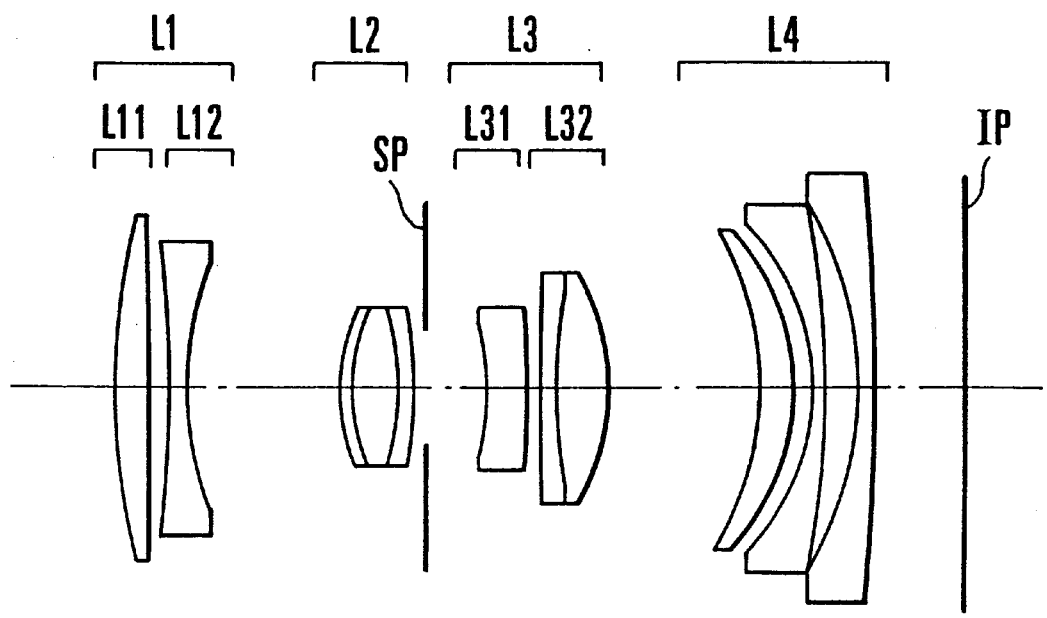
FIG. 74 is a lens block diagram of the numerical example 16 of the invention in the wide-angle end.
Figure 75:
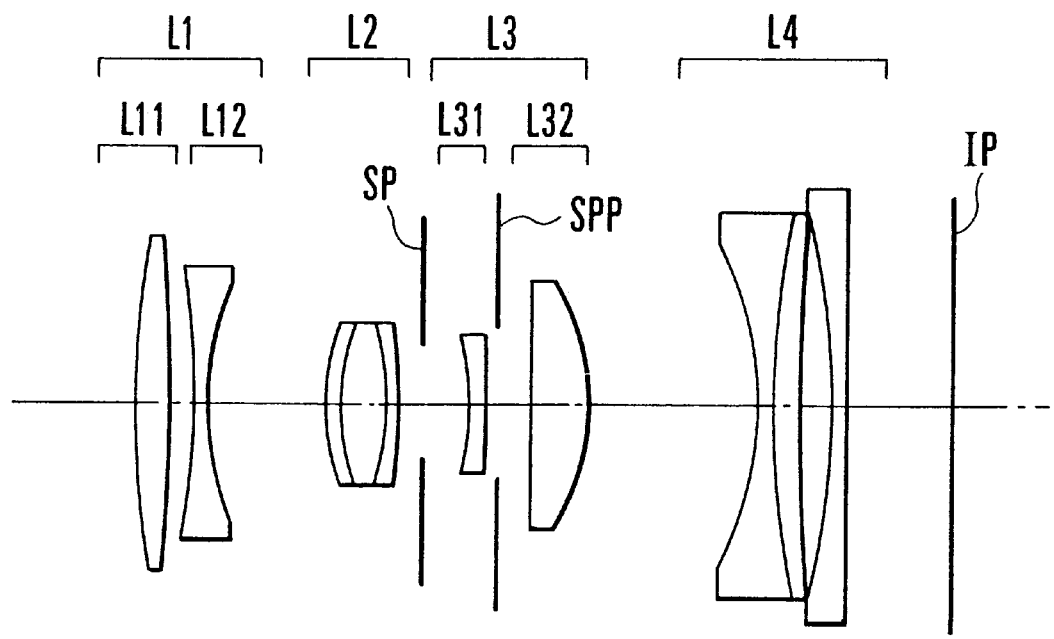
FIG. 75 is a lens block diagram of the numerical example 17 of the invention in the wide-angle end.
Figure 82A:
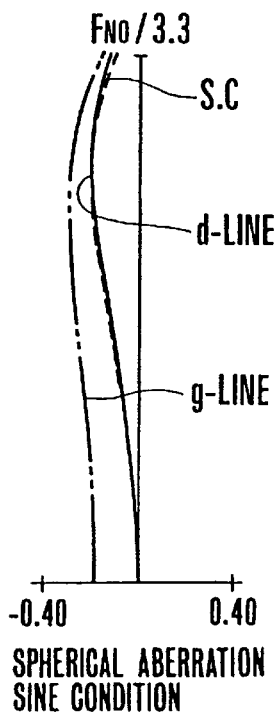
FIGS. 82A–82D are graphic representations of the aberrations of the numerical example 13 of the invention in the wide-angle end.
Figure 82B:
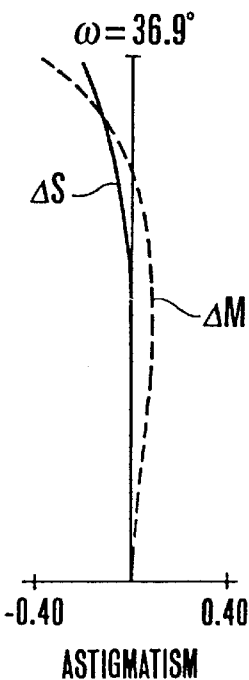
Figure 82C:
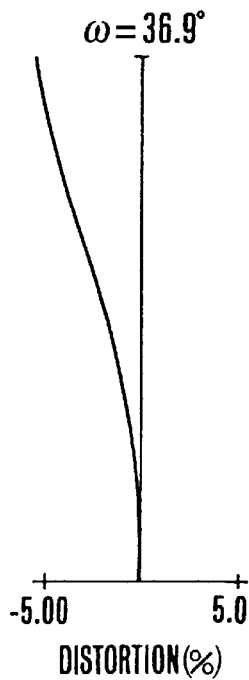
Figure 82D:
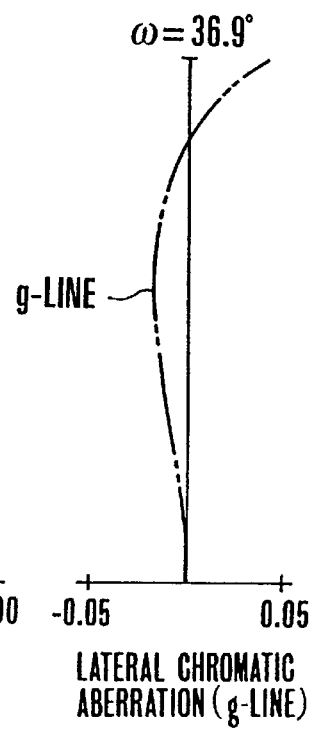
Figure 83A:
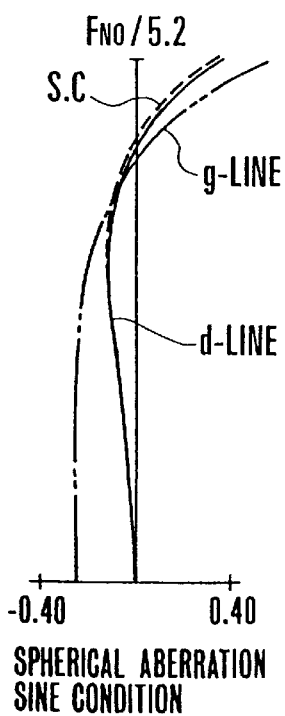
FIGS. 83A–83D are graphic representations of the aberrations of the numerical example 13 of the invention in a middle position.
Figure 83B:
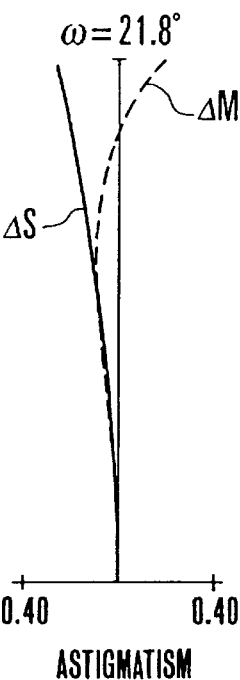
Figure 83C:
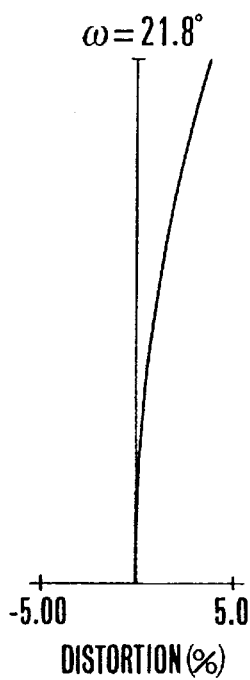
Figure 83D:
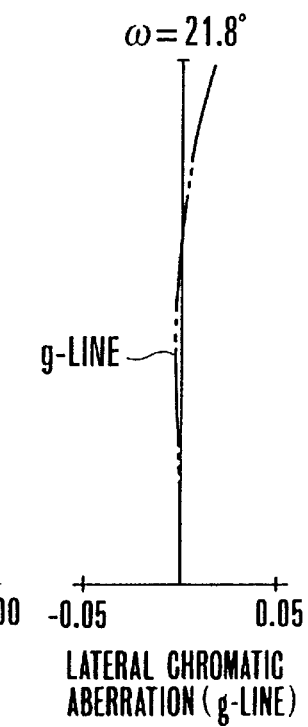
Figure 88A:
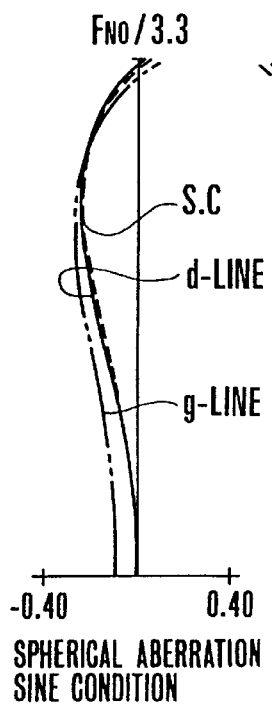
FIGS. 88A–88D are graphic representations of the aberrations of the numerical example 15 of the invention in the wide-angle end.
Figure 88B:
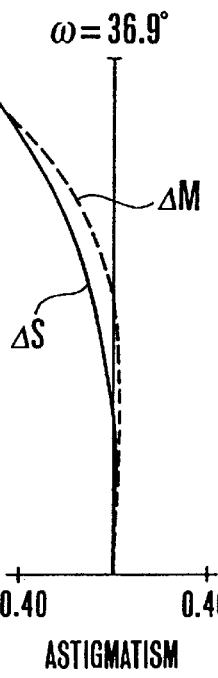
Figure 88C:
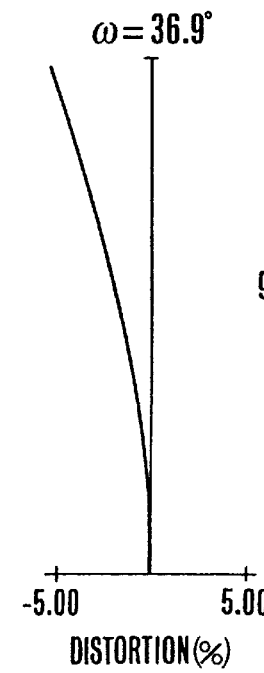
Figure 88D:
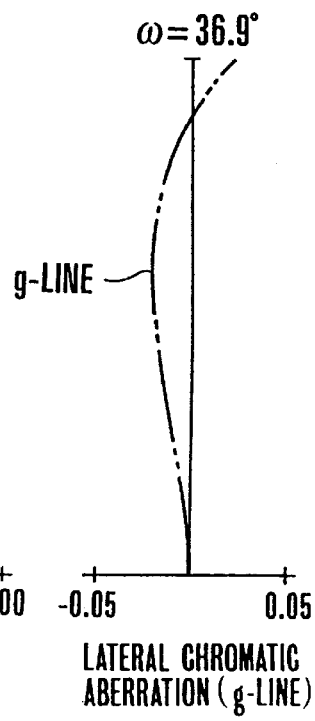
Figure 89A:
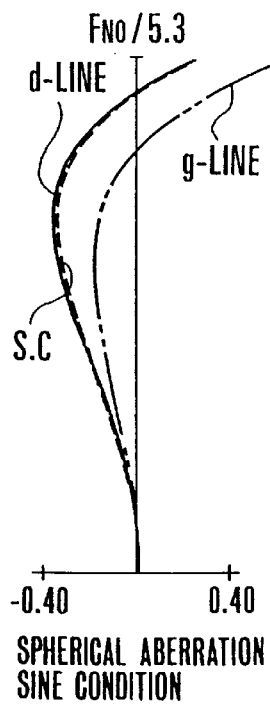
FIGS. 89A–89D are graphic representations of the aberrations of the numerical example 15 of the invention in a middle position.
Figure 89B:
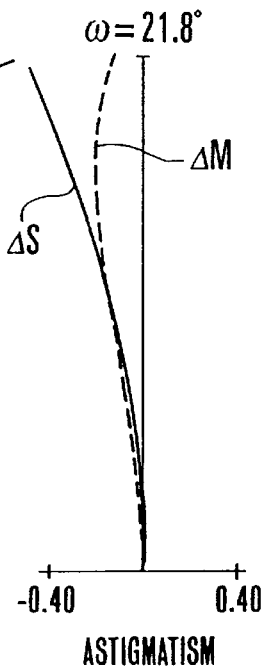
Figure 89C:
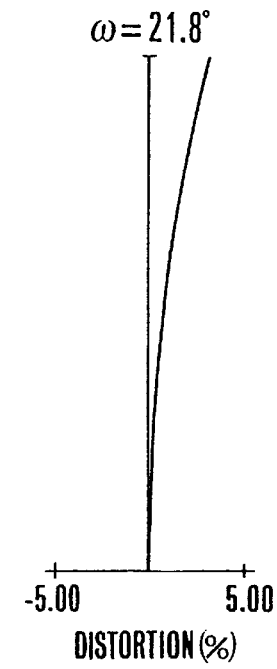
Figure 89D:
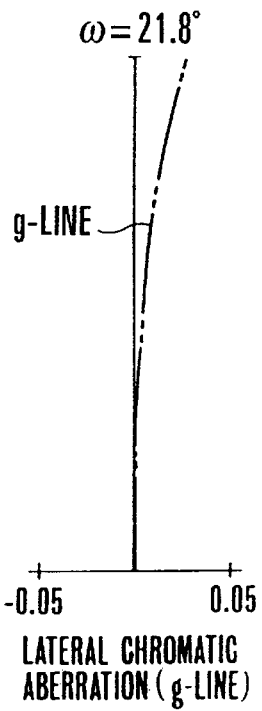
Figure 92A:
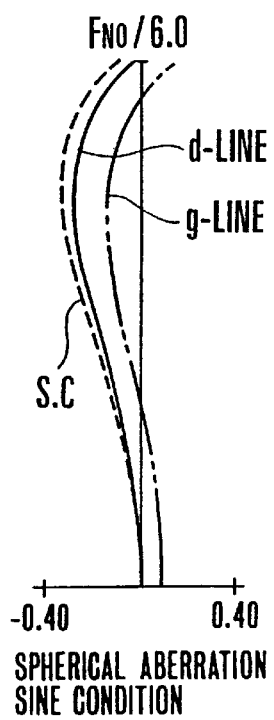
FIGS. 92A–92D are graphic representations of the aberrations of the numerical example 16 of the invention in a middle position.
Figure 92B:
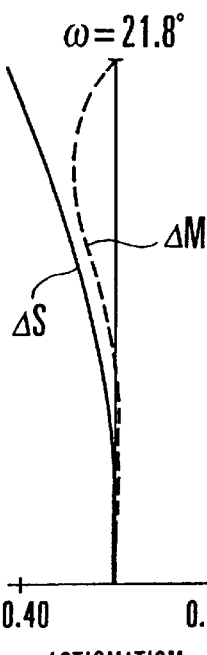
Figure 92C:
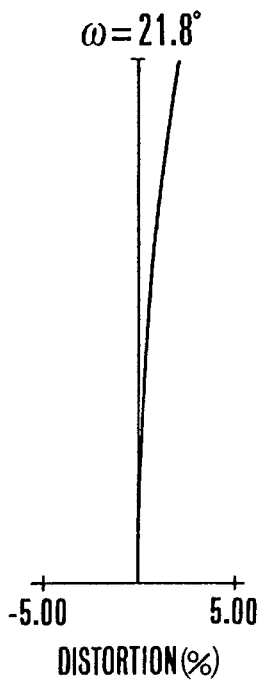
Figure 92D:
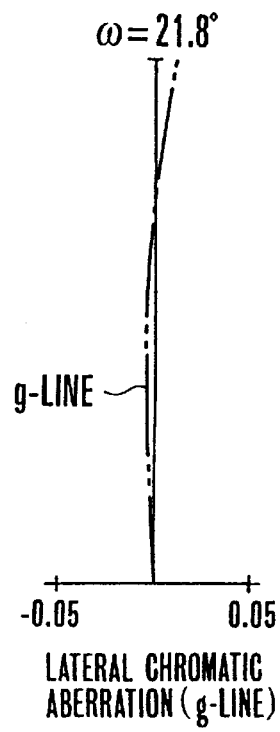
Figure 93A:
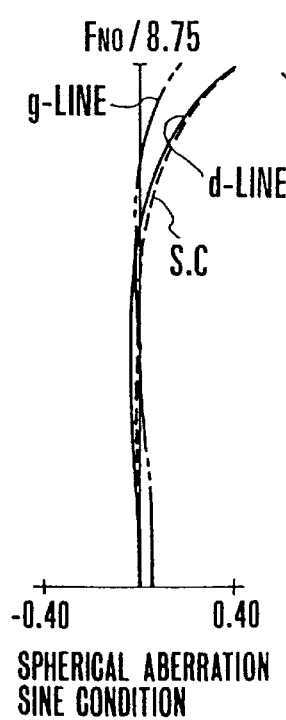
FIGS. 93A–93D are graphic representations of the aberrations of the numerical example 16 of the invention in the telephoto end.
Figure 93B:
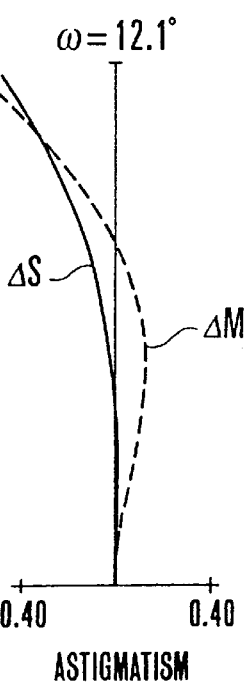
Figure 93C:
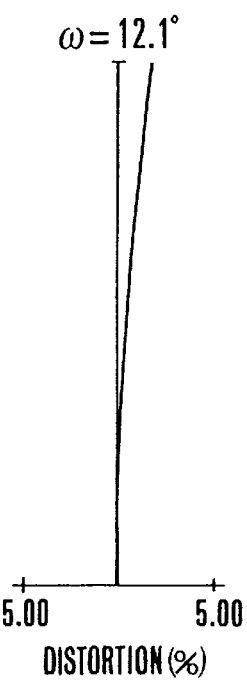
Figure 93D:
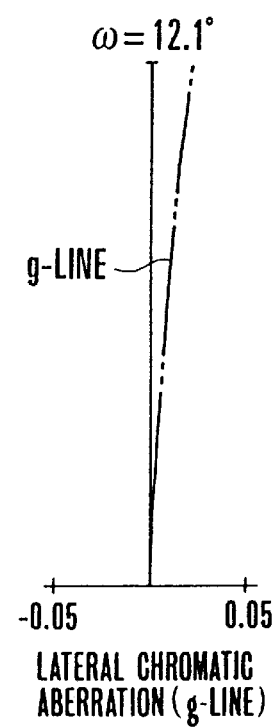

FIG. 66 to FIG. 68 are diagrams to explain the paraxial refractive power arrangements of numerical examples 11 to 17 of zoom lenses of the invention. FIG. 69 to FIG. 75 are longitudinal section views of the zoom lenses of numerical examples 11 to 17 of the invention, respectively. FIG. 76A to FIG. 96D show the aberrations of the numerical examples 11 to 17 of the invention.

In these drawings, L1 is the first lens group of negative refractive power, L2 is the second lens group of positive refractive power, L3 is the third lens group of positive refractive power and L4 is the fourth lens group of negative refractive power. SP is the stop, SPP is the fixed stop, and IP is the image plane.

In the numerical examples 11 to 17 of the present embodiment, when zooming from the wide-angle end to the telephoto end, all the lens groups are made to axially move toward the object side in such relation that the separation between the first lens group L1 and the second lens group L2 and the separation between the third lens group L3 and the fourth lens group L4 decrease, while the separation between the second lens group L2 and the third lens group L3 increases.

In general, the zoom lenses produce lateral chromatic aberration and spherical aberration in some regions of the zooming range. For these aberrations to be corrected effectively, it is desirable to use as small a number of constituent lenses in each lens group as possible. On consideration of the gamut of available real optical glasses, however, such an approach is very difficult to adopt. If one relies on an alternative correcting method which is to increase the number of constituent lenses, these lenses must be so disposed as not to interfere with one another, so that a certain ratio of the corner illumination to the central illumination is assured. In some cases, therefore, it happens that the back focal distance is hardly kept at a predetermined value. In other cases, the outer diameter of the lens system becomes too large, causing the complexity of structure of the operating mechanism to increase largely.

From these reasons, the zoom lenses of the numerical examples 11 to 17 are designed basically as comprising, from front to rear, a first lens group of negative refractive power, a second lens group of positive refractive power, a third lens group of positive refractive power and a fourth lens group of negative refractive power, totaling four lens groups, wherein when zooming from the wide-angle end to the telephoto end, all the lens groups are made to axially move toward the object side in such relation that the separation between the first lens group and the second lens group and the separation between the third lens group and the fourth lens group decrease, while the separation between the second lens group and the third lens group increases. Another basic rule of design is that the whole lens system keeps a nearly symmetric form during zooming. A good stability of optical performance is thus maintained throughout the entire zooming range. Particularly, on the wide-angle side, the whole lens system takes the retrofocus type, thus making it easy to widen the angle of field.

FIG. 66 shows the variation with zooming of the paraxial refractive power arrangement for the numerical examples 11 to 13 of the invention. The first lens group L1 is constructed with two lens units, of which the first lens unit L11 as viewed from the object side is of positive refractive power, and the second lens unit L12 is of negative refractive power. When zooming from the wide-angle end to the telephoto end, the first to the fourth lens groups move as described before and, at the same time, the separation between the lens unit L11 and the lens unit L12 is made to increase. With this, when in the wide-angle end, negative distortion is well corrected and, when in the telephoto end, the telephoto type is formed, thus achieving improvements of the optical performance.

FIG. 67 shows the variation with zooming of the paraxial refractive power arrangement for the numerical examples 14 and 15 of the invention. The first to the fourth lens groups move as described before. In particular, the lens system keeps the symmetric form as a whole during zooming. With this, good optical performance is obtained when in achieving a shortening of the total length for the wide-angle end of the entire system.

FIG. 68 shows the variation with zooming of the paraxial refractive power arrangement for the numerical examples 16 and 17 of the invention. In this instance, the first lens group L1 is constructed with a lens unit L11 of positive refractive power and a lens unit L12 of negative refractive power, and the third lens group L3 is constructed with a lens unit L31 of negative refractive power and a lens unit L32 of positive refractive power. When zooming from the wide-angle end to the telephoto end, the first to the fourth lens groups move as described before and, at the same time, the separation between the lens unit L11 and lens unit L12 increases, while the separation between the lens unit L31 and the lens unit L32 also increases. By this, the off-axial light beam, in particular, is made to pass through the lens unit L32 at a farther position from the optical axis, thus correcting on-axial aberrations and off-axial aberrations in good balance.

In addition, that increase of the range of variation with zooming of chromatic aberrations which results from the increase of the zoom ratio is well corrected for high optical performance throughout the entire zooming range. To this purpose, the numerical examples 11 to 17 employ at least either one of the following two features (i) and (ii), (i) Letting the lateral magnification for the wide-angle end and the telephoto end of the i-th lens group (where $i \geq 2$) be denoted by $\beta iW$ and $\beta iT$, respectively, and putting the rate of variation of the magnification $\Delta \beta i$ of the i-th lens group to be $$\Delta \beta i = |\beta iT / \beta iW|$$

the second lens group has, under the condition of $\Delta \beta i > 1$, to have a highest rate of variation of the magnification among all of the lens groups of positive refractive powers and includes a triplet (lens A) consisting of either two positive lenses or two negative lenses and a lens whose refractive power is of opposite sign thereto cemented together at their adjoining surfaces and whose overall refractive power is positive.

(ii) The second lens group has a triplet (lens A) consisting of either two positive lenses or two negative lenses and a lens whose refractive power is of opposite sign thereto cemented together at their adjoining surfaces and whose overall refractive power is positive, and it is on the image side of the second lens group that there is provided an additional lens group B of negative refracting power (FB<0) satisfying the following condition:

$$|FB/FW| < 1.1 \tag{20}$$

where FB is the focal length of the additional lens group and FW is the shortest focal length of the entire system.

In here, the inequality of condition (20) has an aim to achieve a minimization of the size of the entire lens system with high efficiency. When this condition is violated, the zooming movements of those lens groups of negative refractive powers which lie on the image side of the lens A-included second lens group weaken their contributions to the variation of the focal length. Moreover, the effect of the retrofocus type weakens in the wide angle end, causing the size of the entire lens system to increase objectionably.

Figure 97:
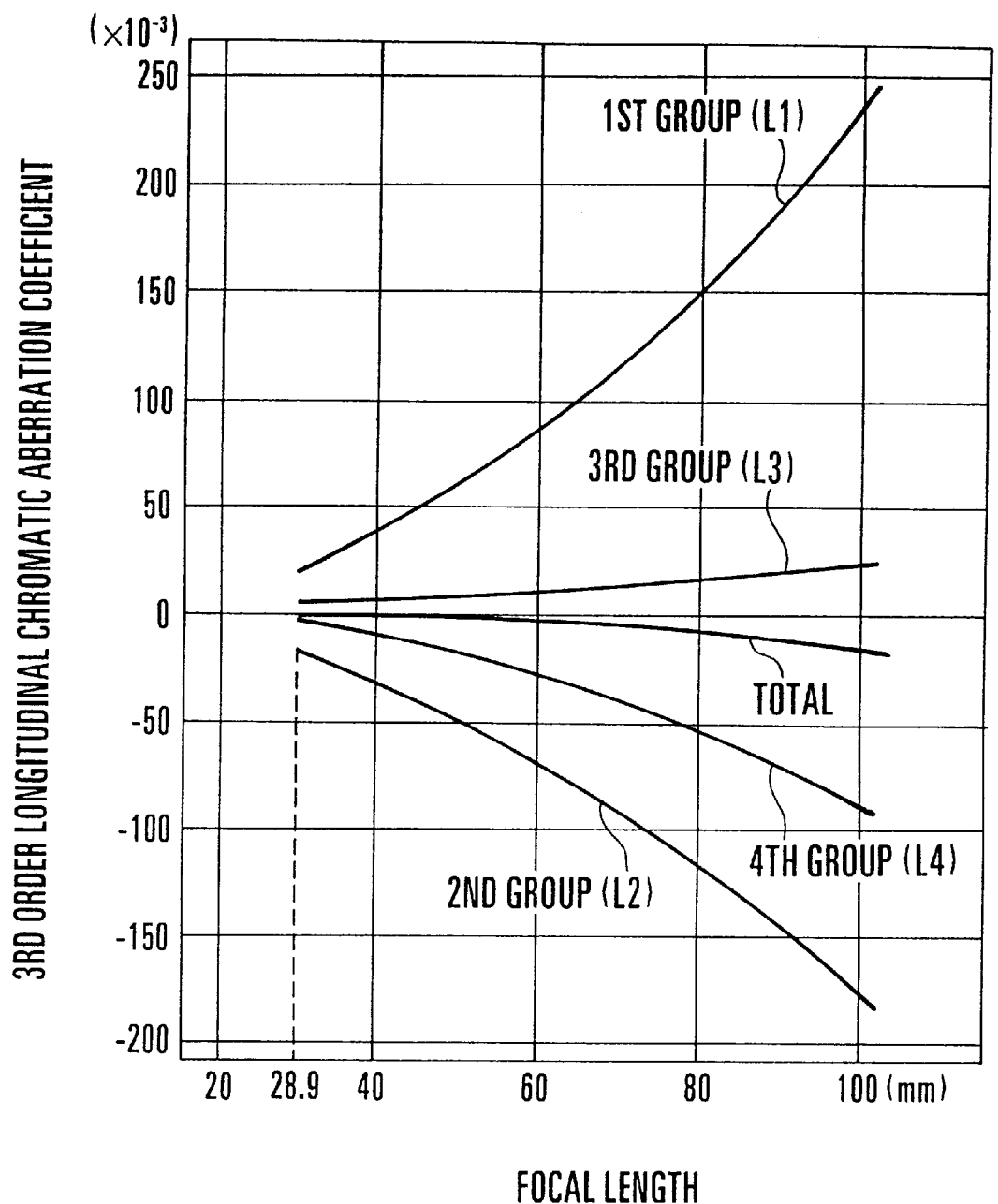
FIG. 97 is a graph to explain the variation of the 3rd order longitudinal chromatic aberration coefficient of the numerical example 15 of the invention.
Figure 98:
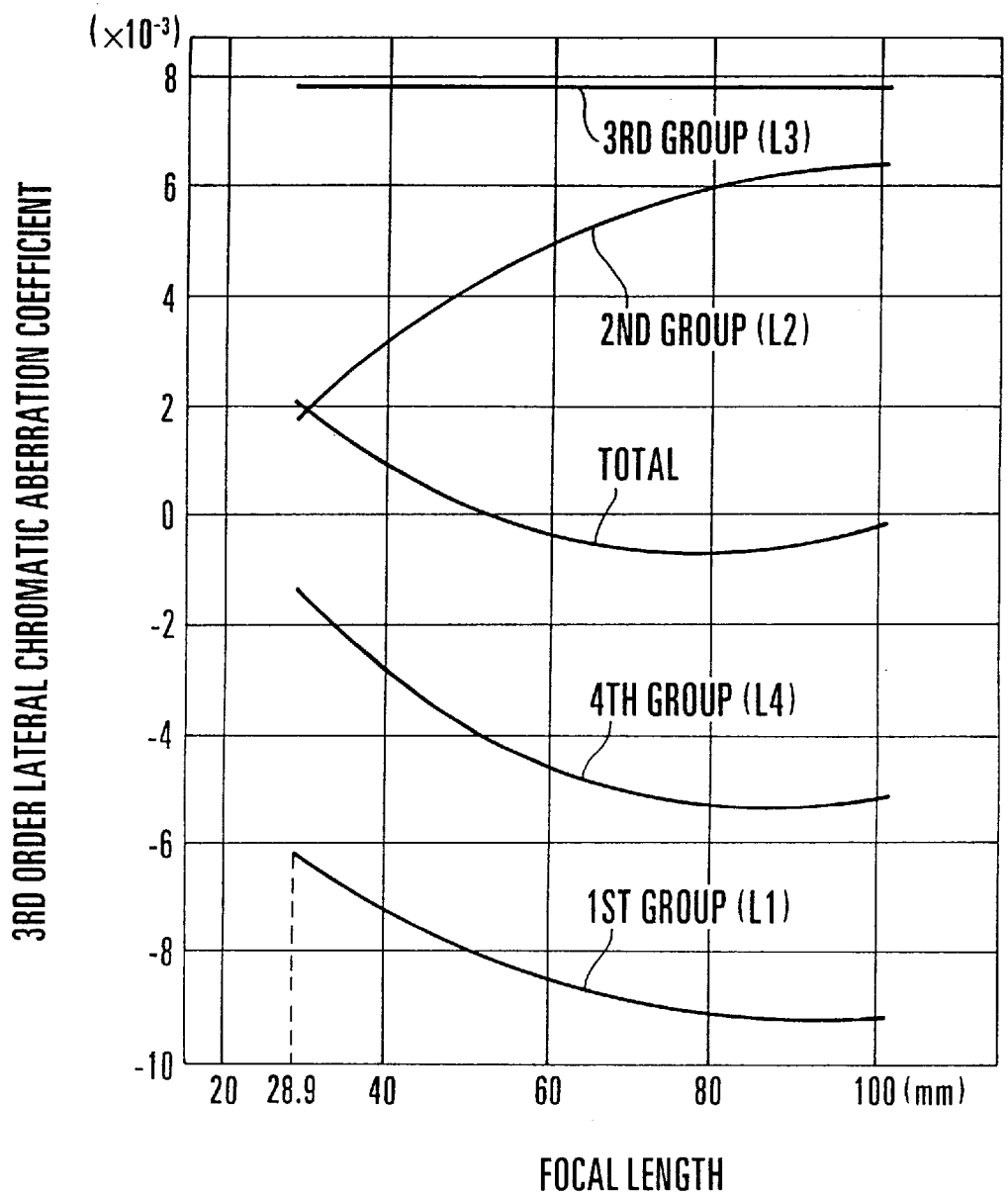
FIG. 98 is a graph to explain the variation of the 3rd order lateral chromatic aberration coefficient of the numerical example 15 of the invention.
Figure 99:
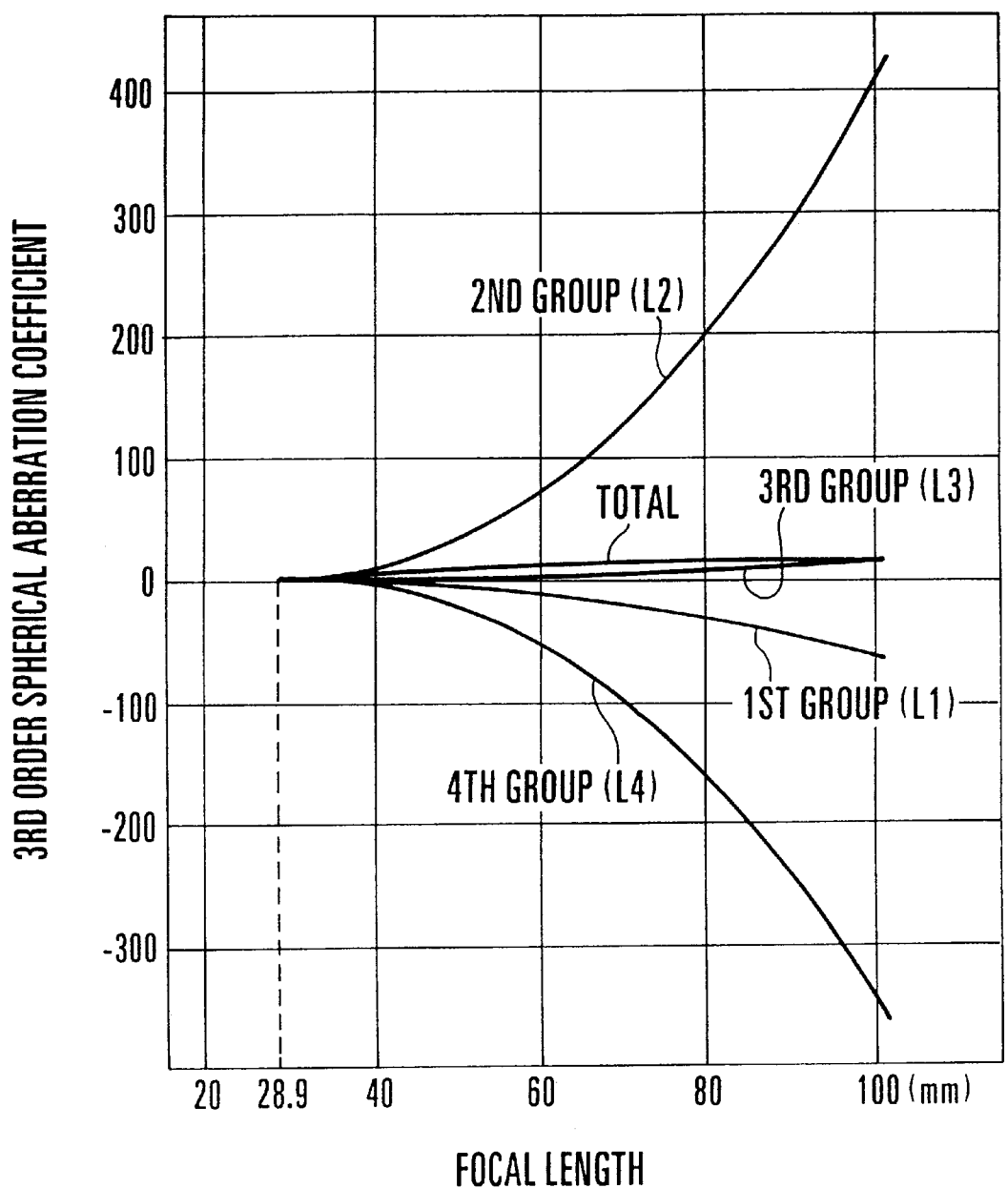
FIG. 99 is a graph to explain the variation of the 3rd order spherical aberration coefficient of the numerical example 15 of the invention.

Next, the features of the lens A provided in the second lens group are described. FIG. 97, FIG. 98 and FIG. 99 are concerned with the numerical example 15 of the invention, showing the longitudinal chromatic aberration, lateral chromatic aberration and spherical aberration of 3rd order respectively with an object at infinity. In these graphs, for each of all lens groups in the zoom lens system, there are shown the produced amounts of these aberrations at any zooming station. The total sum of these amounts for each aberration is also shown.

In here, with the second lens group (L2) of positive refractive power in mind, it is understandable that its aberrations cancel the longitudinal chromatic aberration and lateral chromatic aberration the first lens group (L1) of negative refractive power produces and the lateral chromatic aberration and spherical aberration the fourth lens group (L4) of negative refractive power produces.

Here, as the lens A of the character described before is introduced into the second lens group (L2), the two cemented surfaces in this lens A cooperate to well correct chromatic aberrations and spherical aberration. In this respect, it is desirable that the front and rear cemented surfaces each are arranged to have a negative refracting power. If so, the chromatic aberrations and spherical aberration the second lens group (L2) produce can be corrected in good balance at the image plane of the zoom lens system.

It should be noted that, if, in the numerical examples 11 to 17 of the invention, the cemented surfaces of the lens A were broken to create air spaces between any two of the lens surfaces, large spherical aberrations of higher order would be produced, which are difficult to correct by the other lens surfaces. If the cemented surface were one in number, it would become difficult to correct chromatic aberrations and spherical aberration in good balance.

The above-described features or conditions suffice for accomplishing the objects of the invention. However, to further improve the optical performance throughout the entire zooming range with the limitation of the size of the entire lens system to a minimum, it is recommended that within the framework of the constructional features (i) and (ii) described before, at least one of the following additional features or conditions is satisfied.

(3-1) Letting the focal length of the lens group C of negative refractive power that has the highest rate of variation of the magnification with zooming be denoted by FC, and the shortest focal length of the entire system by FW, the following condition is satisfied:

$$0.5 < |FC/FW| < 1.2 \quad (21)$$

In here, the lens group C in FIG. 66 and FIG. 67 corresponds to the fourth lens group and, in FIG. 68, to the lens unit L31 or the fourth lens group. When the upper limit of the condition (21) is exceeded, as this means that the lens group C has too weak a refractive power, the total zooming movement of the lens group C must be increased to obtain an equivalent zoom ratio. As a result, the total length of the entire system increases objectionably. When the refractive power of the lens group C is too strong beyond the lower limit, large off-axial aberrations such as coma and field curvature are produced, which are difficult to correct well.

(3-2) To make the lens A constructed with, from front to rear, a negative lens A1 of meniscus shape convex toward the object side, a positive lens A2 of which both surfaces are convex and a negative lens A3 of meniscus shape convex toward the image side. Now, the cemented surface between the negative lens A1 and the positive lens A2 is referred to as "S1", and the cemented surface between the positive lens A2 and the negative lens A3 is referred to as "S2". Then, for the cemented surface S1 alone to produce an effect strong enough to correct chromatic aberrations, the cemented surface S1 must be made strong in curvature to strengthen the refracting power of the cemented surface. If the curvature is merely strengthened, however, the cemented surface functions in such a way that, for the axial beam, compared with the paraxial zone, influence by refraction is given to that part of the beam which passes the marginal zone. Therefore, spherical aberrations of higher order come to be produced.

For this reason, in the invention, provision is made of the two cemented surfaces, say, the cemented surface S1 and the cemented surface S2, thus increasing the number of those lens surfaces which have the function of correcting chromatic aberrations in the lens A. Moreover, at the same time, spherical aberration is corrected in good balance with chromatic aberrations.

(3-3) The stop is disposed on the image side of the second lens group. In the zoom lens of the invention, the off-axial beam passes through the fourth lens group at a near position to the optical axis. For this reason, in the invention, the stop is disposed as described above to thereby well correct various off-axial aberrations produced by the fourth lens group.

(3-4) Letting the overall focal length for the wide-angle end of the first lens group and the second lens group be denoted by F1,2W, and the shortest focal length of the entire system by FW, the following condition is satisfied:

$$0.8 < F1,2W/FW < 1.7 \quad (22)$$

The inequalities of condition (22) have an aim to minimize the size of the entire lens system in such a manner that good optical performance is maintained stable over the entire zooming range. When the upper limit of the condition (22) is exceeded, the refractive power of the other negative lens group must be weakened to obtain an equivalent shortest focal length. As a result, the total zooming movements of the fourth lens group and others increase to obtain an equivalent zoom ratio. Moreover, to avoid occurrence of mechanical interference between the lens groups, wider room must be made for the separations between any two of the lens groups, causing the total length of the entire system to increase objectionably.

When the lower limit is exceeded, on the other hand, as this means that the overall focal length F1,2W of the first lens group and the second lens group is too short, it becomes difficult to obtain the predetermined back focal distance. Moreover, large negative spherical aberration is produced, which is difficult to correct well.

(3-5) For the aforesaid triplet, letting the Abbe number of the material of the i-th lens, when counted from the object side be denoted by $\nu Ai$, the radius of curvature of the i-th lens surface by RAi, and the focal length of the triplet by FA, the following conditions are satisfied:

$$0.6 < FA/FW < 1.3 \quad (23)$$

$$20 < \nu A2 - (\nu A1 + \nu A3)/2 \quad (24)$$

$$0.13 < (RA3 + RA2)/(RA3 - RA2) < 0.45 \quad (25)$$

The inequalities of condition (23) are concerned with the ratio of the refractive power for the wide-angle end of the second lens group to the refractive power of the entire system. When the upper limit of the condition (23) is exceeded, as this means that the second lens group has too weak a refractive power, the total zooming movement of the second lens group increases to obtain an equivalent zoom ratio. As a result, the total length of the entire system comes to increase. Conversely, when the lower limit is exceeded, as this means that the second lens group has too strong a refractive power, large spherical aberrations of higher order and large coma are produced, which are difficult to correct well.

The inequality of condition (24) has an aim to make the triplet (lens A) able to effectively correct the chromatic aberrations produced by the fourth lens group. When this condition is violated, it becomes difficult to correct chromatic aberrations well throughout the entire zooming range.

The inequalities of condition (25) are concerned with the shape factor of the lens A2 of bi-convex form in the lens A. When outside the range of the condition (25), the cemented surfaces can no longer correct spherical aberration and chromatic aberrations in good balance. Therefore, it becomes difficult to achieve an optical system of high image quality over the entire zooming range.

(3-6) To make up the second lens group from two positive lenses or two negative lenses and one lens of refractive power of opposite sign thereto cemented together to form a triplet. According to this, the entire system gets a shorter total length and, at the same time, the position of the entrance pupil can be brought toward the object side, thereby minimizing the diameter of the front lens members.

(3-7) To introduce an aspheric surface into each of the lens groups advantageous. According this, the optical performance can be further improved.

(3-8) With regard to the zooming movements of the lens units, a method of moving two or more of the lens units in unison may be employed. According to this, an advantage is obtained when the barrel structure is to simplify.

(3-9) For a lens system having a stop, when zooming, this stop may be moved axially either in differential relation to, or in unison with, the other lens units than that including that stop. This makes it possible for the stop to take its place near the entrance pupil which moves when zooming, giving an advantage of preventing change of field curvature from occurring when the aperture opening decreases in size.

(3-10) In the present embodiment, for focusing purposes, a desired one of those lens groups which vary their lateral magnification not past unity during zooming may apply. If the first lens group has a considerably strong refractive power, it is preferred to employ the method of moving the first lens group toward the object side, since the focusing movement for a given object distance remains constant at any zooming station. This leads to simplify the structure of the operating mechanism.

If the back focal distance for the wide-angle end is sufficiently long and the refractive power of the last lens group is considerably strong, it is better to employ the method of moving the last lens group toward the image side, as focusing is effected down. In this case, there is an advantage of minimizing the diameter of the first lens group. Another method of moving two or more of all the lens groups simultaneously may be employed. Incidentally, if the focusing lens group includes the stop, the use of a focusing method of moving the focusing lens group while keeping the stop axially stationary gives an advantage that the drive torque of the focusing control mechanism can be reduced.

(3-11) The triplet (lens A) in the second lens group may otherwise be constructed with, from front to rear, a positive lens having a convex surface facing the object side, a negative lens of which both surfaces are concave and a positive lens having a convex surface facing the image side cemented together at their adjoining surfaces.

(3-12) In the present embodiment, it is good to make up the first lens group L1 either from a lens unit L11 comprising a positive lens in the form of a singlet and a lens unit L12 comprising either a negative lens and a positive lens, totaling two lenses, or a negative lens, totaling two lens units, or from one lens unit comprising a positive lens, a negative lens and a positive lens, totaling three lenses.

It is good to make up the second lens group L2 from a positive lens having a convex surface facing the object side, a positive lens of which both surfaces are convex and a negative lens of meniscus shape convex toward the image side, totaling three lenses, cemented together at their adjoining surfaces to form a triplet.

It is good to make up the third lens group L3 either from a negative lens and a doublet consisting of a negative lens and a positive lens, totaling three lenses, or from a negative lens and a positive lens, totaling two lenses.

It is good to make up the fourth lens group L4 either from a positive lens of meniscus shape convex toward the image side and at least one negative lens, or from a negative lens having a concave surface facing the object side, a positive lens and a negative lens, totaling three lenses.

Next, the numerical data for the numerical examples 11 to 17 of the invention are given in the following tables, wherein Ri is the radius of curvature of the i-th lens surface, when counted from the object side, Di is the i-th lens thickness or air separation, when counted from the object side, and Ni and νi are respectively the refractive index and Abbe number of the glass of the i-th lens element, when counted from the object side. The values of the factors in the above-described conditions for the numerical examples 11 to 17 are listed in Table-3.

The shape of the aspheric surface is expressed in the coordinates with an X axis in the axial direction and an H axis in the perpendicular direction to the optical axis, the direction in which light advances being taken as positive by the following equation:

$$X = (1/R)H^2/(1+\sqrt{1-(1+K)(H/R)^2}) + AH^2 + BH^4 + CH^6 + DH^8$$

where R is the radius of the osculating sphere, and K, A, B, C and D are the aspheric coefficients.

NUMERICAL EXAMPLE 11 f = 28.84–101.06  Fno. = 4.33–9.00  2ω = 73.8°–24.2°

| | | | |
|---|---|---|---|
| R 1 = 89.26 | D 1 = 3.30 | N 1 = 1.51633 | ν 1 = 64.2 |
| R 2 = –73.65 | D 2 = Variable | | |
| R 3 = –43.75 | D 3 = 1.20 | N 2 = 1.80400 | ν 2 = 46.6 |
| R 4 = 18.20 | D 4 = 1.66 | | |
| R 5 = 21.94 | D 5 = 3.00 | N 3 = 1.84665 | ν 3 = 23.8 |
| R 6 = 101.94 | D 6 = Variable | | |
| R 7 = 16.54 | D 7 = 0.90 | N 4 = 1.84665 | ν 4 = 23.8 |
| R 8 = 11.47 | D 8 = 4.80 | N 5 = 1.48749 | ν 5 = 70.2 |
| R 9 = –22.49 | D 9 = 1.10 | N 6 = 1.84665 | ν 6 = 23.8 |
| R10 = –25.48 | D10 = 0.80 | | |
| R11 = Stop | D11 = 1.50 | | |
| R12 = –24.98 | D12 = 1.60 | N 7 = 1.80518 | ν 7 = 25.4 |
| R13 = –27.12 | D13 = 1.60 | | |
| R14 = –35.21 | D14 = 1.90 | N 8 = 1.65159 | ν 8 = 58.5 |
| R15 = –88.13 | D15 = 3.50 | N 9 = 1.77249 | ν 9 = 49.6 |
| R16 = –15.90 | D16 = Variable | | |
| R17 = –28.58 | D17 = 2.10 | N10 = 1.84665 | ν10 = 23.8 |
| R18 = –19.52 | D18 = 3.33 | | |
| R19 = –17.07 | D19 = 1.80 | N11 = 1.80400 | ν11 = 46.6 |
| R20 = 93.48 | | | |

| Variable | Focal Length | | |
|---|---|---|---|
| Separations | 28.84 | 53.99 | 101.06 |
| D 2 | 1.28 | 2.10 | 3.02 |
| D 6 | 12.25 | 7.33 | 0.79 |
| D11 | 1.50 | 3.84 | 6.59 |
| D16 | 12.88 | 5.14 | 0.80 |

The Values of Aspheric Coefficients:

R12: k = 4.465  A = 0  B = –2.734 × 10$^{-5}$
  C = –1.812 × 10$^{-7}$  D = 2.051 × 10$^{-9}$

NUMERICAL EXAMPLE 12

| f = 28.74–101.17 | | Fno. = 4.33–9.00 | 2ω = 74.0°–24.1° |
|---|---|---|---|
| R 1 = 639.62 | D 1 = 2.50 | N 1 = 1.51633 | ν 1 = 64.2 |
| R 2 = −56.09 | D 2 = Variable | | |
| R 3 = −41.05 | D 3 = 1.20 | N 2 = 1.80400 | ν 2 = 46.6 |
| R 4 = 19.48 | D 4 = 1.64 | | |
| R 5 = 23.15 | D 5 = 2.75 | N 3 = 1.84665 | ν 3 = 23.8 |
| R 6 = 160.15 | D 6 = Variable | | |
| R 7 = 15.90 | D 7 = 0.90 | N 4 = 1.84665 | ν 4 = 23.8 |
| R 8 = 11.73 | D 8 = 4.80 | N 5 = 1.48749 | ν 5 = 70.2 |
| R 9 = −21.42 | D 9 = 0.90 | N 6 = 1.84665 | ν 6 = 23.8 |
| R10 = −28.84 | D10 = Variable | | |
| R11 = Stop | D11 = 1.50 | | |
| R12 = −27.14 | D12 = 1.60 | N 7 = 1.80518 | ν 7 = 25.4 |
| R13 = −48.22 | D13 = 1.36 | | |
| R14 = −38.16 | D14 = 2.00 | N 8 = 1.65159 | ν 8 = 58.5 |
| R15 = −26.71 | D15 = 3.50 | N 9 = 1.77249 | ν 9 = 49.6 |
| R16 = −15.71 | D16 = Variable | | |
| R17 = −34.31 | D17 = 2.30 | N10 = 1.84665 | ν10 = 23.8 |
| R18 = −21.84 | D18 = 0.91 | | |
| R19 = −32.78 | D19 = 1..30 | N11 = 1.69679 | ν11 = 55.5 |
| R20 = −58.16 | D20 = 3.21 | | |
| R21 = −18.28 | D21 = 1.50 | N12 = 1.77249 | ν12 = 49.6 |
| R22 = 223.19 | | | |

| Variable | Focal Length | | |
|---|---|---|---|
| Separations | 28.74 | 53.92 | 101.17 |
| D 2 | 1.05 | 2.26 | 4.97 |
| D 6 | 11.24 | 6.44 | 0.85 |
| D10 | 1.47 | 4.14 | 6.17 |
| D16 | 12.97 | 5.10 | 0.80 |

The Values of Aspheric Coefficients:

R12: K = 4.415   A = 0   B = −4.331 × 10$^{-5}$
C = '11.859 × 10$^{-7}$   D = −6.129 × 10$^{-10}$

NUMERICAL EXAMPLE 13

| f = 28.85–101.00 | | Fno. = 3.30–9.00 | 2ω = 73.7°–24.2° |
|---|---|---|---|
| R 1 = 424.11 | D 1 = 2.40 | N 1 = 1.51633 | ν 1 = 64.2 |
| R 2 = −60.06 | D 2 = Variable | | |
| R 3 = −38.54 | D 3 = 1.20 | N 2 = 1.80400 | ν 2 = 46.6 |
| R 4 = 19.56 | D 4 = 1.35 | | |
| R 5 = 21.49 | D 5 = 2.90 | N 3 = 1.84665 | ν 3 = 23.8 |
| R 6 = 176.01 | D 6 = Variable | | |
| R 7 = 15.65 | D 7 = 0.90 | N 4 = 1.84665 | ν 4 = 23.8 |
| R 8 = 11.27 | D 8 = 4.50 | N 5 = 1.48749 | ν 5 = 70.2 |
| R 9 = −21.44 | D 9 = 0.90 | N 6 = 1.84665 | ν 6 = 23.8 |
| R10 = −29.88 | D10 = Variable | | |
| R11 = Stop | D11 = 3.00 | | |
| R12 = −24.67 | D12 = 2.55 | N 7 = 1.80518 | ν 7 = 25.4 |
| R13 = −47.29 | D13 = 0.50 | | |
| R14 = −36.54 | D14 = 1.00 | N 8 = 1.65159 | ν 8 = 58.5 |
| R15 = 155.75 | D15 = 5.80 | N 9 = 1.77249 | ν 9 = 49.6 |
| R16 = −14.23 | D16 = Variable | | |
| R17 = −28.76 | D17 = 2.30 | N10 = 1.84665 | ν10 = 23.8 |
| R18 = −20.20 | D18 = 0.30 | | |
| R19 = −25.76 | D19 = 1.30 | N11 = 1.69679 | ν11 = 55.5 |
| R20 = −80.69 | D20 = 3.51 | | |
| R21 = −18.83 | D21 = 1.50 | N12 = 1.77249 | ν12 = 49.6 |
| R22 = 431.90 | | | |

| Variable | Focal Length | | |
|---|---|---|---|
| Separations | 28.85 | 53.98 | 101.00 |
| D 2 | 1.23 | 2.21 | 5.15 |
| D 6 | 8.73 | 4.75 | 0.81 |
| D10 | 0.79 | 4.84 | 8.26 |
| D16 | 10.75 | 4.72 | 0.85 |

The Values of Aspheric Coefficients:

R12: K = 4.963   A = 0   B = −6.074 × 10$^{-5}$
C = −3.607 × 10$^{-7}$   D = −3.331 × 10$^{-9}$
R16: K = −2.664   A = 0   B = −1.127 × 10$^{-4}$
C = 1.634 × 10$^{-7}$   D = −1.376 × 10$^{-9}$

NUMERICAL EXAMPLE 14

| f = 28.86–101.58 | | Fno. = 3.06–9.00 | 2ω = 73.7°–24.1° |
|---|---|---|---|
| R 1 = 101.89 | D 1 = 2.85 | N 1 = 1.51633 | ν 1 = 64.2 |
| R 2 = −61.28 | D 2 = 0.84 | | |
| R 3 = −39.42 | D 3 = 1.20 | N 2 = 1.80400 | ν 2 = 46.6 |
| R 4 = 17.90 | D 4 = 1.07 | | |
| R 5 = 19.60 | D 5 = 3.35 | N 3 = 1.84665 | ν 3 = 23.8 |
| R 6 = 95.82 | D 6 = Variable | | |
| R 7 = 16.21 | D 7 = 0.90 | N 4 = 1.84665 | ν 4 = 23.8 |
| R 8 = 11.92 | D 8 = 4.80 | N 5 = 1.48749 | ν 5 = 70.2 |
| R 9 = −19.85 | D 9 = 0.90 | N 6 = 1.84665 | ν 6 = 23.8 |
| R10 = −27.78 | D10 = Variable | | |
| R11 = Stop | D11 = 3.50 | | |
| R12 = −26.05 | D12 = 2.42 | N 7 = 1.80518 | ν 7 = 25.4 |
| R13 = −45.55 | D13 = 0.56 | | |
| R14 = −34.59 | D14 = 1.00 | N 8 = 1.65159 | ν 8 = 58.5 |
| R15 = 310.25 | D15 = 5.80 | N 9 = 1.77249 | ν 9 = 49.6 |
| R16 = −13.79 | D16 = Variable | | |
| R17 = −28.83 | D17 = 2.30 | N10 = 1.84665 | ν10 = 23.8 |
| R18 = −20.42 | D18 = 0.24 | | |
| R19 = −25.56 | D19 = 1.30 | N11 = 1.69679 | ν11 = 55.5 |
| R20 = −131.56 | D20 = 3.53 | | |
| R21 = −20.55 | D21 = 1.50 | N12 = 1.77249 | ν12 = 49.6 |
| R22 = 204.29 | | | |

| Variable | Focal Length | | |
|---|---|---|---|
| Separations | 28.86 | 54.15 | 101.58 |
| D 6 | 9.49 | 5.78 | 0.79 |
| D10 | 1.56 | 5.74 | 8.67 |
| D16 | 9.64 | 3.97 | 0.79 |

The Values of Aspheric Coefficients:

R12: K = 6.017   A = 0   B = −6.890 × 10$^{-5}$
C = −6.114 × 10$^{-7}$   D = −4.934 × 10$^{-9}$
R16: K = −2.445   A = 0   B = −1.158 × 10$^{-4}$
C = 1.246 × 10$^{-7}$   D = −1.894 × 10$^{-9}$

NUMERICAL EXAMPLE 15

| f = 28.85–101.49 | | Fno. = 3.29–9.00 | 2ω = 73.7°–24.1° |
|---|---|---|---|
| R 1 = 163.89 | D 1 = 3.25 | N 1 = 1.51633 | ν 1 = 64.2 |
| R 2 = −26.34 | D 2 = 1.20 | N 2 = 1.80400 | ν 2 = 46.6 |
| R 3 = 16.98 | D 3 = 1.21 | | |
| R 4 = 18.93 | D 4 = 2.50 | N 3 = 1.84665 | ν 3 = 23.8 |
| R 5 = 108.28 | D 5 = Variable | | |
| R 6 = 16.38 | D 6 = 0.90 | N 4 = 1.84665 | ν 4 = 23.8 |
| R 7 = 11.85 | D 7 = 4.60 | N 5 = 1.48749 | ν 5 = 70.2 |
| R 8 = −19.38 | D 8 = 0.90 | N 6 = 1.84665 | ν 6 = 23.8 |
| R 9 = −25.91 | D 9 = Variable | | |
| R10 = Stop | D10 = 2.00 | | |
| R11 = −24.61 | D11 = 2.07 | N 7 = 1.80518 | ν 7 = 25.4 |
| R12 = −71.21 | D12 = 0.48 | | |
| R13 = −44.54 | D13 = 1.30 | N 8 = 1.65159 | ν 8 = 58.5 |

-continued

| | | | |
|---|---|---|---|
| R14 = −317.49 | D14 = 5.00 | N 9 = 1.77249 | ν 9 = 49.6 |
| R15 = −13.39 | D15 = Variable | | |
| R16 = −33.60 | D16 = 2.30 | N10 = 1.84665 | ν10 = 23.8 |
| R17 = −22.01 | D17 = 0.77 | | |
| R18 = −25.47 | D18 = 1.30 | N11 = 1.69679 | ν11 = 55.5 |
| R19 = −654.85 | D19 = 4.11 | | |
| R20 = −18.51 | D20 = 1.50 | N12 = 1.77249 | ν12 = 49.6 |
| R21 = −202.43 | | | |

| Variable | Focal Length | | |
|---|---|---|---|
| Separations | 28.85 | 54.11 | 101.49 |
| D 5 | 7.30 | 4.25 | 0.29 |
| D 9 | 1.00 | 5.83 | 8.72 |
| D15 | 10.18 | 4.20 | 0.79 |

The Values of Aspheric Coefficients:

R 3: $K = 2.970 \times 10^{-1}$  $A = 0$  $B = -5.495 \times 10^{-6}$
 $C = -1.753 \times 10^{-8}$
R11: $K = 5.794$  $A = 0$  $B = -7.033 \times 10^{-5}$
 $C = -5.377 \times 10^{-7}$  $D = -8.804 \times 10^{-9}$
R15: $K = -2.657$  $A = 0$  $B = -1.393 \times 10^{-4}$
 $C = 1.880 \times 10^{-7}$  $D = -2.909 \times 10^{-9}$

NUMERICAL EXAMPLE 16

| $f = 28.83-101.02$ | Fno. = 4.00–8.75 | $2\omega = 73.8°-24.2°$ | |
|---|---|---|---|
| R 1 = 62.55 | D 1 = 2.40 | N 1 = 1.84665 | ν 1 = 23.8 |
| R 2 = −704.82 | D 2 = Variable | | |
| R 3 = −79.39 | D 3 = 1.20 | N 2 = 1.77249 | ν 2 = 49.6 |
| R 4 = 27.29 | D 4 = Variable | | |
| R 5 = 14.31 | D 5 = 0.90 | N 3 = 1.84665 | ν 3 = 23.8 |
| R 6 = 13.95 | D 6 = .3.50 | N 4 = 1.51822 | ν 4 = 59.0 |
| R 7 = −22.52 | D 7 = 0.90 | N 5 = 1.84665 | ν 5 = 23.8 |
| R 8 = −40.19 | D 8 = 1.00 | | |
| R 9 = Stop | D 9 = 4.67 | | |
| R10 = −17.92 | D10 = 2.85 | N 6 = 1.80518 | ν 6 = 25.4 |
| R11 = −109.72 | D11 = Variable | | |
| R12 = 264.84 | D12 = 1.10 | N 7 = 1.84665 | ν 7 = 23.8 |
| R13 = 46.19 | D13 = 4.50 | N 8 = 1.80439 | ν 8 = 39.6 |
| R14 = −15.33 | D14 = Variable | | |
| R15 = −25.10 | D15 = 2.50 | N 9 = 1.80518 | ν 9 = 25.4 |
| R16 = −17.84 | D16 = 1.21 | | |
| R17 = −17;91 | D17 = 1.30 | N10 = 1.69679 | ν10 = 55.5 |
| R18 = −68.84 | D18 = 2.13 | | |
| R19 = −29.26 | D19 = 1.40 | N11 = 1.77249 | ν11 = 49.6 |
| R20 = −308.12 | | | |

| Variable | Focal Length | | |
|---|---|---|---|
| Separations | 28.83 | 53.97 | 101.02 |
| D 2 | 1.54 | 1.78 | 3.05 |
| D 4 | 11.51 | 7.09 | 0.80 |
| D 9 | 4.67 | 7.19 | 8.85 |
| D11 | 1.06 | 2.92 | 4.42 |
| D14 | 10.66 | 3.65 | 0.79 |

The Values of Aspheric Coefficients:

R10: $K = 4.217$  $A = 0$  $B = -1.416 \times 10^{31\,5}$
 $C = -1.354 \times 10^{-7}$  $D = 3.585 \times 10^{-9}$
R14: $K = -2.913$  $A = 0$  $B = -8.592 \times 10^{-5}$
 $C = 1.831 \times 10^{-7}$  $D = -2.680 \times 10^{-10}$

NUMERICAL EXAMPLE 17

| $f = 28.87-100.85$ | Fno. = 4.00–8.76 | $2\omega = 73.7°-24.2°$ | |
|---|---|---|---|
| R 1 = 80.90 | D 1 = 24.0 | N 1 = 1.84665 | ν 1 = 23.8 |
| R 2 = −245.18 | D 2 = Variable | | |
| R 3 = −53.00 | D 3 = 1.20 | N 2 = 1.69679 | ν 2 = 55.5 |
| R 4 = 23.65 | D 4 = Variable | | |
| R 5 = 15.02 | D 5 = 1.20 | N 3 = 1.84665 | ν 3 = 23.8 |
| R 6 = 15.55 | D 6 = 3.50 | N 4 = 1.58913 | ν 4 = 61.2 |
| R 7 = −22.14 | D 7 = 1.00 | N 5 = 1.84665 | ν 5 = 23.8 |
| R 8 = −51.78 | D 8 = Variable | | |
| R 9 = Stop | D 9 = 3.59 | | |
| R10 = −20.71 | D10 = 1.20 | N 6 = 1.80518 | ν 6 = 25.4 |
| R11 = −86.49 | D11 = Varialble | | |
| R12 = Fi x ed Stop | D12 = 2.80 | | |
| R13 = 3202.97 | D13 = 4.60 | N 7 = 1.78589 | ν 7 = 44.2 |
| R14 = −15.18 | D14 = Variable | | |
| R15 = −26.57 | D15 = 1.20 | N 8 = 1.77249 | ν 8 = 49.6 |
| R16 = 74.12 | D16 = 2.20 | N 9 = 1.80518. | ν 9 = 25.4 |
| R17 = 266.07 | D17 = 2.01 | | |
| R18 = −64.20 | D18 = 1.50 | N10 = 1.69679 | ν10 = 55.5 |
| R19 = −13681.8 | | | |

| Variable | Focal Length | | |
|---|---|---|---|
| Separations | 28.87 | 54.00 | 100.85 |
| D 2 | 1.93 | 2.03 | 3.45 |
| D 4 | 8.80 | 5.94 | 0.89 |
| D 8 | 1.65 | 4.40 | 5.54 |
| D11 | 0.73 | 3.16 | 5.00 |
| D14 | 12.30 | 6.16 | 4.32 |

The Values of Aspheric Coefficients:

R 4: $K = 2.393 \times 10^{-1}$  $A = 0$  $B = -1.146 \times 10^{-5}$
 $C = 2.167 \times 10^{-8}$  $D = -2.879 \times 10^{-10}$
R10: $K = 4.558$  $A = 0$  $B = -5.356 \times 10^{-5}$
 $C = 22.028 \times 10^{-7}$  $D = -2.128 \times 10^{-9}$
R14: $K = -2.794$  $A = 0$  $B = -8.249 \times 10\#5$
 $C = 1.650 \times 10$  $D = -2.114 \times 10^{-10}$

TABLE 3

| | Numerical Sample | | | |
|---|---|---|---|---|
| Factor | 11 | 12 | 13 | 14 |
| \|FB/FW\| | 0.87 | 0.87 | 0.69 | 0.65 |
| | (Gp.5) | (Gp.5) | (Gp.5) | (Gp.4) |
| \|FC/FW\| | 0.87 | 0.87 | 0.69 | 0.65 |
| | (Gp.5) | (Gp.5) | (Gp.5) | (Gp.4) |
| F1,2W/FW | 1.13 | 1.24 | 1.33 | 1.33 |
| FA/FW | 0.96 | 1.01 | 1.04 | 1.02 |
| νA2-(νA1 + νA2)/2 | 46.4 | 46.4 | 46.4 | 46.4 |
| (RA3 + RA2)/(RA3 − RA2) | 0.32 | 0.29 | 0.31 | 0.25 |

| | Numerical Sample | | |
|---|---|---|---|
| | 15 | 16 | 17 |
| \|FB/FW\| | 0.65 | 0.94 | 0.87 | 0.79 |
| | (Gp.4) | (Gp.4) | (Gp.6) | (Gp.6) |
| \|FC/FW\| | 0.65 | 0.87 | 0.79 |
| | (Gp.4) | (Gp.6) | (Gp.6) |
| F1,2W/FW | 1.30 | 1.19 | 1.32 |
| FA/FW | 0.99 | 0.83 | 0.78 |
| νA2-(νA1 + νA3)/2 | 46.4 | 35.2 | 37.4 |
| (RA3 + RA2)/(RA3 − RA2) | 0.24 | 0.23 | 0.17 |

It will be appreciated from the foregoing that according to the present embodiment, the entire system is made up from four lens groups and rules of design for these lens groups are set forth to give proper moving conditions and refractive power arrangements, thus achieving a zoom lens having a maximum field angle of about 74° and a zoom ratio of about 3.5 with high optical performance throughout the entire zooming range.

What is claimed is:

1. A zoom lens consisting of from an object side to an image side, at a wide-angle end, a first lens group whose overall refractive power is positive and a second lens group whose overall refractive power is negative, zooming being performed by varying the separation between said first lens group and said second lens group, wherein said second lens group includes a first lens unit of negative refractive power and a second lens unit of negative refractive power, focusing being performed by varying the separation between said first lens unit and said second lens unit.

2. A zoom lens according to claim 1, wherein said first lens group has a plurality of lens units, and a separation between each adjacent two of said plurality of lens units varies during zooming.

3. A zoom lens according to claim 1, wherein focusing is performed by moving said first lens unit.

4. A zoom lens according to claim 1, satisfying the following conditions:

$$0.5<|fL2/fW|<0.95$$

$$0.25<fL2/fL21<0.9$$

$$1.2<\beta L2W<1.85$$

$$0.5<fL1W/fW<0.95$$

where fL1W is the focal length for the wide-angle end of said first lens group, fW is the shortest focal length of the entire system, fL21 and fL2 are the focal lengths of said first lens unit and said second lens group, respectively, and βL2W is a lateral magnification for the wide-angle end of said second lens group.

5. A zoom lens comprising from an object side to an image side, at a wide-angle end, a first lens group whose overall refractive power is positive and a second lens group whose overall refractive power is negative, zooming being performed by varying the separation between said first lens group and said second lens group, wherein said second lens group includes a first lens unit of negative refractive power and a second lens unit of negative refractive power, focusing being performed by varying the separation between said first lens unit and said second lens unit, wherein said first lens group has a plurality of lens units, and the separation between each adjacent two of said plurality of lens units varies during zooming.

6. A zoom lens comprising from an object side to an image side, at a wide-angle end, a first lens group whose overall refractive power is positive and a second lens group whose overall refractive power is negative, zooming being performed by varying the separation between said first lens group and said second lens group, wherein said second lens group includes a first lens unit of negative refractive power and a second lens unit of negative refractive power, focusing being performed by varying the separation between said first lens unit and said second lens unit, satisfying the following conditions:

$$0.5<|fL2/fW|<0.95$$

$$0.25<fL2/fL21<0.9$$

$$1.2<\beta L2W<1.85$$

$$0.5<fL1W/fW<0.95$$

where fL1W is the focal length for the wide-angle end of said first lens group, fW is the shortest focal length of the entire system, fL21 and fL2 are the focal lengths of said first lens unit and said second lens group, respectively, and βL2W is a lateral magnification for the wide-angle end of said second lens group.

7. A zoom lens according to claim 6, wherein said first lens unit has a negative lens having a concave surface facing the image side, and said second lens unit has a negative lens having a concave surface facing the object side.

* * * * *

UNITED STATES PATENT AND TRADEMARK OFFICE
CERTIFICATE OF CORRECTION

PATENT NO.    : 6,236,517 B1
DATED         : May 22, 2001
INVENTOR(S)   : Takashi Kato et al.

It is certified that error appears in the above-identified patent and that said Letters Patent is hereby corrected as shown below:

Column 2,
Line 52, "the se" should read -- these --.

Column 3,
Line 1, "Hei 3-49614" should read -- Hei 3-249614 --.

Column 4,
Line 13, "Hiw>|Hbit|" should read -- Hit>|Hbit| --.

Column 10,
Line 49, "Lens" should read -- lens --.

Column 11,
Line 12, "strong" should read -- stronger --.

Column 14,
Line 14, "either." should read -- either --.

Column 18,
In Numerical Example 5 at line 63, "D= -4.463x$10^{-8}$" should read -- D= -4.483x$10^{-8}$ --.

Column 20,
Line 56, "0.25<fL2/fL<0.9" should read -- 0.25<fL2/fL21<0.9 --.

Column 24,
Line 31, "L3," should read -- L13, --.

Column 27,
In Numerical Example 9 at line 63, "R3:K=2.216x10" should read -- R3:K=2.216x$10^{-1}$ --.
In Numerical Example 9 at line 66, "C= -3.412x$10^{7}$" should read -- C= -3.412x$10^{-7}$ --.

Column 28,
In Numerical Example 9 at line 2, "B= -1.510x$10^{4}$" should read -- B= -1.510x$10^{-4}$ --.

Column 34,
In Numerical Example 11 at line 48, "R13= -27.12" should read -- R13= -47.12 --.

UNITED STATES PATENT AND TRADEMARK OFFICE
CERTIFICATE OF CORRECTION

PATENT NO. : 6,236,517 B1
DATED : May 22, 2001
INVENTOR(S) : Takashi Kato et al.

It is certified that error appears in the above-identified patent and that said Letters Patent is hereby corrected as shown below:

Column 35,
In Numerical Example 12 at line 34, "C='11.859.x$10^{-7}$" should read -- C=-1.859x$10^{-7}$ --.
In Numerical Example 13 at lines 60 and 61, "_____"
                                             R22=431.90"        should read
-- R22=431.90_____ --.

Column 37,
In Numerical Example 16 at line 50, "R17= -17;91" should read -- R17= 17.91 --.
In Numerical Example 16 at line 62, "B= -1.416x$10^{315}$" should read -- B= -1.416x$10^{-5}$ --.

Column 38,
In Numerical Example 17 at line 15, "R12=fi x ed Stop" should read -- R12=Fixed Stop --.
In Numerical Example 17 at line 31, "R4:K=2.393x$10^{1}$" should read -- R4:K=2.393x$10^{-1}$ --.
In Numerical Example 17 at line 31, "B= -1.146x$10^{5}$" should read -- B= -1.146x$10^{-5}$ --.
In Numerical Example 17 at line 34, "C=22.028x$10^{-7}$" should read -- C= -2.028x$10^{-7}$--.
In Numerical Example 17 at line 35, "B= -8.249x10#5" should read -- B= -8.249x$10^{-5}$ --.

Signed and Sealed this

Twenty-fourth Day of September, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 6,236,517 B1
DATED         : May 22, 2001
INVENTOR(S)   : Takashi Kato et al.

It is certified that error appears in the above-identified patent and that said Letters Patent is hereby corrected as shown below:

<u>Column 4,</u>
Line 13, "Hiw" should read -- Hit --.

<u>Column 20,</u>
Line 56, "fL" should read -- fL21 --.

Signed and Sealed this

Twenty-sixth Day of August, 2003

JAMES E. ROGAN
*Director of the United States Patent and Trademark Office*